US008799115B2

(12) United States Patent
Schmitt

(10) Patent No.: US 8,799,115 B2
(45) Date of Patent: Aug. 5, 2014

(54) MANAGING CONSISTENT INTERFACES FOR BUSINESS OBJECTS ACROSS HETEROGENEOUS SYSTEMS

(71) Applicant: Bernd Schmitt, Waldbronn (DE)

(72) Inventor: Bernd Schmitt, Waldbronn (DE)

(73) Assignee: SAP AG, Walldorf (DE)

(*) Notice: Subject to any disclaimer, the term of this patent is extended or adjusted under 35 U.S.C. 154(b) by 0 days.

(21) Appl. No.: 13/770,508

(22) Filed: Feb. 19, 2013

(65) Prior Publication Data

US 2013/0159146 A1 Jun. 20, 2013

Related U.S. Application Data

(63) Continuation of application No. 12/147,395, filed on Jun. 26, 2008, now Pat. No. 8,417,593.

(60) Provisional application No. 61/032,388, filed on Feb. 28, 2008.

(51) Int. Cl.
*G06Q 40/00* (2012.01)

(52) U.S. Cl.
USPC ........................................................ 705/29

(58) Field of Classification Search
None
See application file for complete search history.

(56) References Cited

U.S. PATENT DOCUMENTS

| | | | |
|---|---|---|---|
| 3,223,321 | A | 12/1965 | Baumgartner |
| 5,126,936 | A | 6/1992 | Champion et al. |
| 5,210,686 | A | 5/1993 | Jernigan |
| 5,247,575 | A | 9/1993 | Sprague et al. |
| 5,255,181 | A | 10/1993 | Chapman et al. |
| 5,321,605 | A | 6/1994 | Chapman et al. |
| 5,463,555 | A | 10/1995 | Ward et al. |
| 5,627,764 | A | 5/1997 | Schutzman et al. |
| 5,717,925 | A | 2/1998 | Harper et al. |
| 5,787,237 | A | 7/1998 | Reilly |
| 5,812,987 | A | 9/1998 | Luskin et al. |
| 5,966,695 | A | 10/1999 | Melchione et al. |
| 5,970,465 | A | 10/1999 | Dietrich et al. |
| 5,970,475 | A | 10/1999 | Barnes et al. |
| 5,983,284 | A | 11/1999 | Argade |
| 6,044,134 | A | 3/2000 | De La Huerga |
| 6,047,264 | A | 4/2000 | Fisher et al. |
| 6,052,525 | A | 4/2000 | Carlson et al. |
| 6,058,378 | A | 5/2000 | Clark et al. |

(Continued)

FOREIGN PATENT DOCUMENTS

| | | |
|---|---|---|
| CN | 1501296 | 6/2004 |
| CN | 1609866 | 4/2005 |

(Continued)

OTHER PUBLICATIONS

Annevelink et al.; "Heterogeneous Database Intergration in a Physician Workstation"; 1992; 5 pages.

(Continued)

*Primary Examiner* — Shay S Glass
(74) *Attorney, Agent, or Firm* — Fish & Richardson P.C.

(57) ABSTRACT

A business object model, which reflects data that is used during a given business transaction, is utilized to generate interfaces. This business object model facilitates commercial transactions by providing consistent interfaces that are suitable for use across industries, across businesses, and across different departments within a business during a business transaction. In some operations, software creates, updates, or otherwise processes information related to an individual material bill of material and/or an order tracking view business object.

6 Claims, 92 Drawing Sheets

(56) References Cited

U.S. PATENT DOCUMENTS

| | | | |
|---|---|---|---|
| 6,073,137 | A | 6/2000 | Brown et al. |
| 6,092,196 | A | 7/2000 | Reiche |
| 6,104,393 | A | 8/2000 | Santos-Gomez |
| 6,115,690 | A | 9/2000 | Wong |
| 6,125,391 | A | 9/2000 | Meltzer et al. |
| 6,138,118 | A | 10/2000 | Koppstein et al. |
| 6,154,732 | A | 11/2000 | Tarbox |
| 6,222,533 | B1 | 4/2001 | Notani et al. |
| 6,226,675 | B1 | 5/2001 | Meltzer et al. |
| 6,229,551 | B1 | 5/2001 | Huang |
| 6,275,977 | B1 | 8/2001 | Nagai et al. |
| 6,295,548 | B1 | 9/2001 | Klein et al. |
| 6,308,163 | B1 | 10/2001 | Du et al. |
| 6,311,165 | B1 | 10/2001 | Coutts et al. |
| 6,327,700 | B1 | 12/2001 | Chen et al. |
| 6,331,972 | B1 | 12/2001 | Harris et al. |
| 6,332,163 | B1 | 12/2001 | Bowman-Amuah |
| 6,374,252 | B1 | 4/2002 | Althoff et al. |
| 6,675,252 | B1 | 4/2002 | Cheron et al. |
| 6,401,101 | B1 | 6/2002 | Britton et al. |
| 6,424,979 | B1 | 7/2002 | Livingston et al. |
| 6,434,159 | B1 | 8/2002 | Woodward et al. |
| 6,438,594 | B1 | 8/2002 | Bowman-Amuah |
| 6,442,620 | B1 | 8/2002 | Thatte et al. |
| 6,446,136 | B1 | 9/2002 | Pohlmann et al. |
| 6,457,041 | B1 | 9/2002 | Hutchison |
| 6,496,825 | B1 | 12/2002 | Klein et al. |
| 6,513,019 | B2 | 1/2003 | Lewis |
| 6,523,027 | B1 | 2/2003 | Underwood |
| 6,542,912 | B2 | 4/2003 | Meltzer et al. |
| 6,591,260 | B1 | 7/2003 | Schwarzhoff et al. |
| 6,643,660 | B1 | 11/2003 | Miller et al. |
| 6,725,122 | B2 | 4/2004 | Mori et al. |
| 6,738,747 | B1 | 5/2004 | Tanaka et al. |
| 6,745,229 | B1 | 6/2004 | Gobin et al. |
| 6,763,353 | B2 | 7/2004 | Li et al. |
| 6,775,647 | B1 | 8/2004 | Evans et al. |
| 6,868,370 | B1 | 3/2005 | Burbridge et al. |
| 6,937,992 | B1 | 8/2005 | Benda et al. |
| 6,957,230 | B2 | 10/2005 | Cameron et al. |
| 6,970,844 | B1 | 11/2005 | Bierenbaum |
| 7,020,594 | B1 | 3/2006 | Chacon |
| 7,039,606 | B2 | 5/2006 | Hoffman et al. |
| 7,055,132 | B2 | 5/2006 | Bogdan et al. |
| 7,069,278 | B2 | 6/2006 | Telkowski |
| 7,076,449 | B2 | 7/2006 | Tsunenari et al. |
| 7,131,069 | B1 | 10/2006 | Rush et al. |
| 7,206,768 | B1 | 4/2007 | deGroeve et al. |
| 7,249,157 | B2 | 7/2007 | Stewart et al. |
| 7,249,195 | B2 | 7/2007 | Panec et al. |
| 7,269,569 | B2 | 9/2007 | Spira et al. |
| 7,292,965 | B1 | 11/2007 | Mehta et al. |
| 7,321,864 | B1 | 1/2008 | Gendler |
| 7,363,271 | B2 | 4/2008 | Morimoto |
| 7,379,931 | B2 | 5/2008 | Morinville |
| 7,383,990 | B2 | 6/2008 | Veit |
| 7,406,358 | B2 | 7/2008 | Preiss |
| 7,426,520 | B2 | 9/2008 | Gorelik et al. |
| 7,451,177 | B1 | 11/2008 | Johnson et al. |
| 7,454,362 | B1 | 11/2008 | Hayes et al. |
| 7,481,367 | B2 | 1/2009 | Fees et al. |
| 7,509,278 | B2 | 3/2009 | Jones |
| 7,515,697 | B2 | 4/2009 | Eng et al. |
| 7,516,088 | B2 | 4/2009 | Johnson et al. |
| 7,523,466 | B2 | 4/2009 | DeAngelis |
| 7,536,697 | B2 | 5/2009 | Wiseman et al. |
| 7,559,066 | B2 | 7/2009 | Ho et al. |
| 7,574,383 | B1 | 8/2009 | Parasnis et al. |
| 7,617,128 | B2 | 11/2009 | Greak |
| 7,617,328 | B2 | 11/2009 | Lewis et al. |
| 7,627,504 | B2 | 12/2009 | Brady et al. |
| 7,634,482 | B2 | 12/2009 | Mukherjee et al. |
| 7,641,110 | B2 | 1/2010 | Hursta et al. |
| 7,657,466 | B2 | 2/2010 | Klingenberg et al. |
| 7,657,575 | B2 | 2/2010 | Eberlein et al. |
| 7,689,711 | B2 | 3/2010 | Brouk et al. |
| 7,761,428 | B2 | 7/2010 | Herbst et al. |
| 7,788,319 | B2 | 8/2010 | Schmidt et al. |
| 7,797,204 | B2 | 9/2010 | Balent |
| 7,805,383 | B2 | 9/2010 | Veit et al. |
| 7,813,949 | B2 | 10/2010 | Grendel et al. |
| 7,853,491 | B2 | 12/2010 | Wittmer et al. |
| 7,865,426 | B2 | 1/2011 | Volpert |
| 7,873,965 | B2 | 1/2011 | Hayton et al. |
| 7,895,209 | B2 | 2/2011 | Spence et al. |
| 7,941,236 | B2 | 5/2011 | Spearman |
| 7,962,385 | B2 | 6/2011 | Falk et al. |
| 8,010,376 | B2 | 8/2011 | Buchmann et al. |
| 8,082,243 | B2 | 12/2011 | Gorelik et al. |
| 8,104,681 | B2 | 1/2012 | Eisenson |
| 8,127,035 | B1 | 2/2012 | Hood et al. |
| 8,150,798 | B2 | 4/2012 | Ma et al. |
| 8,185,430 | B2 | 5/2012 | Edwards et al. |
| 8,219,444 | B2 | 7/2012 | Zuerl et al. |
| 8,234,375 | B2 | 7/2012 | Ghadialy et al. |
| 8,326,795 | B2 | 12/2012 | Markovic |
| RE43,905 | E | 1/2013 | Bierenbaum |
| 8,370,272 | B2 | 2/2013 | Wicket et al. |
| 8,396,749 | B2 | 3/2013 | Koegler et al. |
| 8,396,751 | B2 | 3/2013 | Becker et al. |
| 8,423,428 | B2 | 4/2013 | Grendel et al. |
| 8,433,585 | B2 | 4/2013 | Sr et al. |
| 8,463,666 | B2 | 6/2013 | Dorais et al. |
| 8,473,317 | B2 | 6/2013 | Santoso et al. |
| 2001/0042032 | A1 | 11/2001 | Crawshaw et al. |
| 2001/0047372 | A1 | 11/2001 | Gorelik et al. |
| 2002/0013721 | A1 | 1/2002 | Dabbiere et al. |
| 2002/0026394 | A1 | 2/2002 | Savage et al. |
| 2002/0046053 | A1 | 4/2002 | Hare et al. |
| 2002/0052754 | A1 | 5/2002 | Joyce et al. |
| 2002/0065680 | A1 | 5/2002 | Kojima et al. |
| 2002/0072988 | A1 | 6/2002 | Aram |
| 2002/0087481 | A1 | 7/2002 | Harif |
| 2002/0087483 | A1 | 7/2002 | Harif |
| 2002/0099634 | A1 | 7/2002 | Coutts et al. |
| 2002/0107765 | A1 | 8/2002 | Walker |
| 2002/0112171 | A1 | 8/2002 | Ginter et al. |
| 2002/0138318 | A1 | 9/2002 | Ellis et al. |
| 2002/0147668 | A1 | 10/2002 | Smith et al. |
| 2002/0152104 | A1 | 10/2002 | Ojha et al. |
| 2002/0152145 | A1 | 10/2002 | Wanta et al. |
| 2002/0156693 | A1 | 10/2002 | Stewart et al. |
| 2002/0156930 | A1 | 10/2002 | Velasquez |
| 2002/0157017 | A1 | 10/2002 | Mi et al. |
| 2002/0169657 | A1 | 11/2002 | Singh et al. |
| 2002/0184070 | A1 | 12/2002 | Chen et al. |
| 2002/0186876 | A1 | 12/2002 | Jones et al. |
| 2002/0194045 | A1 | 12/2002 | Shay et al. |
| 2003/0004799 | A1 | 1/2003 | Kish |
| 2003/0041178 | A1 | 2/2003 | Brouk et al. |
| 2003/0046639 | A1 | 3/2003 | Fai et al. |
| 2003/0069648 | A1 | 4/2003 | Douglas et al. |
| 2003/0083910 | A1 | 5/2003 | Sayal et al. |
| 2003/0083955 | A1 | 5/2003 | Ookura |
| 2003/0084428 | A1 | 5/2003 | Agostini et al. |
| 2003/0086594 | A1 | 5/2003 | Gross |
| 2003/0097287 | A1 | 5/2003 | Franz et al. |
| 2003/0120502 | A1 | 6/2003 | Robb et al. |
| 2003/0120665 | A1 | 6/2003 | Fox et al. |
| 2003/0126077 | A1 | 7/2003 | Kantor et al. |
| 2003/0167193 | A1 | 9/2003 | Jones et al. |
| 2003/0171962 | A1 | 9/2003 | Hirth et al. |
| 2003/0172007 | A1 | 9/2003 | Helmolt et al. |
| 2003/0172135 | A1 | 9/2003 | Bobick et al. |
| 2003/0172343 | A1 | 9/2003 | Leymater et al. |
| 2003/0177139 | A1 | 9/2003 | Cameron et al. |
| 2003/0195815 | A1 | 10/2003 | Li et al. |
| 2003/0204452 | A1 | 10/2003 | Wheeler |
| 2003/0204637 | A1 | 10/2003 | Chong |
| 2003/0208389 | A1 | 11/2003 | Kurihara et al. |
| 2003/0212614 | A1 | 11/2003 | Chu et al. |
| 2003/0216978 | A1 | 11/2003 | Sweeney et al. |
| 2003/0220835 | A1 | 11/2003 | Barnes, Jr. |
| 2003/0220875 | A1 | 11/2003 | Lam et al. |

(56) References Cited

U.S. PATENT DOCUMENTS

2003/0229522 A1 12/2003 Thompson et al.
2003/0229550 A1 12/2003 DiPrima et al.
2003/0233295 A1 12/2003 Tozawa et al.
2003/0236748 A1 12/2003 Gressel et al.
2004/0002883 A1 1/2004 Andrews et al.
2004/0006653 A1 1/2004 Kamen et al.
2004/0015366 A1 1/2004 Wiseman et al.
2004/0024662 A1 2/2004 Gray et al.
2004/0024862 A1 2/2004 Wall et al.
2004/0034577 A1 2/2004 Van Hoose et al.
2004/0039665 A1 2/2004 Ouchi
2004/0073510 A1 4/2004 Logan
2004/0083201 A1 4/2004 Sholl et al.
2004/0083233 A1 4/2004 Willoughby
2004/0122730 A1 6/2004 Tucciarone et al.
2004/0133445 A1 7/2004 Rajan et al.
2004/0138942 A1 7/2004 Pearson et al.
2004/0148227 A1 7/2004 Tabuchi et al.
2004/0167894 A1 8/2004 Ziv
2004/0172360 A1 9/2004 Mabrey et al.
2004/0186891 A1 9/2004 Panec et al.
2004/0187140 A1 9/2004 Aigner et al.
2004/0220910 A1 11/2004 Zang et al.
2004/0254945 A1 12/2004 Schmidt et al.
2004/0267597 A1 12/2004 Kobrosly et al.
2004/0267714 A1 12/2004 Frid et al.
2005/0005190 A1 1/2005 Ofir et al.
2005/0015273 A1 1/2005 Iyer
2005/0021366 A1 1/2005 Pool et al.
2005/0033588 A1 2/2005 Ruiz et al.
2005/0038718 A1 2/2005 Barnes et al.
2005/0038744 A1 2/2005 Viijoen
2005/0049903 A1 3/2005 Raja
2005/0055369 A1 3/2005 Gorelik et al.
2005/0065987 A1 3/2005 Telkowski et al.
2005/0066240 A1 3/2005 Sykes et al.
2005/0071262 A1 3/2005 Kobeh et al.
2005/0080640 A1 4/2005 Bhaskaran et al.
2005/0102250 A1 5/2005 Carr et al.
2005/0108085 A1 5/2005 Dakar et al.
2005/0108168 A1 5/2005 Halpin et al.
2005/0108276 A1 5/2005 Sriram
2005/0131947 A1 6/2005 Laub et al.
2005/0149539 A1 7/2005 Cameron et al.
2005/0159997 A1 7/2005 John
2005/0171833 A1 8/2005 Jost et al.
2005/0182639 A1 8/2005 Dale
2005/0187797 A1 8/2005 Johnson
2005/0187866 A1 8/2005 Lee
2005/0194431 A1 9/2005 Fees et al.
2005/0194439 A1 9/2005 Zuerl et al.
2005/0197849 A1 9/2005 Fotteler et al.
2005/0197851 A1 9/2005 Veit
2005/0197878 A1 9/2005 Fotteler et al.
2005/0197881 A1 9/2005 Fotteler et al.
2005/0197882 A1 9/2005 Fotteler et al.
2005/0197886 A1 9/2005 Veit
2005/0197887 A1 9/2005 Zuerl et al.
2005/0197896 A1 9/2005 Veit et al.
2005/0197897 A1 9/2005 Veit et al.
2005/0197898 A1 9/2005 Veit et al.
2005/0197899 A1 9/2005 Veit et al.
2005/0197900 A1 9/2005 Veit
2005/0197901 A1 9/2005 Veit et al.
2005/0197902 A1 9/2005 Veit
2005/0197913 A1 9/2005 Grendel et al.
2005/0197928 A1 9/2005 Fotteler et al.
2005/0197941 A1 9/2005 Veit
2005/0209732 A1 9/2005 Audimoolam et al.
2005/0210406 A1 9/2005 Biwer et al.
2005/0216321 A1 9/2005 Veit
2005/0216359 A1 9/2005 Welter et al.
2005/0216371 A1 9/2005 Fotteler et al.
2005/0216421 A1 9/2005 Barry et al.
2005/0222888 A1 10/2005 Hosoda et al.
2005/0222896 A1 10/2005 Rhyne et al.
2005/0222945 A1 10/2005 Pannicke et al.
2005/0228821 A1 10/2005 Gold
2005/0234754 A1 10/2005 Veit
2005/0240488 A1 10/2005 Grendel et al.
2005/0246240 A1 11/2005 Padilla
2005/0256753 A1 11/2005 Veit et al.
2005/0278693 A1 12/2005 Brunell et al.
2006/0004934 A1 1/2006 Guldner et al.
2006/0005098 A1 1/2006 Lotz et al.
2006/0020515 A1 1/2006 Lee et al.
2006/0026552 A1 2/2006 Mazzitelli et al.
2006/0026586 A1 2/2006 Remmel et al.
2006/0036941 A1 2/2006 Neil
2006/0047574 A1 3/2006 Sundaram et al.
2006/0047598 A1* 3/2006 Hansen .......................... 705/37
2006/0059005 A1 3/2006 Horn et al.
2006/0059059 A1 3/2006 Horn et al.
2006/0059060 A1 3/2006 Horn et al.
2006/0069598 A1 3/2006 Schweitzer et al.
2006/0069629 A1 3/2006 Schweitzer et al.
2006/0069632 A1 3/2006 Kahn et al.
2006/0074728 A1 4/2006 Schweitzer et al.
2006/0080338 A1 4/2006 Seubert et al.
2006/0085336 A1 4/2006 Seubert et al.
2006/0085412 A1 4/2006 Johnson et al.
2006/0085450 A1 4/2006 Seubert et al.
2006/0089885 A1 4/2006 Finke et al.
2006/0095373 A1 5/2006 Venkatasubramanian et al.
2006/0106824 A1 5/2006 Stuhec
2006/0184435 A1 8/2006 Mostowfi
2006/0195563 A1 8/2006 Chapin et al.
2006/0212376 A1 9/2006 Snyder et al.
2006/0280302 A1 12/2006 Baumann et al.
2006/0282360 A1 12/2006 Kahn et al.
2007/0016601 A1 1/2007 Cameron et al.
2007/0027742 A1 2/2007 Emuchay et al.
2007/0027891 A1 2/2007 Schauerte et al.
2007/0043583 A1 2/2007 Davulcu et al.
2007/0055688 A1 3/2007 Blattner
2007/0061154 A1 3/2007 Markvoort et al.
2007/0067411 A1 3/2007 Angelov
2007/0067753 A1 3/2007 Pocklington et al.
2007/0078799 A1 4/2007 Huber-Buschbeck et al.
2007/0100491 A1 5/2007 Burrell et al.
2007/0112574 A1 5/2007 Greene
2007/0118391 A1 5/2007 Malaney et al.
2007/0124227 A1 5/2007 Dembo et al.
2007/0129978 A1 6/2007 Shirasu et al.
2007/0132585 A1 6/2007 Llorca et al.
2007/0150387 A1 6/2007 Seubert et al.
2007/0150836 A1 6/2007 Deggelmann et al.
2007/0156428 A1 7/2007 Brecht-Tillinger et al.
2007/0156545 A1 7/2007 Lin
2007/0156552 A1 7/2007 Manganiello
2007/0156690 A1 7/2007 Moser et al.
2007/0165622 A1 7/2007 O'Rourke et al.
2007/0174811 A1 7/2007 Kaetker et al.
2007/0214065 A1 9/2007 Kahlon et al.
2007/0219864 A1 9/2007 Vollrath et al.
2007/0219941 A1 9/2007 Schnurr et al.
2007/0225949 A1 9/2007 Sundararajan et al.
2007/0226066 A1 9/2007 Brunner et al.
2007/0226090 A1 9/2007 Stratton
2007/0233574 A1 10/2007 Koegler et al.
2007/0255639 A1 11/2007 Seifert
2007/0265860 A1 11/2007 Herrmann et al.
2007/0265862 A1 11/2007 Freund et al.
2007/0288250 A1 12/2007 Lemcke et al.
2007/0294159 A1 12/2007 Cottle
2007/0295803 A1 12/2007 Levine et al.
2008/0005012 A1 1/2008 Deneef
2008/0016242 A1 1/2008 Panec et al.
2008/0021754 A1 1/2008 Horn et al.
2008/0027836 A1 1/2008 Chapin
2008/0040243 A1 2/2008 Chang et al.
2008/0046104 A1 2/2008 Van Camp et al.
2008/0046421 A1 2/2008 Bhatia et al.
2008/0065443 A1 3/2008 Gorur et al.

(56) References Cited

U.S. PATENT DOCUMENTS

| | | | |
|---|---|---|---|
| 2008/0120129 | A1 | 5/2008 | Seubert et al. |
| 2008/0120190 | A1 | 5/2008 | Joao et al. |
| 2008/0120204 | A1 | 5/2008 | Conner et al. |
| 2008/0120206 | A1 | 5/2008 | Weiler et al. |
| 2008/0120313 | A1 | 5/2008 | O'Brien et al. |
| 2008/0133303 | A1 | 6/2008 | Singh et al. |
| 2008/0144791 | A1 | 6/2008 | Harifi et al. |
| 2008/0154969 | A1 | 6/2008 | DeBie |
| 2008/0162266 | A1 | 7/2008 | Griessmann et al. |
| 2008/0184265 | A1 | 7/2008 | Kasi et al. |
| 2008/0189360 | A1 | 8/2008 | Kiley et al. |
| 2008/0196108 | A1 | 8/2008 | Dent et al. |
| 2008/0208805 | A1 | 8/2008 | Wang et al. |
| 2008/0215354 | A1 | 9/2008 | Halverson et al. |
| 2008/0243578 | A1 | 10/2008 | Veit |
| 2008/0263051 | A1 | 10/2008 | Kanyetzna et al. |
| 2008/0288317 | A1 | 11/2008 | Kakar |
| 2008/0300962 | A1 | 12/2008 | Cawston et al. |
| 2008/0314981 | A1 | 12/2008 | Eisenson |
| 2009/0006203 | A1 | 1/2009 | Fordyce et al. |
| 2009/0063287 | A1 | 3/2009 | Tribout et al. |
| 2009/0077074 | A1 | 3/2009 | Hosokawa |
| 2009/0089198 | A1 | 4/2009 | Kroutik |
| 2009/0094274 | A1 | 4/2009 | Gorelik et al. |
| 2009/0144624 | A1 | 6/2009 | Barnes, Jr. |
| 2009/0164497 | A1 | 6/2009 | Steinmaier et al. |
| 2009/0192926 | A1 | 7/2009 | Tarapata |
| 2009/0193432 | A1 | 7/2009 | McKegney et al. |
| 2009/0199172 | A1 | 8/2009 | Zhong et al. |
| 2009/0222360 | A1 | 9/2009 | Schmitt et al. |
| 2009/0222749 | A1 | 9/2009 | Marinescu et al. |
| 2009/0248429 | A1 | 10/2009 | Doenig et al. |
| 2009/0248430 | A1 | 10/2009 | Hubert et al. |
| 2009/0248431 | A1 | 10/2009 | Schoknecht et al. |
| 2009/0248463 | A1 | 10/2009 | Piochon et al. |
| 2009/0248473 | A1 | 10/2009 | Doenig et al. |
| 2009/0248487 | A1 | 10/2009 | Santoso et al. |
| 2009/0248547 | A1 | 10/2009 | Doenig et al. |
| 2009/0248558 | A1 | 10/2009 | Hollberg et al. |
| 2009/0248586 | A1 | 10/2009 | Kaisermayr et al. |
| 2009/0248698 | A1 | 10/2009 | Rehmann |
| 2009/0249358 | A1 | 10/2009 | Schuette |
| 2009/0249362 | A1 | 10/2009 | Lindemann et al. |
| 2009/0254971 | A1 | 10/2009 | Herz et al. |
| 2009/0271245 | A1 | 10/2009 | Joshi et al. |
| 2009/0276338 | A1 | 11/2009 | Masermann et al. |
| 2009/0300544 | A1 | 12/2009 | Psenka et al. |
| 2009/0300578 | A1 | 12/2009 | Neil |
| 2009/0326988 | A1 | 12/2009 | Barth et al. |
| 2009/0327009 | A1 | 12/2009 | Schmitt et al. |
| 2009/0327105 | A1 | 12/2009 | Moussa et al. |
| 2009/0327106 | A1 | 12/2009 | Bartelt et al. |
| 2010/0001834 | A1 | 1/2010 | Brunswig et al. |
| 2010/0014510 | A1 | 1/2010 | Boreli et al. |
| 2010/0070391 | A1 | 3/2010 | Storr et al. |
| 2010/0070395 | A1 | 3/2010 | Elkeles et al. |
| 2010/0106555 | A1 | 4/2010 | Mneimneh et al. |
| 2010/0131379 | A1 | 5/2010 | Dorais et al. |
| 2010/0131394 | A1 | 5/2010 | Rutsch et al. |
| 2010/0153297 | A1 | 6/2010 | Haaf et al. |
| 2010/0161366 | A1 | 6/2010 | Clemens et al. |
| 2010/0161425 | A1 | 6/2010 | Sideman |
| 2010/0169888 | A1 | 7/2010 | Hare et al. |
| 2010/0198631 | A1 | 8/2010 | Edwards et al. |
| 2010/0217645 | A1 | 8/2010 | Jin et al. |
| 2010/0217820 | A1 | 8/2010 | Brouk et al. |
| 2010/0218245 | A1 | 8/2010 | Brouk et al. |
| 2010/0241729 | A1 | 9/2010 | Angelov |
| 2010/0306536 | A1 | 12/2010 | Brouk et al. |
| 2011/0046775 | A1 | 2/2011 | Bailey et al. |
| 2011/0077999 | A1 | 3/2011 | Becker et al. |
| 2011/0078048 | A1 | 3/2011 | Becker et al. |
| 2011/0088000 | A1 | 4/2011 | Mackay |
| 2011/0153505 | A1 | 6/2011 | Brunswig et al. |
| 2011/0153767 | A1 | 6/2011 | Coldicott et al. |
| 2011/0196717 | A1 | 8/2011 | Colliat et al. |
| 2011/0276360 | A1 | 11/2011 | Barth et al. |
| 2011/0276636 | A1 | 11/2011 | Cheng et al. |
| 2011/0307289 | A1 | 12/2011 | Hosur et al. |
| 2011/0307353 | A1 | 12/2011 | Ringl et al. |
| 2012/0117000 | A1 | 5/2012 | Haaf et al. |
| 2012/0118983 | A1 | 5/2012 | Harris |
| 2012/0191604 | A1 | 7/2012 | Allin et al. |
| 2013/0021978 | A1 | 1/2013 | Tamura et al. |
| 2013/0144741 | A1 | 6/2013 | Becker et al. |
| 2013/0159146 | A1 | 6/2013 | Schmitt et al. |

FOREIGN PATENT DOCUMENTS

| | | |
|---|---|---|
| CN | 1632806 | 6/2005 |
| CN | 1765138 | 4/2006 |
| CN | 1767537 | 5/2006 |
| CN | 101174957 | 5/2008 |
| CN | 101288092 | 10/2008 |
| WO | WO 2008/005102 | 1/2008 |

OTHER PUBLICATIONS

Arsanjani, Ali; "Developing and Integrating Enterprise Components and Services"; Communications of the ACM; vol. 45, No. 10; Oct. 2002; pp. 31-34.

Aversano, Lerina et al.; "Introducing eServices in Business Process Models"; SEKE '02; Ischia Italy; Jul. 15-19, 2002; pp. 481-488.

Baker, Stacy; "Benefits of Assortment Planning"; Assortment Planning for Apparel Retailers—2005 Management Briefing; Just Style; Jun. 2005; 3 pages.

Bastide, Remi et al.; "Formal Specification of CORBA Services: Experience and Lessons Learned"; 2000; pp. 105-117.

Born, Marc et al.; "Customizing UML for Component Design"; www.dot-profile.de; UML Workshop, Palm Springs, CA; Nov. 2000.

Bratthall, Lars G. et al.; "Integrating Hundreds of Products through One Architecture—The Industrial IT Architecture"; ICSE '02; Orlando, Florida; May 19-25, 2002; pp. 604-614.

Bussler, Christoph; "The Role of B2B Engines in B2B Integration Architectures"; SIGMOD Record; vol. 31, No. 1; Mar. 2002; pp. 67-72.

Carlson, David A.; "Designing XML Vocabularies with UML"; OOPSLA 2000 Companion; Minneapolis, Minnesota; 2000; pp. 95-96.

Coen-Porisini, Alberto et al.; "A Formal Approach for Designing CORBA-Based Applications"; ACM Transactions on Software Engineering and Methodology; vol. 12, No. 2; Apr. 2003; pp. 107-151.

Cole, James et al.; "Extending Support for Contracts in ebXML"; IEEE; 2001; pp. 119-127.

Damodaran, Suresh; "B2B Integration over the Internet with XML—RosettaNet Successes and Challenges"; WWW2004; May 17-22, 2004; pp. 188-195.

Definition of "header" and "message header"; Newton's Telecom Dictionary; 18th Edition; 2002; pp. 347, 464.

Diehl et al.; "Service Architecture for an Object-Oriented Next Generation Profile Register"; date unknown; 8 pages.

DiNitto, Elisabetta et al.; "Deriving Executable Process Descriptions from UML"; ICSE '02; May 19-25, 2002; pp. 155-165.

Dogac, Asuman et al.; "An ebXML Infrastructure Implementation through UDDI Registries and RosettaNet PIPs"; ACM SIGMOD; Madison, Wisconsin; Jun. 4-6, 2002; pp. 512-523.

"DOTS Inc. Selects Compass Software's smartmerchandising for Merchandise Planning and Assortment Planning"; PR Newswire; Dec. 11, 2002; 2 pages.

Eyal, Anat et al.; "Integrating and Customizing Heterogeneous E-Commerce Applications"; The VLDB Journal; Aug. 2001; pp. 16-38.

Fingar, Peter; "Component-Based Frameworks for E-Commerce"; Communications of the ACM; vol. 43, No. 10; Oct. 2000; pp. 61-66.

Fremantle, Paul et al.; "Enterprise Services"; Communications of the ACM; vol. 45, No. 10; Oct. 2002; pp. 77-79.

FSML—Financial Services Markup Language (Jul. 14, 1999) http://xml.coverpages.org/FSML-v1500a.pdf; pp. 1-159 (2 parts).

(56) References Cited

OTHER PUBLICATIONS

Gillibrand, David; "Essential Business Object Design"; Communications of the ACM; vol. 43, No. 2; Feb. 2000; pp. 117-119.
Glushko, Robert J. et al.; "An XML Framework for Agent-Based E-Commerce"; Communications of the ACM; vol. 42, No. 3; Mar. 1999; pp. 106-114.
Gokhale, Aniruddha et al.; "Applying Model-Integrated Computing to Component Middleware and Enterprise Applications"; Communications of the ACM; vol. 45, No. 10; Oct. 2002; pp. 65-70.
Gosain, Sanjay et al.; "The Impact of Common E-Business Interfaces"; Communications of the ACM; vol. 46, No. 2; Dec. 2003; pp. 186-195.
Gruhn, Volker et al.; "Workflow Management Based on Process Model Repositories"; IEEE 1998; pp. 379-388.
Han, Zaw Z. et al.; "Interoperability from Electronic Commerce to Litigation Using XML Rules"; 2003; pp. 93-94.
Hasselbring, Wilhelm; "Information System Integration"; Communications of the ACM; vol. 43, No. 6; Jun. 2000; pp. 33-38.
He, Ning et al.; "B2B Contract Implementation Using Windows DNS"; 2001; pp. 71-79.
"Header", Newton's Telecom Dictionary; 12th Edition, 2004; pp. 389-390.
Hogg, K. et al.; "An Evaluation of Web Services in the Design of a B2B Application"; 27th Australasian Computer Science Conference; Dunedin, New Zealand; 2004; pp. 331-340.
Huhns, Michael N. et al.; "Automating Supply-Chain Mangement"; Jul. 15-19, 2002; pp. 1017-1024.
Jaeger, Dirk et al.; "Using UML for Software Process Modeling"; 1999; pp. 91-108.
Kappel, Gerti et al.; "A Framework for Workflow Management Systems Based on Objects, Rules, and Roles"; ACM Computing Surveys; ACM Press; vol. 32; Mar. 2000; 5 pages.
Karp, Alan H.; "E-speak E-xplained"; Communications of the ACM; vol. 46, No. 7; Jul. 2003; pp. 113-118.
Ketabchi et al.; "Object-Oriented Database Management Support for Software Maintenance and Reverse Engineering"; Department of Electrical Engineering and Computer Science, Santa Clara University; 1989; 4 pages.
Khosravi, Navid et al.; "An Approach to Building Model Driven Enterprise Systems in Nebras Enterprise Framework"; OOPSLA'02: Companion of the 17th Annual ACM SIGPLAN Conference on Object-Oriented Programming, Systems, Languages, and Applications; Nov. 4-8, 2002; pp. 32-33.
Kim, Dan Jong et al.; "A Comparison of B2B E-Service Solutions"; Communications of the ACM; vol. 46, No. 12; Dec. 2003; pp. 317-324.
Kim, HyoungDo; "Conceptual Modeling and Specification Generation for B2B Business Processes Based on ebXML"; SIGMOD Record; vol. 31, No. 1; Mar. 2002; pp. 37-42.
Lee, Jinyoul et al.; "Enterprise Integration with ERP and EAI"; Communications of the ACM; vol. 46, No. 2; Feb. 2003; pp. 54-60.
Levi, Keith et al.; "A Goal-Driven Approach to Enterprise Component Identification and Specification"; Communications of the ACM; vol. 45, No. 10; Oct. 2002; pp. 45-52.
Lynn, Chris; "Sony Enters Brand Asset Management Market"; The Seybold Report; Analyzing Publishing Technologies; Aug. 4, 2004; <www.Seybold365.com>; 3 pages.
Maamar, Zakaria et al.; "Toward Intelligent Business Objects"; Communications of the ACM; vol. 43, No. 10; Oct. 2000; pp. 99-101.
Medjahed, Brahim et al.; "Composing Web Services on the Semantic Web"; The VLDB Journal; vol. 12, No. 4, Sep. 23, 2003; pp. 333-351.
Medjahed, Brahim et al; "Business-to-Business Interactions: Issues and Enabling Technologies"; The VLDB Journal; vol. 12, No. 1; Apr. 3, 2003; pp. 59-89.
Meltzer, Bart et al.; "XML and Electronic Commerce: Enabling the Network Economy"; SIGMOD Record; ACM Press; vol. 27, No. 4; Dec. 1998; pp. 21-24.
Microsoft; "Creating an XML Web Service Proxy"; 2001; mshelp://ms.msdnqtr.2003apr.1033/cpguide/html/cpconcreatingwebserviceproxy.htm; 3 pages.
Proceedings of OMG Workshops; http://www.omg.org/news/meetings/workshops/proceedings.htm; pp. 1-3. Retrieved on Mar. 17, 2005.
Quix, Christoph et al.; "Business Data Management for Business-to-Business Electronic Commerce"; SIGMOD Record; vol. 31, No. 1; Mar. 2002; pp. 49-54.
SAP Structured Entity Relationship Model (SAP-SERM) for R/3 System Release 4.0 (Part 1); Dec. 1998; 5954 pages.
SAP Structured Entity Relationship Model (SAP-SERM) for R/3 System Release 4.0 (Part 2); Dec. 1998; 7838 pages.
SAP Structured Entity Relationship Model (SAP-SERM) for R/3 System Release 4.0 Introduction and Index; Dec. 1998; 26 pages.
SAP; "BC-Central Maintenance and Transport Objects"; Release 4.6C; Apr. 200; 15 pages.
Schulze, Wolfgang et al.; "Standardising on Workflow-Management—The OMG Workflow Management Facility"; SIGGROUP Bulletin; vol. 19, No. 1; Apr. 1998; pp. 24-30.
Siegel, Jon; "OMG Overview: CORBA and the OMA in Enterprise Computing"; Communications of the ACM; vol. 41, No. 10; Oct. 1998; pp. 37-43.
Skonnard, Aaron et al.; "BizTalk Server 2000: Architecture and Tools for Trading Partner Integration"; MSDn Magazine; 2000; ms-help://ms.msdnqtr.2003apr.1033/dnmag00/htmal/biztalk.htm; 7 pages.
Soederstroem, Eva; "Standardising the Business Vocabulary of Standards"; SAC, Madrid, Spain; 2002; pp. 1048-1052.
Sprott, David; "Componentizing the Enterprise Application Packages"; Communications of the ACM; vol. 43, No. 4; Apr. 2000; pp. 63-69.
Statement in Accordance with the Notice from the European Patent Office dated Oct. 1, 2007 Concerning Business Methods—EPC; Official Journal of the European Patent Office; Munich; Nov. 1, 2007; pp. 592-593.
Stonebraker, Michael; "Too Much Middleware"; SIGMOD Record; vol. 31, No. 1; Mar. 2002; pp. 97-106.
Stumptner, Markus et al.; "On the Road to Behavior-Based Integration"; First Asia-Pacific Conferences on Conceptual Modelling; Dunedin, New Zealand; Jan. 2004; pp. 15-22.
Sutherland, Jeff; "Business Objects in Corporate Information Systems"; ACM Computing Surveys; vol. 27, No. 2; Jun. 1995; pp. 274-276.
Sutherland, Jeff; "Why I Love the OMG: Emergence of a Business Object Component Architecture"; StandardView; vol. 6, No. 1; Mar. 1998; pp. 4-13.
Tenenbaum, Jay M. et al.; "Eco System: An Internet Commerce Architecture"; IEEE; May 1997; pp. 48-55.
Terai, Koichi et al.; "Coordinating Web Services Based on Business Models"; 2003; pp. 473-478.
Trastour, David et al.; "Semantic Web Support for the Business-to-Business E-Commerce Lifecycle"; WWW2002, Honolulu, Hawaii; May 7-11, 2002; pp. 89-98.
"UML in the .com Enterprise: Modeling CORBA, Components, XML/XMI and Metadata Workshop"; <http://www.omg.org/news/meetings/workshops/uml_presentations.htm> retrieved on Mar. 17, 2005.
"Visual and Quantitative Assortment Planning Applications Drive Partnership and Profit"; PR Newswire; Jan. 12, 2006; 3 pages.
Webster's Revised Unabridged Dictionary (1913+1828); Def. "merchandise"; <http://machaut.uchicago.edu/?resource=Webster%27s&word=merchandise&use1913=on&u>. Retrieved on Sep. 1, 2009.
Yang, J. et al.; "Service Deployment for Virtual Enterprises"; IEEE; 2001; pp. 107-115.
Yang, Jian et al.; "Interoperation Support for Electronic Business"; Communications of the ACM; vol. 43, No. 6; Jun. 2000; pp. 39-47.
Zencke, Peter; "Engineering a Business Platform"; SAP AG 2005; Engineering BPP; [Online] previously available at URL www.sap.com/community/pub/webcast/2006_01_16_Analyst_Summit_Vegas/2006_01_16_Analyst_Summit_Vegas_009.pdf ; 36 pages.
Communication Pursuant to Article 94(3) EPC issued in related European Application No. 05757432.9 on Jan. 26, 2009; 4 pages.
Communication Pursuant to Rules 70(2) and 70a(2) EPC issued in related European Application No. 07835755.5 on Feb. 28, 2011; 6 pages.

(56) References Cited

OTHER PUBLICATIONS

International Preliminary Report on Patentability under Chapter I issued in International Application No. PCT/US2005/019961 on Dec. 4, 2006; 6 pages.
International Preliminary Report on Patentability under Chapter I issued in International Application No. PCT/US2005/021481 on Dec. 20, 2006; 6 pages.
International Preliminary Report on Patentability under Chapter I issued in International Application No. PCT/US2005/021481 on Jul. 15, 2008, 5 pages.
International Preliminary Report on Patentability under Chapter I issued in International Application No. PCT/US2005/022137 on Dec. 28, 2006; 5 pages.
International Preliminary Report on Patentability under Chapter I issued in International Application No. PCT/US2007/011378 on Nov. 17, 2008; 11 pages.
International Search Report and Written Opinion of the International Searching Authority issued in International Application No. PCT/CN2010/073856 on Mar. 17, 2011; 8 pages.
International Search Report and Written Opinion of the International Searching Authority issued in International Application No. PCT/CN2010/073864 on Mar. 3, 2011; 8 pages.
International Search Report and Written Opinion of the International Searching Authority issued in International Application No. PCT/CN2010/073868 on Mar. 17, 2011; 10 pages.
International Search Report and Written Opinion of the International Searching Authority issued in International Application No. PCT/IB2006/001401 on Aug. 27, 2008; 8 pages.
International Search Report and Written Opinion of the International Searching Authority issued in International Application No. PCT/US2005/019961 on Sep. 22, 2005; 8 pages.
International Search Report and Written Opinion of the International Searching Authority issued in International Application No. PCT/US2005/021481 on Apr. 11, 2006; 7 pages.
International Search Report and Written Opinion of the International Searching Authority issued in International Application No. PCT/US2005/021481 on May 29, 2007; 6 pages.
International Search Report and Written Opinion of the International Searching Authority issued in International Application No. PCT/US2005/022137 on May 12, 2006; 7 pages.
International Search Report and Written Opinion of the International Searching Authority issued in International Application No. PCT/US2005/022137 on Sep. 23, 2005; 7 pages.
International Search Report and Written Opinion of the International Searching Authority issued in International Application No. PCT/US2007/011378 on Apr. 30, 2008; 17 pages.
Supplementary European Search Report issued in related European Application No. 05766672.9 on Oct. 6, 2009; 3 pages.
Supplementary European Search Report issued in related European Application No. 05823434.5 on Sep. 28, 2009; 3 pages.
Notice of Allowance issued in related U.S. Appl. No. 11/864,866 on Jul. 22, 2011; 6 pages.
Notice of Allowance issued in related U.S. Appl. No. 12/060,178 on Dec. 6, 2010; 4 pages.
Notice of Allowance issued in related U.S. Appl. No. 11/145,464 on Feb. 23, 2011; 7 pages.
Notice of Allowance issued in related U.S. Appl. No. 11/145,464 on Nov. 1, 2010; 4 pages.
Notice of Allowance issued in related U.S. Appl. No. 11/166,065 on Sep. 20, 2010; 6 pages.
Notice of Allowance issued in related U.S. Appl. No. 11/364,538 on Dec. 13, 2010; 5 pages.
Notice of Allowance issued in related U.S. Appl. No. 11/364,538 on Jul. 26, 2011; 6 pages.
Notice of Allowance issued in related U.S. Appl. No. 11/731,857 on Apr. 11, 2011; 8 pages.
Notice of Allowance issued in related U.S. Appl. No. 11/731,857 on Nov. 29, 2010; 4 pages.
Notice of Allowance issued in related U.S. Appl. No. 11/775,821 on Feb. 4, 2011; 4 pages.
Notice of Allowance issued in related U.S. Appl. No. 11/775,821 on Jul. 16, 2010; 4 pages.
Notice of Allowance issued in related U.S. Appl. No. 11/775,821 on Oct. 22, 2010; 4 pages.
Notice of Allowance issued in related U.S. Appl. No. 11/803,178 on May 17, 2011; 13 pages.
Notice of Allowance issued in related U.S. Appl. No. 11/864,832 on Aug. 23, 2010; 4 pages.
Notice of Allowance issued in related U.S. Appl. No. 11/864,832 on Dec. 3, 2010; 9 pages.
Notice of Allowance issued in related U.S. Appl. No. 11/864,832 on Jul. 7, 2011;11 pages.
Notice of Allowance issued in related U.S. Appl. No. 11/864,832 on Mar. 24, 2010; 11 pages.
Notice of Allowance issued in related U.S. Appl. No.. 12/147,449 on Apr. 28, 2011; 9 pages.
Notice of Allowance issued in U.S. Appl. No. 11/155,368 on Mar. 14, 2011; 7 pages.
Notice of Allowance issued in U.S. Appl. No. 11/155,368 on Oct. 7, 2010; 4 pages.
Notice of Allowance issued in U.S. Appl. No. 11/166,065 on Mar. 8, 2011; 5 pages.
Notice of Allowance issued in U.S. Appl. No. 12/323,139 on Mar. 4, 2011; 13 pages.
Advisory Action issued in U.S. Appl. No. 11/155,368 on Mar. 31, 2010; 3 pages.
Office Action issued in related U.S. Appl. No. 11/640,422 on Apr. 2, 2009; 13 pages.
Office Action issued in related U.S. Appl. No. 12/060,178 on Dec. 7, 2009; 6 pages.
Office Action issued in related U.S. Appl. No. 12/060,178 on May 25, 2010; 19 pages.
Office Action issued in related U.S. Appl. No. 11/145,464 on Aug. 5, 2009; 31 pages.
Office Action issued in related U.S. Appl. No. 11/145,464 on Feb. 5, 2010; 57 pages.
Office Action issued in related U.S. Appl. No. 11/145,464 on Jan. 22, 2009; 30 pages.
Office Action issued in related U.S. Appl. No. 11/155,368 on Dec. 10, 2009; 43 pages.
Office Action issued in related U.S. Appl. No. 11/155,368 on May 14, 2009; 6 pages.
Office Action issued in related U.S. Appl. No. 11/166,065 on Jun. 24, 2009; 6 pages.
Office Action issued in related U.S. Appl. No. 11/166,065 on Mar. 3, 2010; 25 pages.
Office Action issued in related U.S. Appl. No. 11/364,538 on Aug. 4, 2009; 5 pages.
Office Action issued in related U.S. Appl. No. 11/364,538 on Mar. 4, 2010; 40 pages.
Office Action issued in related U.S. Appl. No. 11/640,422 on Dec. 30, 2009; 9 pages.
Office Action issued in related U.S. Appl. No. 11/731,857 on Feb. 4, 2010; 22 pages.
Office Action issued in related U.S. Appl. No. 11/731,857 on May 15, 2009; 11 pages.
Office Action issued in related U.S. Appl. No. 11/775,821 on Jan. 22, 2010; 16 pages.
Office Action issued in related U.S. Appl. No. 11/803,178 on Jun. 29, 2009; 5 pages.
Office Action issued in related U.S. Appl. No. 11/803,178 on Mar. 4, 2010; 43 pages.
Office Action issued in related U.S. Appl. No. 11/864,786 on Jun. 22, 2009; 7 pages.
Office Action issued in related U.S. Appl. No. 11/864,786 on Mar. 3, 2010; 12 pages.
Office Action issued in related U.S. Appl. No. 11/864,832 on Sep. 18, 2009; 14 pages.
Office Action issued in related U.S. Appl. No. 11/864,863 on Jul. 21, 2011; 29 pages.
Office Action issued in related U.S. Appl. No. 11/864,866 on Feb. 3, 2011; 20 pages.

(56) References Cited

OTHER PUBLICATIONS

Office Action issued in related U.S. Appl. No. 11/864,871 on Apr. 21, 2010; 20 pages.
Office Action issued in related U.S. Appl. No. 11/864,871 on Oct. 1, 2010; 30 pages.
Office Action issued in related U.S. Appl. No. 12/059,804 on Apr. 28, 2011; 14 pages.
Office Action issued in related U.S. Appl. No. 12/059,867 on Aug. 18, 2009; 37 pages.
Office Action issued in related U.S. Appl. No. 12/059,867 on Feb. 22, 2010; 24 pages.
Office Action issued in related U.S. Appl. No. 12/059,971 on May 18, 2011; 13 pages.
Office Action issued in related U.S. Appl. No. 12/059,971 on Nov. 4, 2010; 20 pages.
Office Action issued in related U.S. Appl. No. 12/060,054 on Jun. 29, 2011; 15 pages.
Office Action issued in related U.S. Appl. No. 12/060,062 on Jul. 13, 2011; 16 pages.
Office Action issued in related U.S. Appl. No. 12/060,149 on Aug. 26, 2010; 15 pages.
Office Action issued in related U.S. Appl. No. 12/060,149 on Feb. 4, 2011; 19 pages.
Office Action issued in related U.S. Appl. No. 12/060,155 on May 10, 2011; 8 pages.
Office Action issued in related U.S. Appl. No. 12/060,171 on Aug. 11, 2009; 11 pages.
Office Action issued in related U.S. Appl. No. 12/060,171 on Jan. 26, 2011; 17 pages.
Office Action issued in related U.S. Appl. No. 12/060,171 on Jul. 1, 2010; 19 pages.
Office Action issued in related U.S. Appl. No. 12/060,171 on Mar. 19, 2010; 10 pages.
Office Action issued in related U.S. Appl. No. 12/060,192 on Apr. 14, 2011; 18 pages.
Office Action issued in U.S. Appl. No. 12/147,399 on Jan. 26, 2011; 16 pages.
Office Action issued in U.S. Appl. No. 12/334,175 on May 27, 2011; 12 pages.
Office Action issued in U.S. Appl. No. 11/640,422 on May 14, 2010; 12 pages.
Office Action issued in U.S. Appl. No. 11/864,811 on Jul. 26, 2011; 7 pages.
Office Action issued in U.S. Appl. No. 11/864,811 on Mar. 18, 2011; 10 pages.
Office Action issued in U.S. Appl. No. 12/060,144 on Jun. 23, 2011; 16 pages.
Office Action issued in U.S. Appl. No. 12/147,378 on Jun. 17, 2011; 10 pages.
Office Action issued in U.S. Appl. No. 12/147,414 on Apr. 14, 2011; 30 pages.
Altintas et al.; "Aurora Software Product Line"; Cybersoft Information Technologies Co.; 2005; pp. 1-8.
Boetterweck, Goetz; "A Model-Driven Approach to the Engineering of Multiple User Interfaces"; Lecture Notes in Computer Science; 2007; vol. 4364/2007; pp. 106-115.
Business Object DTF, Common Business Objects, Ver 1.5; OMG Document bom; Framingham Corporate Center, Framingham, MA; 20 pages; Dec. 4, 1997.
Chinnapen-Rimer, Subendi et al.; "An XML Model for Use Across heterogeneous Client-Server Applications," IEEE Transactions on Instrumentation and Measurement, Oct. 2008, vol. 50, No. 10, pp. 2128-2135.
Chou et al. "Web Services for Service-Oriented Communication", International Conference on Collaborative Computing: Networking, Applications and Worksharing, CollaborateCom 2006, pp. 1-8, 2006.
Gable, Julie; "Enterprise Application Integration"; Information Management Journal; Mar./Apr. 2002; pp. 48-52.
Himoff et al.; "MAGENTA Technology: Multi-Agent Systems for Industrial Logistics"; AAMAS'05; Jul. 25-29, 2005; 2005 ACM; pp. 60-66:1-7).
Intersystems, Evaluating Integration Software, Ensemble White Paper, 2007, http://www.intersystems.com/ensemble/whitepapers/pdf/evaluating-integration-software.pdf.
Lockemann et al.; "Flexibility through Multi-Agent Systems: Solutions or Illusions"; SOFSEM 2004; pp. 41-56.
Mascolo et al.; "An Analytical Method for Performance Evaluation of Kanban Controlled Production Systems"; Operations Research; vol. 44, No. 1; 1996; pp. 50-64.
Nemuraite, Lina; "Business Object Modeling Framework for Distributed Enterprise", Kaunas University of Technology, Launas, Lithuania, Jan. 1999; pp. 189-202.
Oracle Application Integration Architecture Enterprise Business Objects (EBO) Concepts—Concepts, Structure, Terminologies and Design Rules, An Oracle White Paper; 29 pages; Aug. 2009.
SAP 2008 Annual Report; 256 pages.
"SAP Labs and HP Team to Advance Internet-Based Supply Chain Collaboration"; Business Editors and Technology Writers; Business Wire; New York; Feb. 3, 2000; 4 pages.
Shi, Min-Hua et al.; "MQML-Message Queuing Markup Language"; Proceedings of the 4th IEEE International Workshop on Advanced Issues of E-Commerce and Web-Based Information Systems (WECWIS 2002); 2002; 8 pages.
Communication Pursuant to Article 94(3) EPC issued in European Application No. 07835755.5 on Feb. 22, 2012; 7 pages.
Communication Pursuant to Article 94(3) issued in European Application No. 05757432.9 on Apr. 12, 2011; 5 pages.
Communication Pursuant to Article 94(3) issued in European Application No. 05766672.9 on Jul. 14, 2011; 4 pages.
International Search Report and Written Opinion issued in International Application No. PCT/CN2011/001238 on May 3, 2012; 9 pages.
Notice of Allowance issued in U.S. Appl. No. 11/145,464 on Sep. 26, 2013; 8 pages.
Notice of Allowance issued in U.S. Appl. No. 11/145,464 on Feb. 6, 2012; 7 pages.
Notice of Allowance issued in U.S. Appl. No. 11/155,368 on Jun. 13, 2013; 9 pages.
Notice of Allowance issued in U.S. Appl. No. 11/155,368 on Jul. 23, 2012; 7 pages.
Notice of Allowance issued in U.S. Appl. No. 11/155,368 on Nov. 8, 2011; 7 pages.
Notice of Allowance issued in U.S. Appl. No. 11/166,065 on Feb. 15, 2012; 7 pages.
Notice of Allowance issued in U.S. Appl. No. 11/166,065 on Oct. 9, 2012; 10 pages.
Notice of Allowance issued in U.S. Appl. No. 11/364,538 on Jul. 23, 2012; 7 pages.
Notice of Allowance issued in U.S. Appl. No. 11/640,422 on Apr. 23, 2012; 8 pages.
Notice of Allowance issued in U.S. Appl. No. 11/640,422 on May 22, 2012; 7 pages.
Notice of Allowance issued in U.S. Appl. No. 11/640,422 on Sep. 29, 2011; 7 pages.
Notice of Allowance issued in U.S. Appl. No. 11/731,857 on Dec. 14, 2011; 7 pages.
Notice of Allowance issued in U.S. Appl. No. 11/731,857 on Oct. 9, 2012; 7 pages.
Notice of Allowance issued in U.S. Appl. No. 11/775,821 on Dec. 30, 2011; 5 pages.
Notice of Allowance issued in U.S. Appl. No. 11/775,821 on Nov. 2, 2012; 5 pages.
Notice of Allowance issued in U.S. Appl. No. 11/775,821 on Sep. 21, 2011; 5 pages.
Notice of Allowance issued in U.S. Appl. No. 11/803,178 on Jul. 17, 2012; 15 pages.
Notice of Allowance issued in U.S. Application No. 11/864,786 on Nov. 7, 2012; 7 pages.
Notice of Allowance issued in U.S. Appl. No. 11/864,811 on Mar. 19, 2013; 9 pages.

(56) References Cited

OTHER PUBLICATIONS

Notice of Allowance issued in U.S. Appl. No. 11/864,811 on Mar. 2, 2012; 8 pages.
Notice of Allowance issued in U.S. Appl. No. 11/864,811 on Nov. 14, 2011; 8 pages.
Notice of Allowance issued in U.S. Appl. No. 11/864,811 on Sep. 10, 2012; 10 pages.
Notice of Allowance issued in U.S. Appl. No. 11/864,832 on Jul. 3, 2013; 14 pages.
Notice of Allowance issued in U.S. Appl. No. 11/864,832 on Jan. 9, 2012;12 pages.
Notice of Allowance issued in U.S. Appl. No. 11/864,832 on Jul. 30, 2012;12 pages.
Notice of Allowance issued in U.S. Appl. No. 11/864,866 on Jan. 25, 2013; 7 pages.
Notice of Allowance issued in U.S. Appl. No. 11/864,866 on Mar. 13, 2012; 7 pages.
Notice of Allowance issued in U.S. Appl. No. 11/864,871 on Aug. 14, 2013; 20 pages.
Notice of Allowance issued in U.S. Appl. No. 12/059,867 on Jul. 17, 2013; 22 pages.
Notice of Allowance issued in U.S. Appl. No. 12/059,971 on Jun. 28, 2012; 12 pages.
Notice of Allowance issued in U.S. Appl. No. 12/060,062 on Mar. 20, 2012; 16 pages.
Notice of Allowance issued in U.S. Appl. No. 12/060,062 on Nov. 9, 2012; 7 pages.
Notice of Allowance issued in U.S. Appl. No. 12/060,144 on Mar. 20, 2013; 12 pages.
Notice of Allowance issued in U.S. Appl. No. 12/060,149 on Jul. 9, 2013; 18 pages.
Notice of Allowance issued in U.S. Appl. No. 12/060,155 on Apr. 24, 2012; 15 pages.
Notice of Allowance issued in U.S. Appl. No. 12/060,155 on Jan. 11, 2013; 5 pages.
Notice of Allowance issued in U.S. Appl. No. 12/060,171 on Oct. 3, 2012; 10 pages.
Notice of Allowance issued in U.S. Appl. No. 12/060,178 on Feb. 14, 2013; 7 pages.
Notice of Allowance issued in U.S. Appl. No. 12/060,178 on Sep. 2, 2011; 9 pages.
Notice of Allowance issued in U.S. Appl. No. 12/060,192 on Mar. 2, 2012; 18 pages.
Notice of Allowance issued in U.S. Appl. No. 12/060,192 on Oct. 29, 2012; 12 pages.
Notice of Allowance issued in U.S. Appl. No. 12/147,378 on Aug. 31, 2012; 9 pages.
Notice of Allowance issued in U.S. Appl. No. 12/147,378 on Nov. 9, 2011; 16 pages.
Notice of Allowance issued in U.S. Appl. No. 12/147,414 on Jun. 19, 2013; 23 pages.
Notice of Allowance issued in U.S. Appl. No. 12/147,449 on Sep. 17, 2013; 9 pages.
Notice of Allowance issued in U.S. Appl. No. 12/323,116 on Jun. 27, 2013; 8 pages.
Notice of Allowance issued in U.S. Appl. No. 12/323,116 on Jun. 11, 2012; 10 pages.
Notice of Allowance issued in U.S. Appl. No. 12/323,139 on Feb. 8, 2013; 9 pages.
Notice of Allowance issued in U.S. Appl. No. 12/323,139 on Mar. 14, 2012; 10 pages.
Notice of Allowance issued in U.S. Appl. No. 12/571,140 on Mar. 20, 2012; 16 pages.
Notice of Allowance issued in U.S. Appl. No. 12/571,140 on Nov. 9, 2012; 8 pages.
Notice of Allowance issued in U.S. Appl. No. 12/815,618 on May 7, 2013; 8 pages.
Notice of Allowance issued in U.S. Appl. No. 12/815,618 on May 10, 2012; 7 pages.
Notice of Allowance issued in U.S. Appl. No. 12/815,639 on Sep. 24, 2012; 9 pages.
Notice of Allowance issued in U.S. Appl. No. 12/815,802 on Nov. 27, 2012; 9 pages.
Notice of Allowance issued in U.S. Appl. No. 12/816,293 on Sep. 19, 2012; 7 pages.
Notice of Allowance issued in U.S. Appl. No. 13/186,361 on Jun. 10, 2013; 11 pages.
Notice of Allowance issued in U.S. Appl. No. 13/192,553 on May 1, 2013; 21 pages.
Notice of Allowance issued in U.S. Appl. No. 13/192,574 on Jun. 14, 2013; 11 pages.
Notice of Allowance issued in U.S. Appl. No. 13/192,599 on Sep. 12, 2013; 14 pages.
Notice of Allowance issued in U.S. Appl. No. 13/535,864 on Sep. 24, 2013; 8 pages.
Notice of Allowance issued in U.S. Appl. No. 13/754,608 on Jul. 9, 2013; 12 pages.
Office Action issued in U.S. Appl. No. 13/535,670 on Jun. 24, 2013; 13 pages.
Office Action issued in U.S. Appl. No. 11/864,786 on Mar. 30, 2012; 12 pages.
Office Action issued in U.S. Appl. No. 11/864,863 on Dec. 22, 2011; 20 pages.
Office Action issued in U.S. Appl. No. 12/059,804 on Nov. 14, 2011; 15 pages.
Office Action issued in U.S. Appl. No. 12/059,860 on Aug. 3, 2011; 15 pages.
Office Action issued in U.S. Appl. No. 12/059,860 on Jan. 23, 2012; 16 pages.
Office Action issued in U.S. Appl. No. 12/059,860 on Sep. 17, 2013; 18 pages.
Office Action issued in U.S. Appl. No. 12/060,054 on Dec. 7, 2011; 15 pages.
Office Action issued in U.S. Appl. No. 12/060,144 on Dec. 8, 2011; 18 pages.
Office Action issued in U.S. Appl. No. 12/060,155 on Oct. 31, 2011; 15 pages.
Office Action issued in U.S. Appl. No. 12/060,171 on Mar. 1, 2012; 19 pages.
Office Action issued in U.S. Appl. No. 12/060,192 on Sep. 6, 2011; 18 pages.
Office Action issued in U.S. Appl. No. 12/147,414 on Oct. 26, 2011; 27 pages.
Office Action issued in U.S. Appl. No. 12/323,116 on Jan. 27, 2012; 7 pages.
Office Action issued in U.S. Appl. No. 12/323,116 on Sep. 6, 2011; 8 pages.
Office Action issued in U.S. Appl. No. 12/571,140 on Sep. 26, 2011; 14 pages.
Office Action issued in U.S. Appl. No. 12/571,154 on Apr. 2, 2012; 13 pages.
Office Action issued in U.S. Appl. No. 12/571,154 on Aug. 15, 2012; 15 pages.
Office Action issued in U.S. Appl. No. 12/815,576 on Feb. 15, 2013; 13 pages.
Office Action issued in U.S. Appl. No. 12/815,576 on Oct. 12, 2012; 11 pages.
Office Action issued in U.S. Appl. No. 12/815,618 on Dec. 22, 2011; 8 pages.
Office Action issued in U.S. Appl. No. 12/815,639 on May 24, 2012; 7 pages.
Office Action issued in U.S. Appl. No. 12/815,698 on Jan. 20, 2012; 10 pages.
Office Action issued in U.S. Appl. No. 12/815,698 on Jul. 20, 2012; 13 pages.
Office Action issued in U.S. Appl. No. 12/815,750 on Feb. 21, 2013; 67 pages.
Office Action issued in U.S. Appl. No. 12/815,750 on Sep. 28, 2012; 66 pages.
Office Action issued in U.S. Appl. No. 12/815,802 on Jul. 20, 2012; 16 pages.

(56) References Cited

OTHER PUBLICATIONS

Office Action issued in U.S. Appl. No. 12/815,869 on Feb. 15, 2013; 27 pages.
Office Action issued in U.S. Appl. No. 12/815,869 on Jul. 18, 2013; 27 pages.
Office Action issued in U.S. Appl. No. 12/815,911 on Feb. 25, 2013; 15 pages.
Office Action issued in U.S. Appl. No. 12/815,911 on Sep. 26, 2012; 14 pages.
Office Action issued in U.S. Appl. No. 12/816,083 on May 9, 2012; 20 pages.
Office Action issued in U.S. Appl. No. 12/816,083 on Sep. 21, 2012; 22 pages.
Office Action issued in U.S. Appl. No. 12/816,170 on Jul. 24, 2012; 9 pages.
Office Action issued in U.S. Appl. No. 12/816,268 on Apr. 26, 2013; 17 pages.
Office Action issued in U.S. Appl. No. 12/816,268 on Oct. 11, 2012; 11 pages.
Office Action issued in U.S. Appl. No. 12/816,293 on Apr. 25, 2012; 10 pages.
Office Action issued in U.S. Appl. No. 12/823,996 on Apr. 25, 2013; 8 pages.
Office Action issued in U.S. Appl. No. 12/823,996 on Mar. 22, 2013, 7 pages.
Office Action issued in U.S. Appl. No. 13/535,667 on Jun. 26, 2013; 12 pages.
Office Action issued in U.S. Appl. No. 13/186,361 on Feb. 26, 2013, 10 pages.
Office Action issued in U.S. Appl. No. 13/192,543 on Aug. 28, 2012; 14 pages.
Office Action issued in U.S. Appl. No. 13/192,543 on Dec. 13, 2012; 26 pages.
Office Action issued in U.S. Appl. No. 13/192,548 on Jun. 7, 2013; 15 pages.
Office Action issued in U.S. Appl. No. 13/192,553 on Feb. 11, 2013, 23 pages.
Office Action issued in U.S. Appl. No. 13/192,555 on Jul. 20, 2012; 7 pages.
Office Action issued in U.S. Appl. No. 13/192,555 on Mar. 1, 2013; 11 pages.
Office Action issued in U.S. Appl. No. 13/192,555 on Sep. 13, 2013; 10 pages.
Office Action issued in U.S. Appl. No. 13/192,564 on Apr. 22, 2013; 21 pages.
Office Action issued in U.S. Appl. No. 13/192,574 on Apr. 30, 2013; 5 pages.
Office Action issued in U.S. Appl. No. 13/192,574 on Oct. 24, 2012; 6 pages.
Office Action issued in U.S. Appl. No. 13/192,590 on Oct. 18, 2013; 11 pages.
Office Action issued in U.S. Appl. No. 13/192,599 on Mar. 21, 2013; 29 pages.
Office Action issued in U.S. Appl. No. 13/192,612 on Oct. 4, 2012; 12 pages.
Office Action issued in U.S. Appl. No. 13/218,876 on Apr. 5, 2013; 10 pages.
Office Action issued in U.S. Appl. No. 13/218,876 on Jul. 16, 2013; 14 pages.
Office Action issued in U.S. Appl. No. 13/349,477 on Jul. 22, 2013; 6 pages.
Office Action issued in U.S. Appl. No. 13/349,477 on Jun. 29, 2012; 13 pages.
Office Action issued in U.S. Appl. No. 13/349,477 on Nov. 15, 2012; 15 pages.
Office Action issued in U.S. Appl. No. 13/398,191 on Oct. 15, 2013; 9 pages.
Office Action issued in U.S. Appl. No. 13/398,228 on Oct. 17, 2013; 8 pages.
Office Action issued in U.S. Appl. No. 13/535,419 on Apr. 19, 2013; 14 pages.
Office Action issued in U.S. Appl. No. 13/535,433 on Aug. 2, 2013; 11 pages.
Office Action issued in U.S. Appl. No. 13/535,433 on Mar. 4, 2013; 11 pages.
Office Action issued in U.S. Appl. No. 13/535,435 on Jun. 21, 2013; 13 pages.
Office Action issued in U.S. Appl. No. 13/535,453 on Jul. 5, 2013; 22 pages.
Office Action issued in U.S. Appl. No. 13/535,512 on Jul. 5, 2013; 10 pages.
Office Action issued in U.S. Appl. No. 13/535,521 on Apr. 16, 2013; 16 pages.
Office Action issued in U.S. Appl. No. 13/535,521 on Aug. 30, 2013; 15 pages.
Office Action issued in U.S. Appl. No. 13/535,625 on Aug. 15, 2013; 22 pages.
Office Action issued in U.S. Appl. No. 13/535,648 on Jun. 21, 2013; 14 pages.
Office Action issued in U.S. Appl. No. 13/535,667 on Dec. 26, 2012; 9 pages.
Office Action issued in U.S. Appl. No. 13/535,674 on Jul. 3, 2013; 17 pages.
Office Action issued in U.S. Appl. No. 13/535,723 on Apr. 24, 2013; 16 pages.
Office Action issued in U.S. Appl. No. 13/535,723 on Aug. 23, 2013; 16 pages.
Office Action Issued in U.S. Appl. No. 13/535,864 on May 10, 2013; 9 pages.
Office Action issued in U.S. Appl. No. 13/535,881 on Dec. 21, 2012; 7 pages.
Office Action issued in U.S. Appl. No. 13/754,608 on Apr. 215, 2013; 15 pages.

* cited by examiner

FIG. 36-1

| Package | Level 1 | Level 2 | Level 3 | Level 4 | Level 5 | Level 6 | Data Type Name |
|---|---|---|---|---|---|---|---|
| IndividualMaterialBillOfMaterialMessage 36000 | IndividualMaterialBillOfMaterialMessage 36002 | | | | | | |
| MessageHeader 36004 | | MessageHeader 36006 | | | | | BusinessDocumentMessageHeader 36008 |
| IndividualMaterialBillOfMaterial 36010 | | IndividualMaterialBillOfMaterial 36012 | | | | | IndivMatlBOMVarItmByVarIdfgElmntsRsp_sIndivMatlBOM 36014 |
| | | | InternalID 36016 | | | | NOSC_BillOfMaterialInternalID 36018 |
| | | | ID 36020 | | | | NOSC_BillOfMaterialID 36022 |

FIG. 36-2

| Package | Level 1 | Level 2 | Level 3 | Level 4 | Level 5 | Level 6 | Data Type Name |
|---|---|---|---|---|---|---|---|
| | | | UsageCode 36024 | | | | NOSC_BillOfMaterialUsageCode/BillOfMaterialU-sageCode 36026 |
| | | | UsageName 36028 | | | | LEN30_Name 36030 |
| | | | Description 36032 | | | | SHORT_Description 36034 |
| Variant 36036 | | | Variant 36038 | | | | IndivMatlBOMVarItmBy-VarIdfgElmntsRsp_sIndivMatlBOMVar 36040 |
| | | | | ID 36042 | | | BillOfMaterialVariantID 36044 |

FIG. 36-3

| Package | Level 1 | Level 2 | Level 3 | Level 4 | Level 5 | Level 6 | Data Type Name |
|---|---|---|---|---|---|---|---|
| | | | | IndividualMateri-alID 36046 | | | ProductInter-nalID/NOSC_ProductInter-nalID 36048 |
| | | | | Description 36050 | | | SHORT_Description 36052 |
| | | | | IndividualMateri-alDescription 36054 | | | SHORT_Description 36056 |
| | | | | ValidityDatePeriod 36058 | | | UPPEROPEN_DatePeriod 36060 |
| | | | | Location 36062 | | | IndivMatlBOMVarItmBy-VarIdfgElmntsRsp_sIndivMatlBOMVarLoc 36064 |

FIG. 36-4

| Package | Level 1 | Level 2 | Level 3 | Level 4 | Level 5 | Level 6 | Data Type Name |
|---|---|---|---|---|---|---|---|
| | | | | | InternalID 36066 | | NOSC_LocationInternalID 36068 |
| | | | | | Name 36070 | | LANGUAGEINDEPENDENT_MEDIUM_Name 36072 |
| Item 36074 | | | | Item 36076 | | | IndivMatlBOMVarItmBy-VarIdfgElmntsRsp_sIndivMatlBOMVarItm 36078 |
| | | | | | ID 36080 | | BillOfMaterialItemID 36082 |
| | | | | | ChangeState 36084 | | IndivMatlBOMVarItmBy-VarIdfgElmntsRsp_sIndivMatlBOMVarItmChgStt 36086 |

FIG. 36-5

| Package | Level 1 | Level 2 | Level 3 | Level 4 | Level 5 | Level 6 | Data Type Name |
|---|---|---|---|---|---|---|---|
| | | | | | | ID 36088 | BillOfMaterialItemChangeStateID 36090 |
| | | | | | | MaterialInternalID 36092 | NOSC_ProductInternalID/ProductInternalID 36094 |
| | | | | | | StartEngineeringChangeOrderID 36096 | NOSC_EngineeringChangeOrderID/EngineeringChangeOrderID 36098 |
| | | | | | | EndEngineeringChangeOrderID 36100 | NOSC_EngineeringChangeOrderID/EngineeringChangeOrderID 36102 |
| | | | | | | ValidityDatePeriod 36104 | UPPEROPEN_DatePeriod 36106 |

FIG. 36-6

| Package | Level 1 | Level 2 | Level 3 | Level 4 | Level 5 | Level 6 | Data Type Name |
|---|---|---|---|---|---|---|---|
| | | | | | | LogisticsItem-TypeCode 36108 | NOSC_LogisticsItemType-Code/LogisticsItemType-Code 36110 |
| | | | | | | LogisticsItemIn-dexText 36112 | LogisticsItemIndexText 36114 |
| | | | | | | DesiredQuantity 36116 | Quantity 36118 |
| | | | | | | QuantityFixedIn-dicator 36120 | Indicator 36122 |
| | | | | | | MaterialDescrip-tion 36124 | SHORT_Description 36126 |

FIG. 36-7

| Package | Level 1 | Level 2 | Level 3 | Level 4 | Level 5 | Level 6 | Data Type Name |
|---|---|---|---|---|---|---|---|
| | | | | | | Description 36128 | SHORT_Description 36130 |
| | | | | | | LogisticsItem-TypeName 36132 | LEN30_Name 36134 |

FIG. 37-1

| Package | Level 1 | Level 2 | Level 3 | Level 4 | Cardinality | Data Type Name |
|---|---|---|---|---|---|---|
| IndividualMaterialBillOfMaterialERPVariantByVariantIdentifyingElementsQueryMessage_sync 37000 | IndividualMaterialBillOfMaterialERPVariantByVariantIdentifyingElementsQuery_sync 37002 | | | | | IndivMatlBOMVarItmByVarIdfgElmntsQryMsg_s 37004 |
| Selection 37006 | | IndividualMaterialBillOfMaterialVariantByVariantIdentifyingElements 37008 | | | 1 37010 | IndivMatlBOMVarItmByVarIdfgElmntsQry_sSel 37012 |
| | | | VariantIndividualMaterialID 37014 | | 1 37016 | NOSC_ProductInternalID 37018 |
| | | | VariantPlantID 37020 | | 0..1 37022 | NOSC_PlantID 37024 |

FIG. 37-2

| Package | Level 1 | Level 2 | Level 3 | Level 4 | Cardinality | Data Type Name |
|---|---|---|---|---|---|---|
| | | | VariantValidity-DatePeriodStart-Date 37026 | | 0..1 37028 | Date 37030 |
| | | | UsageCode 37032 | VariantUsageo-fonlyusage 37034 | 1 37036 | NOSC_BillOfMaterialUsageCode 37038 |
| ProcessingConditions 37040 | | Processing-Conditions 37042 | | | 0..1 37044 | WITHOUT_LASTRETURNED_QueryProcessingConditions 37046 |

FIG. 38-1

| Package | Level 1 | Level 2 | Level 3 | Level 4 | Level 5 | Level 6 | Cardinality | Data Type Name |
|---|---|---|---|---|---|---|---|---|
| IndividualMaterialBillOfMaterialERPVariantByVariantIdentifyingElementsResponseMessage_sync 38000 | IndividualMaterialBillOfMaterialERPVariantByVariantIdentifyingElementsResponse_sync 38002 | | | | | | | IndivMatlBOMVarItmByVarIdfgElmntsRspMsg_s 38004 |
| IndividualMaterialBillOfMaterial 38006 | | IndividualMaterialBillOfMaterial 38008 | | | | | 0..n 38010 | IndivMatlBOMVarItmByVarIdfgElmntsRsp_sIndivMatlBOM 38012 |
| | | | InternalID 38014 | | | | 1 38016 | NOSC_BillOfMaterialInternalID 38018 |
| | | | ID 38020 | | | | 0..1 38022 | NOSC_BillOfMaterialID 38024 |
| | | | UsageCode 38026 | | | | 1 38028 | NOSC_BillOfMaterialUsageCode 38030 |

FIG. 38-2

| Package | Level 1 | Level 2 | Level 3 | Level 4 | Level 5 | Level 6 | Cardinality | Data Type Name |
|---|---|---|---|---|---|---|---|---|
| | | | UsageName 38032 | | | | 0..1 38034 | LEN30_Name 38036 |
| | | | Description 38038 | | | | 0..1 38040 | SHORT_Description 38042 |
| Variant 38044 | | | Variant 38046 | | | | 1..n 38048 | IndivMatlBOMVarItmByVarIdfgElmntsRsp_sIndivMatlBOMVar 38050 |
| | | | | ID 38052 | | | 1 38054 | BillOfMaterialVariantID 38056 |
| | | | | IndividualMaterialID 38058 | | | 1 38060 | NOSC_ProductInternalID 38062 |

FIG. 38-3

| Package | Level 1 | Level 2 | Level 3 | Level 4 | Level 5 | Level 6 | Cardinality | Data Type Name |
|---|---|---|---|---|---|---|---|---|
| | | | | Description 38064 | | | 0..1 38066 | SHORT_Description 38068 |
| | | | | IndividualMaterialDescription 38070 | | | 0..1 38072 | SHORT_Description 38074 |
| | | | | ValidityDatePeriod 38076 | | | 1 38078 | UPPEROPEN_DatePeriod 38080 |
| | | | | Location 38082 | | | 0..1 38084 | IndivMatlBOMVarItmByVarIdfgElmnts-Rsp_sIndivMatlBOMVarLoc 38086 |
| | | | | | InternalID 38088 | | 0..1 38090 | NOSC_LocationInternalID 38092 |

FIG. 38-4

| Package | Level 1 | Level 2 | Level 3 | Level 4 | Level 5 | Level 6 | Cardinality | Data Type Name |
|---|---|---|---|---|---|---|---|---|
| | | | | | Name 38094 | | 0..1 38096 | LANGUAGEINDEPENDENT_MEDIUM_Name 38098 |
| Item 38100 | | | | Item 38102 | | | 0..n 38104 | IndivMatlBOMVarItmBy-VarIdfgElmnts-Rsp_sIndivMatlBOMVarItm 38106 |
| | | | | | ID 38108 | | 1 38110 | BillOfMaterialItemID 38112 |
| | | | | | ChangeS-tate 38114 | | 1 38116 | IndivMatlBOMVarItmBy-VarIdfgElmnts-Rsp_sIndivMatlBOM-VarItmChgStt 38118 |
| | | | | | | ID 38120 | 1 38122 | BillOfMaterialItemChangeS-tateID 38124 |

FIG. 38-5

| Package | Level 1 | Level 2 | Level 3 | Level 4 | Level 5 | Level 6 | Cardinality | Data Type Name |
|---|---|---|---|---|---|---|---|---|
| | | | | | | MaterialInternalID 38126 | 0..1 38128 | NOSC_ProductInternalID 38130 |
| | | | | | | StartEngineering-ChangeOrderID 38132 | 0..1 38134 | NOSC_EngineeringChangeOrderID 38136 |
| | | | | | | EndEngineering-ChangeOrderID 38138 | 0..1 38140 | NOSC_EngineeringChangeOrderID 38142 |
| | | | | | | ValidityDatePeriod 38144 | 1 38146 | UPPEROPEN_DatePeriod 38148 |
| | | | | | | LogisticsItemTypeCode 38150 | 1 38152 | NOSC_LogisticsItemTypeCode 38154 |

FIG. 38-6

| Package | Level 1 | Level 2 | Level 3 | Level 4 | Level 5 | Level 6 | Cardinality | Data Type Name |
|---|---|---|---|---|---|---|---|---|
| | | | | | | LogisticsItemIndexText 38156 | 0..1 38158 | LogisticsItemIndexText 38160 |
| | | | | | | DesiredQuantity 38162 | 0..1 38164 | Quantity 38166 |
| | | | | | | QuantityFixedIndicator 38168 | 1 38170 | Indicator 38172 |
| | | | | | | MaterialDescription 38174 | 0..1 38176 | SHORT_Description 38178 |
| | | | | | | Description 38180 | 0..1 38182 | SHORT_Description 38184 |

FIG. 38-7

| Package | Level 1 | Level 2 | Level 3 | Level 4 | Level 5 | Level 6 | Cardinality | Data Type Name |
|---|---|---|---|---|---|---|---|---|
| | | | | | | LogisticsItem-TypeName 38186 | 0..1 38188 | LEN30_Name 38190 |
| ProcessingConditions 38192 | | Processing-Conditions 38194 | | | | | 1 38196 | WITHOUT_LASTRETURNED_ResponseProcessingCon-ditions 38198 |
| Log 38200 | | Log 38202 | | | | | 1 38204 | NOSC_Log 38206 |

| Package | level1 | level2 | level3 | level4 | level5 | level6 | level7 | Data Type Name |
|---|---|---|---|---|---|---|---|---|
| OrderTrackingViewMessage 42000 | Order-Tracking-ViewMes-sage 42002 | | | | | | | <Mes-sageDataType> 42004 |
| MessageHeader 42006 | | Message-Header 42008 | | | | | | Business-Docu-mentMes-sage-Header 42010 |
| OrderTrackingView 42012 | | Order-Tracking-View 42014 | | | | | | <MT>OrdTrckgVw 42016 |
| | | | ID 42018 | | | | | Business-Transac-tionDocu-mentID 42020 |

FIG. 42-2

| Package | | | | | level1 | level2 | level3 | level4 | level5 | level6 | level7 | Data Type Name |
|---|---|---|---|---|---|---|---|---|---|---|---|---|
| | | | | | | | TypeCode 42022 | | | | | Business-Transac-tionDocu-ment-TypeCode 42024 |
| | | Item 42026 | | | | | Item 42028 | | | | | <MT>Itm 42030 |
| | | | | | | | | Business-Transac-tionDocu-men-tReference 42032 | | | | Business-Transac-tionDocu-men-tReference 42034 |
| | | | Product 42036 | | | | | Product 42038 | | | | <MT>ItmPr od 42040 |

FIG. 42-3

| Package | | | | | level1 | level2 | level3 | level4 | level5 | level6 | level7 | Data Type Name |
|---|---|---|---|---|---|---|---|---|---|---|---|---|
| | | | | | | | | | Product 42042 | | | Business-TransactionDocumentProduct 42044 |
| | | | | | | | | | | InternalID 42046 | | Product-InternalID 42048 |
| | | | | | | | | | | StandardID 42050 | | Product-StandardID 42052 |
| | | | | | | | | | | BuyerID 42054 | | Product-PartyID 42056 |
| | | | | | | | | | | SellerID 42058 | | Product-PartyID 42060 |

FIG. 42-4

| Package | | | | | level1 | level2 | level3 | level4 | level5 | level6 | level7 | Data Type Name |
|---|---|---|---|---|---|---|---|---|---|---|---|---|
| | | | | | | | | | | Produc-tRecipien-tID 42062 | | Product-PartyID 42064 |
| | | | | | | | | | | VendorID 42066 | | Product-PartyID 42068 |
| | | | | | | | | | | Manufac-turerID 42070 | | Product-PartyID 42072 |
| | | | | | | | | | | BillToID 42074 | | Product-PartyID 42076 |
| | | | | | | | | | | BillFromID 42078 | | Product-PartyID 42080 |

FIG. 42-5

| Package | | | | | level1 | level2 | level3 | level4 | level5 | level6 | level7 | Data Type Name |
|---|---|---|---|---|---|---|---|---|---|---|---|---|
| | | | | | | | | | | BidderID 42082 | | Product-PartyID 42084 |
| | | | | | | | | | | TypeCode 42086 | | Pro-ductType-Code 42088 |
| | | | | | | | | | | Note 42090 | | Note 42092 |
| | | | | | | | | | | ChangeID 42094 | | Produc-tChangeID 42096 |
| | | | | | | | | | | Discon-tinuation-Indicator 42098 | | Indicator 42100 |

FIG. 42-6

| Package | | | | | level1 | level2 | level3 | level4 | level5 | level6 | level7 | Data Type Name |
|---|---|---|---|---|---|---|---|---|---|---|---|---|
| | | | | | | | | | | Pack-ageQuan-tity 42102 | | Quantity 42104 |
| | | | | | | | | Product-Description 42106 | BatchID 42108 | | | BatchID 42110 |
| | | | | | | | | Name… 42112 | Inventory-Valuation-TypeCode 42114 | | | Inventory-Valuation-TypeCode 42116 |
| | | | | | | | | | SerialID 42118 | | | SerialID 42120 |
| | | | Quantity 42122 | | | | | Quantity 42124 | | | | <MT>ItmQty 42126 |

FIG. 42-7

| Package | | | | | level1 | level2 | level3 | level4 | level5 | level6 | level7 | Data Type Name |
|---|---|---|---|---|---|---|---|---|---|---|---|---|
| | | | | | | | | | Quantity 42128 | | | Quantity 42130 |
| | | | | | | | | | Quantity-RoleCode 42132 | | | Quantity-RoleCode 42134 |
| | | | | | | | | | Quantity-RoleName 42136 | | | Me-dium_Name 42138 |
| | | | Party 42140 | | | | | Party 42142 | | | | <MT>ItmPty 42144 |
| | | | | | | | | | PartyID 42146 | | | PartyID 42148 |

FIG. 42-8

| Package | | | | | level1 | level2 | level3 | level4 | level5 | level6 | level7 | Data Type Name |
|---|---|---|---|---|---|---|---|---|---|---|---|---|
| | | | | | | | | | PartyRole-Category-Code 42150 | | | PartyRole-Category-Code 42152 |
| | | | | | | | | | PartyName 42154 | | | LANGUAGEINDEPENDENT_LONG_Name 42156 |
| | | | | | | | | | PartyRole-Category-Name 42158 | | | Me-dium_Name 42160 |
| | | | Date 42162 | | | | | Date 42164 | | | | <MT>ItmDte 42166 |
| | | | | | | | | | TimePoint 42168 | | | <MT>ItmDteTmePt 42170 |

FIG. 42-9

| Package | | | | | level1 | level2 | level3 | level4 | level5 | level6 | level7 | Data Type Name |
|---|---|---|---|---|---|---|---|---|---|---|---|---|
| | | | | | | | | | | TimePoint 42172 | | TimePoint 42174 |
| | | | | | | | | | | TimePoin-tRoleCode 42176 | | TimePoin-tRoleCode 42178 |
| | | | | | | | | | | TimePoin-tRoleName 42180 | | Me-dium_Name 42182 |
| | | | Status 42184 | | | | | Status 42186 | | | | <MT>ItmSts 42188 |
| | | | | | | | | | Approval-Status-Code 42190 | | | Approval-Status-Code 42192 |

FIG. 42-10

| Package | | | | | level1 | level2 | level3 | level4 | level5 | level6 | level7 | Data Type Name |
|---|---|---|---|---|---|---|---|---|---|---|---|---|
| | | | | | | | | | Blocking-Status-Code 42194 | | | Blocking-Status-Code 42196 |
| | | | | | | | | | Cancella-tion-StatusCod e 42200 | | | Cancella-tion-StatusCod e 42202 |
| | | | | | | | | | Closur-eStatus-Code 42204 | | | Closur-eStatus-Code 42206 |
| | | | | | | | | | Consisten-cyStatus-Code 42208 | | | INCONSIS TENTCON SISTENT_ Consisten-cyStatus-Code 42210 |

FIG. 42-11

| Package | | | | | level1 | level2 | level3 | level4 | level5 | level6 | level7 | Data Type Name |
|---|---|---|---|---|---|---|---|---|---|---|---|---|
| | | | PredecessorBTDReference 42212 | | | | | PredecessorBTDReference 42214 | | | | <MT>ItmPredBTDRef 42216 |
| | | | | | | | | | BusinessTransactionDocumentReference 42218 | | | BusinessTransactionDocumentReference 42220 |
| | | | LogisticPackage 42222 | | | | | LogisticPackage 42224 | | | | <MT>ItmLogPackgg 42226 |
| | | | | | | | | | LogisticUnitID 42228 | | | LogisticUnitID 42230 |
| | | | | | | | | | HandlingUnitID 42232 | | | HandlingUnitID 42234 |

FIG. 42-12

| Package | | | | | level1 | level2 | level3 | level4 | level5 | level6 | level7 | Data Type Name |
|---|---|---|---|---|---|---|---|---|---|---|---|---|
| | | | | | | | | | TypeCode 42236 | | | Logis-ticPack-ageType-Code 42238 |
| | | | | | | | | | TypeName 42240 | | | Me-dium_Nam e 42242 |
| | | | | | | | | | Tracked-Process 42244 | | | <MT>ItmTr kdProc 42246 |
| | | | | | | | | | | Tracking-MainID 42248 | | Tracked-Process-Tracking-MainID 42250 |

FIG. 42-13

| Package | | | | | level1 | level2 | level3 | level4 | level5 | level6 | level7 | Data Type Name |
|---|---|---|---|---|---|---|---|---|---|---|---|---|
| | | | | | | | | | | Trackin-gApplica-tionObjec-tURI 42252 | | URI 42254 |
| | | | ScheduleLine 42256 | | | | | Sched-uleLine 42258 | | | | <MT>ItmSchedLine 42260 |
| | | | | | | | | | ID 42262 | | | Business-Transac-tionDocu-mentItem-Sched-uleLineID 42264 |

FIG. 42-14

| Package | | | | | level1 | level2 | level3 | level4 | level5 | level6 | level7 | Data Type Name |
|---|---|---|---|---|---|---|---|---|---|---|---|---|
| | | | | | | | | | TypeCode 42266 | | | Business-Transac-tionDocu-mentItem-Sched-uleLineTypeCode 42268 |
| | | | | Quantity 42270 | | | | | Quantity 42272 | | | <MT>ItmSchedLin-eQty 42274 |
| | | | | | | | | | | Quantity 42276 | | Quantity 42278 |
| | | | | | | | | | | Quantity-RoleCode 42280 | | Quantity-RoleCode 42282 |

FIG. 42-15

| Package | | | | | level1 | level2 | level3 | level4 | level5 | level6 | level7 | Data Type Name |
|---|---|---|---|---|---|---|---|---|---|---|---|---|
| | | | | | | | | | | Quantity-RoleName 42284 | | Me-dium_Name 42286 |
| | | | | Date 42288 | | | | | Date 42290 | | | <MT>ItmSchedLineDte 42292 |
| | | | | | | | | | | TimePoint 42294 | | <MT>ItmSchedLineTmePt 42296 |
| | | | | | | | | | | | TimePoint 42298 | TimePoint 42300 |
| | | | | | | | | | | | TimePoin-tRoleCode 42302 | TimePoin-tRoleCode 42304 |

FIG. 42-16

| Package | | | | | level1 | level2 | level3 | level4 | level5 | level6 | level7 | Data Type Name |
|---|---|---|---|---|---|---|---|---|---|---|---|---|
| | | | | | | | | | | | TimePointRoleName 42306 | Medium_Name 42308 |
| | | | | | | | | | TimePointPeriod 42310 | DeliveryPeriod 42312 | | UPPEROPEN_LOCALNORMALISED_DateTimePeriod 42314 |
| | Log 42316 | | | | | Log 42318 | | | | | | Log 42320 |

FIG. 43-1

| Package | | level1 | level2 | level3 | Cardinality |
|---|---|---|---|---|---|
| PurchaseOrderTrackingViewERPByPurchaseOrderQueryMessage_sync 43000 | | PurchaseOrderTracking-ViewERPByPurchaseOrderQueryMessage_sync 43002 | | | |
| | MessageHeader 43004 | | MessageHeader 43006 | | 1 43008 |
| | Selection 43010 | | PurchaseOrderTracking-ViewSelectionByPurchaseOrder 43012 | | 1 43014 |
| | | | | PurchaseOrderTracking-ViewID 43016 | 1 43018 |
| | | | | PurchaseOrderTracking-ViewItemID 43020 | 0..1 43022 |

FIG. 43-2

| Package | | level1 | level2 | level3 | Cardinality |
|---|---|---|---|---|---|
| | | | | PurchaseOrderTracking-ViewItemProductInter-nalID 43024 | 0..1 43026 |
| | | | | PurchaseOrderTracking-ViewItemProductSellerID 43028 | 0..1 43030 |
| | | | | PurchaseOrderTracking-ViewItemScheduleLine-Quantity 43032 | 0..1 43034 |
| | | | | PurchaseOrderTracking-ViewItemScheduleLine-DateDeliveryPeriod 43036 | 0..1 43038 |

FIG. 44-1

| Package | | | | | level1 | level2 | level3 | level4 | level5 | level6 | level7 | Cardinality |
|---|---|---|---|---|---|---|---|---|---|---|---|---|
| PurchaseOrderTrackingViewERPByPurchaseOrderResponseMessage_sync 44000 | | | | | PurchaseOrderTrackingViewERPByPurchaseOrderResponseMessage_sync 44002 | | | | | | | |
| | MessageHeader 44004 | | | | | MessageHeader 44006 | | | | | | 1 44008 |
| | PurchaseOrderTrackingView 44010 | | | | | PurchaseOrderTrackingView 44012 | | | | | | 1 44014 |
| | | | | | | | ID 44016 | | | | | 1 44018 |

FIG. 44-2

| Package | | | | | level1 | level2 | level3 | level4 | level5 | level6 | level7 | Cardinality |
|---|---|---|---|---|---|---|---|---|---|---|---|---|
| | | | | | | | TypeCode 44020 | | | | | 1 44022 |
| | | Item 44024 | | | | | Item 44026 | | | | | 0..N 44028 |
| | | | | | | | | Business-Transac-tionDocu-men-tReference 44030 | | | | 1 44032 |
| | | | Product 44034 | | | | | Product 44036 | | | | 0..1 44038 |
| | | | | | | | | | Product 44040 | | | 1 44042 |
| | | | | | | | | | | InternalID 44044 | | 0..1 44046 |

FIG. 44-3

| Package | | | | | level1 | level2 | level3 | level4 | level5 | level6 | level7 | Cardinality |
|---|---|---|---|---|---|---|---|---|---|---|---|---|
| | | | | | | | | | | StandardID 44048 | | 0..1 44050 |
| | | | | | | | | | | BuyerID 44052 | | 0..1 44054 |
| | | | | | | | | | | SellerID 44056 | | 0..1 44058 |
| | | | | | | | | | | Produc-tRecipien-tID 44060 | | 0..1 44062 |
| | | | | | | | | | | VendorID 44064 | | 0..1 44066 |
| | | | | | | | | | | Manufac-turerID 44068 | | 0..1 44070 |

FIG. 44-4

| Package | | | | | level1 | level2 | level3 | level4 | level5 | level6 | level7 | Cardinality |
|---|---|---|---|---|---|---|---|---|---|---|---|---|
| | | | | | | | | | | BillToID 44072 | | 0..1 44074 |
| | | | | | | | | | | BillFromID 44076 | | 0..1 44078 |
| | | | | | | | | | | BidderID 44080 | | 0..1 44082 |
| | | | | | | | | | | TypeCode 44084 | | 0..1 44086 |
| | | | | | | | | | | Note 44088 | | 0..1 44090 |
| | | | | | | | | | | ChangeID 44092 | | 0..1 44094 |

FIG. 44-5

| Package | | | | | level1 | level2 | level3 | level4 | level5 | level6 | level7 | Cardinality |
|---|---|---|---|---|---|---|---|---|---|---|---|---|
| | | | | | | | | | | Discon-tinuation-Indicator 44096 | | 0..1 44098 |
| | | | | | | | | | | Pack-ageQuan-tity 44100 | | 0..1 44102 |
| | | | | | | | | | BatchID 44104 | | | 0..1 44106 |
| | | | | | | | | | Inventory-Valuation-TypeCode 44108 | | | 0..1 44110 |
| | | | | | | | | | SerialID 44112 | | | 0..1 44114 |

FIG. 44-6

| Package | | | | | level1 | level2 | level3 | level4 | level5 | level6 | level7 | Cardinality |
|---|---|---|---|---|---|---|---|---|---|---|---|---|
| | | | Quantity 44116 | | | | | Quantity 44118 | | | | 0..N 44120 |
| | | | | | | | | | Quantity 44122 | | | 1 44124 |
| | | | | | | | | | Quantity-RoleCode 44126 | | | 1 44128 |
| | | | | | | | | | Quantity-RoleName 44130 | | | 0..1 44132 |
| | | | Party 44134 | | | | | Party 44136 | | | | 0..N 44138 |

FIG. 44-7

| Package | | | | | level1 | level2 | level3 | level4 | level5 | level6 | level7 | Cardinality |
|---|---|---|---|---|---|---|---|---|---|---|---|---|
| | | | | | | | | | PartyID 44140 | whichGDTtobeused-forB2B?POforER-PusesPartyInter-nalID;suggestedisal-soPar-tyStan-dardID. 44142 | | 1 44144 |
| | | | | | | | | | PartyRole-Category-Code 44146 | | | 1 44148 |
| | | | | | | | | | PartyName 44150 | | | 0..1 44152 |
| | | | | | | | | | PartyRole-Category-Name 44154 | | | 0..1 44156 |

FIG. 44-8

| Package | | | | | level1 | level2 | level3 | level4 | level5 | level6 | level7 | Cardinality |
|---|---|---|---|---|---|---|---|---|---|---|---|---|
| | | | Date 44158 | | | | | Date 44160 | | | | 0..1 44162 |
| | | | | | | | | | TimePoint 44164 | | | 0..N 44166 |
| | | | | | | | | | | TimePoint 44168 | | 1 44170 |
| | | | | | | | | | | TimePoin-tRoleCode 44172 | | 1 44174 |
| | | | | | | | | | | TimePoin-tRoleName 44176 | | 0..1 44178 |
| | | | Predeces-sorBTDRef erence 44180 | | | | | Predeces-sorBTDRef erence 44182 | | | | 0..N 44184 |

FIG. 44-9

| Package | | | | | level1 | level2 | level3 | level4 | level5 | level6 | level7 | Cardinality |
|---|---|---|---|---|---|---|---|---|---|---|---|---|
| | | | | | | | | | Business-Transac-tionDocu-men-tReference 44186 | | | 1 44188 |
| | | | Logis-ticPackage 44190 | | | | | Logis-ticPackage 44192 | | | | 0..N 44194 |
| | | | | | | | | | Handlin-gUnitID 44196 | | | 0..1 44198 |
| | | | | | | | | | Tracked-Process 44200 | | | 0..1 44202 |
| | | | | | | | | | | Tracking-MainID 44204 | | 1 44206 |

FIG. 44-10

| Package | | | | | level1 | level2 | level3 | level4 | level5 | level6 | level7 | Cardinality |
|---|---|---|---|---|---|---|---|---|---|---|---|---|
| | | | | | | | URI 44208 | | | TrackingApplicationObjectURL 44210 | | 0..1 44212 |
| | | | ScheduleLine 44214 | | | | | ScheduleLine 44216 | | | | 0..N 44218 |
| | | | | | | | | | ID 44220 | | | 1 44222 |
| | | | | | | | | | TypeCode 44224 | | | 1 44226 |
| | | | | Quantity 44228 | | | | | Quantity 44230 | | | 0..N 44232 |
| | | | | | | | | | | Quantity 44234 | | 1 44236 |

FIG. 44-11

| Package | | | | | level1 | level2 | level3 | level4 | level5 | level6 | level7 | Cardinality |
|---|---|---|---|---|---|---|---|---|---|---|---|---|
| | | | | | | | | | | Quantity-RoleCode 44238 | | 1 44240 |
| | | | | | | | | | | Quantity-RoleName 44242 | | 0..1 44244 |
| | | | | Date 44246 | | | | | Date 44248 | | | 0..1 44250 |
| | | | | | | | | | | TimePoint 44252 | | 0..N 44254 |
| | | | | | | | | | | | TimePoint 44256 | 1 44258 |
| | | | | | | | | | | | TimePoin-tRoleCode 44260 | 1 44262 |

FIG. 44-12

| Package | | | | | level1 | level2 | level3 | level4 | level5 | level6 | level7 | Cardinality |
|---|---|---|---|---|---|---|---|---|---|---|---|---|
| | | | | | | | | | | | TimePoin-tRoleName 44264 | 1 44266 |
| | | | | | | | | | | Delivery-Period 44268 | | 0..1 44270 |
| | Log 44272 | | | | | Log 44274 | | | | | | 1 44276 |

MANAGING CONSISTENT INTERFACES FOR BUSINESS OBJECTS ACROSS HETEROGENEOUS SYSTEMS

RELATED APPLICATIONS

This application claims the priority under 35 U.S.C. §119 of Non-provisional application Ser. No. 12/147,395 filed Jun. 26, 2008 and Provisional Application Ser. No. 61/032,388 filed Feb. 28, 2008.

TECHNICAL FIELD

The subject matter described herein relates generally to the generation and use of consistent interfaces (or services) derived from a business object model. More particularly, the present disclosure relates to the generation and use of consistent interfaces or services that are suitable for use across industries, across businesses, and across different departments within a business.

BACKGROUND

Transactions are common among businesses and between business departments within a particular business. During any given transaction, these business entities exchange information. For example, during a sales transaction, numerous business entities may be involved, such as a sales entity that sells merchandise to a customer, a financial institution that handles the financial transaction, and a warehouse that sends the merchandise to the customer. The end-to-end business transaction may require a significant amount of information to be exchanged between the various business entities involved. For example, the customer may send a request for the merchandise as well as some form of payment authorization for the merchandise to the sales entity, and the sales entity may send the financial institution a request for a transfer of funds from the customer's account to the sales entity's account.

Exchanging information between different business entities is not a simple task. This is particularly true because the information used by different business entities is usually tightly tied to the business entity itself. Each business entity may have its own program for handling its part of the transaction. These programs differ from each other because they typically are created for different purposes and because each business entity may use semantics that differ from the other business entities. For example, one program may relate to accounting, another program may relate to manufacturing, and a third program may relate to inventory control. Similarly, one program may identify merchandise using the name of the product while another program may identify the same merchandise using its model number. Further, one business entity may use U.S. dollars to represent its currency while another business entity may use Japanese Yen. A simple difference in formatting, e.g., the use of upper-case lettering rather than lower-case or title-case, makes the exchange of information between businesses a difficult task. Unless the individual businesses agree upon particular semantics, human interaction typically is required to facilitate transactions between these businesses. Because these "heterogeneous" programs are used by different companies or by different business areas within a given company, a need exists for a consistent way to exchange information and perform a business transaction between the different business entities.

Currently, many standards exist that offer a variety of interfaces used to exchange business information. Most of these interfaces, however, apply to only one specific industry and are not consistent between the different standards. Moreover, a number of these interfaces are not consistent within an individual standard.

SUMMARY

In a first aspect, a computer readable medium includes program code for providing a message-based interface for performing an individual material bill of material service. The interface exposes at least one service as defined in a service registry. Upon execution, the program code executes in an environment of computer systems providing message-based services. The service comprises program code for receiving, from a service consumer, a first message for processing information for a list that comprises the elements defining and describing the components to assemble an individual material bill of material. Program code invokes an individual material bill of material business object. The business object is a logically centralized, semantically disjointed object for representing information for a list that comprises the elements defining and describing the components to assemble an individual material bill of material. The business object comprises data logically organized as an individual material bill of material root node, and a variant subordinate node. The variant node contains a location subordinate node, and an item subordinate node. The item node contains a change state subordinate node. Program code initiates transmission of a message to a heterogeneous second application, executing in the environment of computer systems providing message-based services, based on the data in the individual material bill of material business object. The message comprises an individual material bill of material message entity, a message header package, and an individual material bill of material package.

In a second aspect, a computer readable medium includes program code for providing a message-based interface for performing an individual material bill of material service. The software comprises computer readable instructions embodied on tangible media. Upon execution, the software executes in a landscape of computer systems providing message-based services. Program code initiates transmission of a message to a heterogeneous second application, executing in the environment of computer systems providing message-based services, based on data in an individual material bill of material business object invoked by the second application. The business object is a logically centralized, semantically disjointed object for representing information for a list that comprises the elements defining and describing the components to assemble an individual material bill of material. The business object comprises data logically organized as an individual material bill of material root node, and a variant subordinate node. The variant node contains a location subordinate node, and an item subordinate node. The item node contains a change state subordinate node. The message comprises an individual material bill of material message entity, a message header package, and an individual material bill of material package. Program code receives a second message from the second application, the second message associated with the invoked individual material bill of material business object and in response to the first message.

In a third aspect, a distributed system operates in a landscape of computer systems providing message-based services. The system processes business objects involving an individual material bill of material service and comprises memory and a graphical user interface remote from the memory. The memory stores a business object repository storing a plurality of business objects. Each business object is a logically centralized, semantically disjointed object and at least one of the business objects is for representing information for a list that comprises the elements defining and describing the components to assemble an individual material bill of material. The business object comprises data logically organized as an individual material bill of material root node, and a variant subordinate node. The variant node contains a location subordinate node, and an item subordinate node. The item node contains a change state subordinate node. The graphical user interface remote from the memory presents data associated with an invoked instance of the individual material bill of material business object, the interface comprising computer readable instructions embodied on tangible media.

In a fourth aspect, a computer readable medium includes program code for providing a message-based interface for performing an order tracking view service. The interface exposes at least one service as defined in a service registry. Upon execution, the program code executes in an environment of computer systems providing message-based services. The service comprises program code for receiving, from a service consumer, a first message for processing information for document information for the follow-on business transactions for tracking and completion of a specified order. Program code invokes an order tracking view business object. The business object is a logically centralized, semantically disjointed object for representing information for document information for the follow-on business transactions for tracking and completion of a specified order. The business object comprises data logically organized as an order tracking view root node, and an item subordinate node. The item node contains a product subordinate node, a quantity subordinate node, a party subordinate node, a date subordinate node, a predecessor business transaction document reference subordinate node, a logistic package subordinate node, and a schedule line subordinate node. The schedule line node contains a quantity subordinate node, and a date subordinate node. Program code initiates transmission of a message to a heterogeneous second application, executing in the environment of computer systems providing message-based services, based on the data in the order tracking view business object. The message comprises a purchase order tracking view enterprise resource planning by purchase order response message entity, a message header package, and a purchase order tracking view package, and a log package.

In a fifth aspect, a computer readable medium includes program code for providing a message-based interface for performing an order tracking view service. The software comprises computer readable instructions embodied on tangible media. Upon execution, the software executes in a landscape of computer systems providing message-based services. The service comprises program code for initiating transmission of a message to a heterogeneous second application, executing in the environment of computer systems providing message-based services, based on data in a order tracking view business object invoked by the second application. The business object is a logically centralized, semantically disjointed object for representing information for document information for the follow-on business transactions for tracking and completion of a specified order. The business object comprises data logically organized as an order tracking view root node, and an item subordinate node. The item node contains a product subordinate node, a quantity subordinate node, a party subordinate node, a date subordinate node, a predecessor business transaction document reference subordinate node, a logistic package subordinate node, and a schedule line subordinate node. The schedule line node contains a quantity subordinate node, and a date subordinate node. The message comprises a purchase order tracking view enterprise resource planning by purchase order response message entity, a message header package, and a purchase order tracking view package, and a log package. Program code receives a second message from the second application, the second message associated with the invoked order tracking view business object and in response to the first message.

In a sixth aspect, a distributed system operates in a landscape of computer systems providing message-based services. The system processes business objects involving an order tracking view service and comprises memory and a graphical user interface remote from the memory. The memory stores a business object repository storing a plurality of business objects. Each business object is a logically centralized, semantically disjointed object and at least one of the business objects is for representing information for document information for the follow-on business transactions for tracking and completion of a specified order. The business object comprises data logically organized as an order tracking view root node, and an item subordinate node. The item node contains a product subordinate node, a quantity subordinate node, a party subordinate node, a date subordinate node, a predecessor business transaction document reference subordinate node, a logistic package subordinate node, and a schedule line subordinate node. The schedule line node contains a quantity subordinate node, and a date subordinate node. The graphical user interface remote from the memory presents data associated with an invoked instance of the order tracking view business object, the interface comprising computer readable instructions embodied on tangible media.

In some implementations, processing business objects includes creating, updating and/or retrieving information associated with the business objects.

BRIEF DESCRIPTION OF THE DRAWINGS

FIGS. 36-1 through 36-7 show an exemplary IndividualMaterialBillOfMaterialMessage Element Structure.

FIGS. 37-1 through 37-2 show an exemplary IndividualMaterialBillOfMaterialERPVariantByVariantIdentifyingElementsQueryMessage_sync Element Structure.

FIGS. 38-1 through 38-7 show an exemplary IndividualMaterialBillOfMaterialERPVariantByVariantIdentifyingElementsResponseMessage_sync Element Structure.

FIGS. 41-1 through 41-4 show an exemplary PurchaseOrderTrackingViewERPByPurchaseOrderResponseMessage_sync Message Data Type.

FIGS. 42-1 through 42-16 show an exemplary OrderTrackingViewMessage Element Structure.

FIGS. 43-1 through 43-2 show an exemplary PurchaseOrderTrackingViewERPByPurchaseOrderQueryMessage_sync Element Structure.

FIGS. 44-1 through 44-12 show an exemplary PurchaseOrderTrackingViewERPByPurchaseOrderResponseMessage_sync Element Structure.

DETAILED DESCRIPTION

A. Overview

Figure 1:
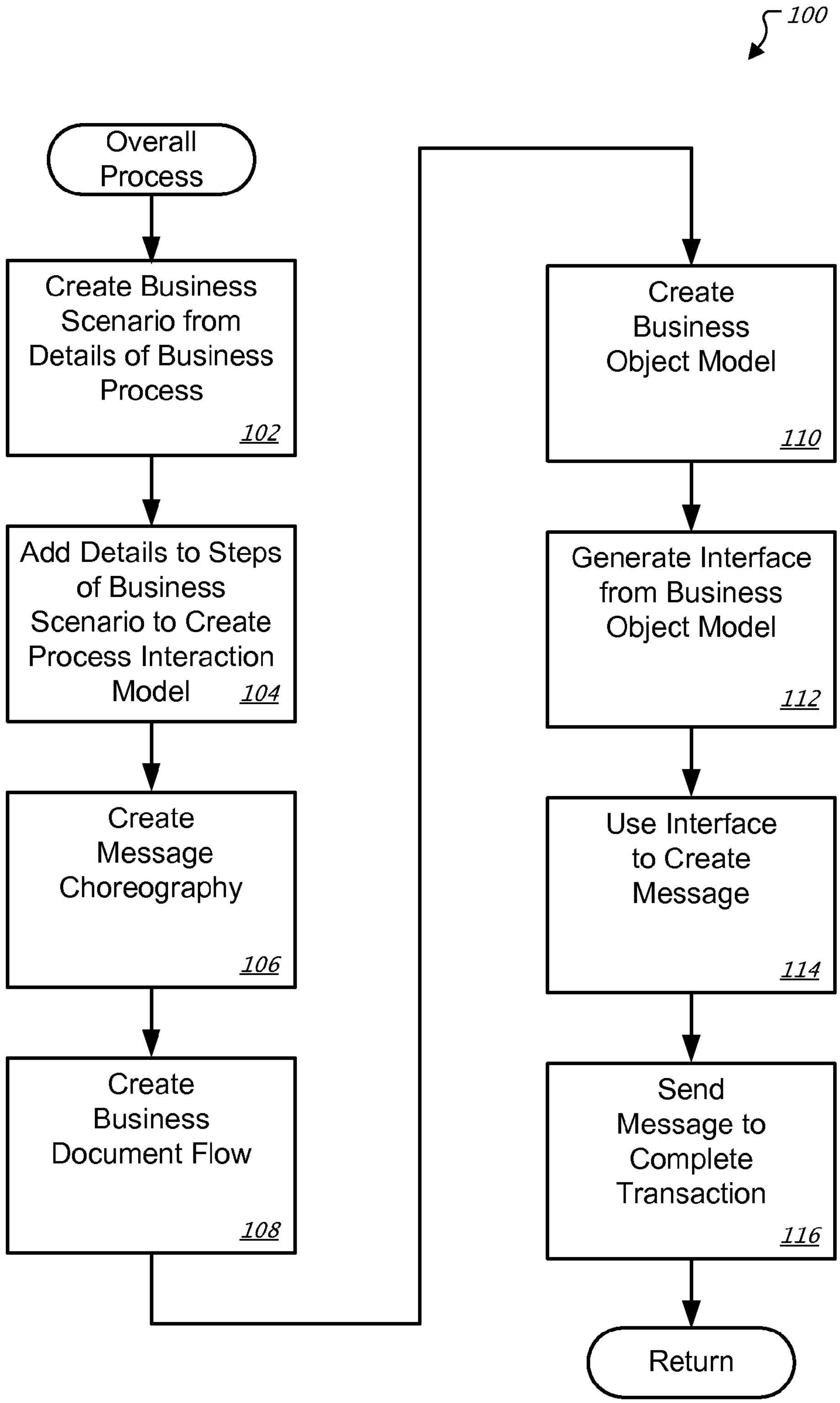
FIG. 1 depicts a flow diagram of the overall steps performed by methods and systems consistent with the subject matter described herein.

Methods and systems consistent with the subject matter described herein facilitate e-commerce by providing consistent interfaces that are suitable for use across industries, across businesses, and across different departments within a business during a business transaction. To generate consistent interfaces, methods and systems consistent with the subject matter described herein utilize a business object model, which reflects the data that will be used during a given business transaction. An example of a business transaction is the exchange of purchase orders and order confirmations between a buyer and a seller. The business object model is generated in a hierarchical manner to ensure that the same type of data is represented the same way throughout the business object model. This ensures the consistency of the information in the business object model. Consistency is also reflected in the semantic meaning of the various structural elements. That is, each structural element has a consistent business meaning. For example, the location entity, regardless of in which package it is located, refers to a location.

From this business object model, various interfaces are derived to accomplish the functionality of the business transaction. Interfaces provide an entry point for components to access the functionality of an application. For example, the interface for a Purchase Order Request provides an entry point for components to access the functionality of a Purchase Order, in particular, to transmit and/or receive a Purchase Order Request. One skilled in the art will recognize that each of these interfaces may be provided, sold, distributed, utilized, or marketed as a separate product or as a major component of a separate product. Alternatively, a group of related interfaces may be provided, sold, distributed, utilized, or marketed as a product or as a major component of a separate product. Because the interfaces are generated from the business object model, the information in the interfaces is consistent, and the interfaces are consistent among the business entities. Such consistency facilitates heterogeneous business entities in cooperating to accomplish the business transaction.

Generally, the business object is a representation of a type of a uniquely identifiable business entity (an object instance) described by a structural model. In the architecture, processes may typically operate on business objects. Business objects represent a specific view on some well-defined business content. In other words, business objects represent content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. The process component is a software package that realizes a business process and generally exposes its functionality as services. The functionality contains business transactions. In general, the process component contains one or more semantically related business objects. Often, a particular business object belongs to no more than one process component. Interactions between process component pairs involving their respective business objects, process agents, operations, interfaces, and messages are described as process component interactions, which generally determine the interactions of a pair of process components across a deployment unit boundary. Interactions between process components within a deployment unit are typically not constrained by the architectural design and can be implemented in any convenient fashion. Process components may be modular and context-independent. In other words, process components may not be specific to any particular application and as such, may be reusable. In some implementations, the process component is the smallest (most granular) element of reuse in the architecture. An external process component is generally used to represent the external system in describing interactions with the external system; however, this should be understood to require no more of the external system than that able to produce and receive messages as required by the process component that interacts with the external system. For example, process components may include multiple operations that may provide interaction with the external system. Each operation generally belongs to one type of process component in the architecture. Operations can be synchronous or asynchronous, corresponding to synchronous or asynchronous process agents, which will be described below. The operation is often the smallest, separately-callable function, described by a set of data types used as input, output, and fault parameters serving as a signature.

The architectural elements may also include the service interface, referred to simply as the interface. The interface is a named group of operations. The interface often belongs to one process component and process component might contain multiple interfaces. In one implementation, the service interface contains only inbound or outbound operations, but not a mixture of both. One interface can contain both synchronous and asynchronous operations. Normally, operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. Operation can use multiple message types for inbound, outbound, or error messages. When two process components are in different deployment units, invocation of an operation of one process component by the other process component is accomplished by the operation on the other process component sending a message to the first process component.

The architectural elements may also include the process agent. Process agents do business processing that involves the sending or receiving of messages. Each operation normally has at least one associated process agent. Each process agent can be associated with one or more operations. Process agents can be either inbound or outbound and either synchronous or asynchronous. Asynchronous outbound process agents are called after a business object changes such as after a "create", "update", or "delete" of a business object instance. Synchronous outbound process agents are generally triggered directly by business object. An outbound process agent will generally perform some processing of the data of the business object instance whose change triggered the event. The outbound agent triggers subsequent business process steps by sending messages using well-defined outbound services to another process component, which generally will be in another deployment unit, or to an external system. The outbound process agent is linked to the one business object that triggers the agent, but it is sent not to another business object but rather to another process component. Thus, the outbound process agent can be implemented without knowledge of the exact business object design of the recipient process component. Alternatively, the process agent may be inbound. For example, inbound process agents may be used for the inbound part of a message-based communication. Inbound process agents are called after a message has been received. The inbound process agent starts the execution of the business process step requested in a message by creating or updating one or multiple business object instances. Inbound process agent is not generally the agent of business object but of its process component. Inbound process agent can act on multiple business objects in a process component. Regardless of whether the process agent is inbound or outbound, an agent may be synchronous if used when a process component requires a more or less immediate response from another process component, and is waiting for that response to continue its work.

The architectural elements also include the deployment unit. Each deployment unit may include one or more process components that are generally deployed together on a single computer system platform. Conversely, separate deployment units can be deployed on separate physical computing systems. The process components of one deployment unit can interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by the deployment unit to be scaled to meet demand by creating as many instances as needed.

Since interaction between deployment units is through process component operations, one deployment unit can be replaced by other another deployment unit as long as the new deployment unit supports the operations depended upon by other deployment units as appropriate. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement generally supports the operations of the original.

Services (or interfaces) may be provided in a flexible architecture to support varying criteria between services and systems. The flexible architecture may generally be provided by a service delivery business object. The system may be able to schedule a service asynchronously as necessary, or on a regular basis. Services may be planned according to a schedule manually or automatically. For example, a follow-up service may be scheduled automatically upon completing an initial service. In addition, flexible execution periods may be possible (e.g. hourly, daily, every three months, etc.). Each customer may plan the services on demand or reschedule service execution upon request.

FIG. 1 depicts a flow diagram 100 showing an example technique, perhaps implemented by systems similar to those disclosed herein. Initially, to generate the business object model, design engineers study the details of a business process, and model the business process using a "business scenario" (step 102). The business scenario identifies the steps performed by the different business entities during a business process. Thus, the business scenario is a complete representation of a clearly defined business process.

After creating the business scenario, the developers add details to each step of the business scenario (step 104). In particular, for each step of the business scenario, the developers identify the complete process steps performed by each business entity. A discrete portion of the business scenario reflects a "business transaction," and each business entity is referred to as a "component" of the business transaction. The developers also identify the messages that are transmitted between the components. A "process interaction model" represents the complete process steps between two components.

After creating the process interaction model, the developers create a "message choreography" (step 106), which depicts the messages transmitted between the two components in the process interaction model. The developers then represent the transmission of the messages between the components during a business process in a "business document flow" (step 108). Thus, the business document flow illustrates the flow of information between the business entities during a business process.

Figure 2:
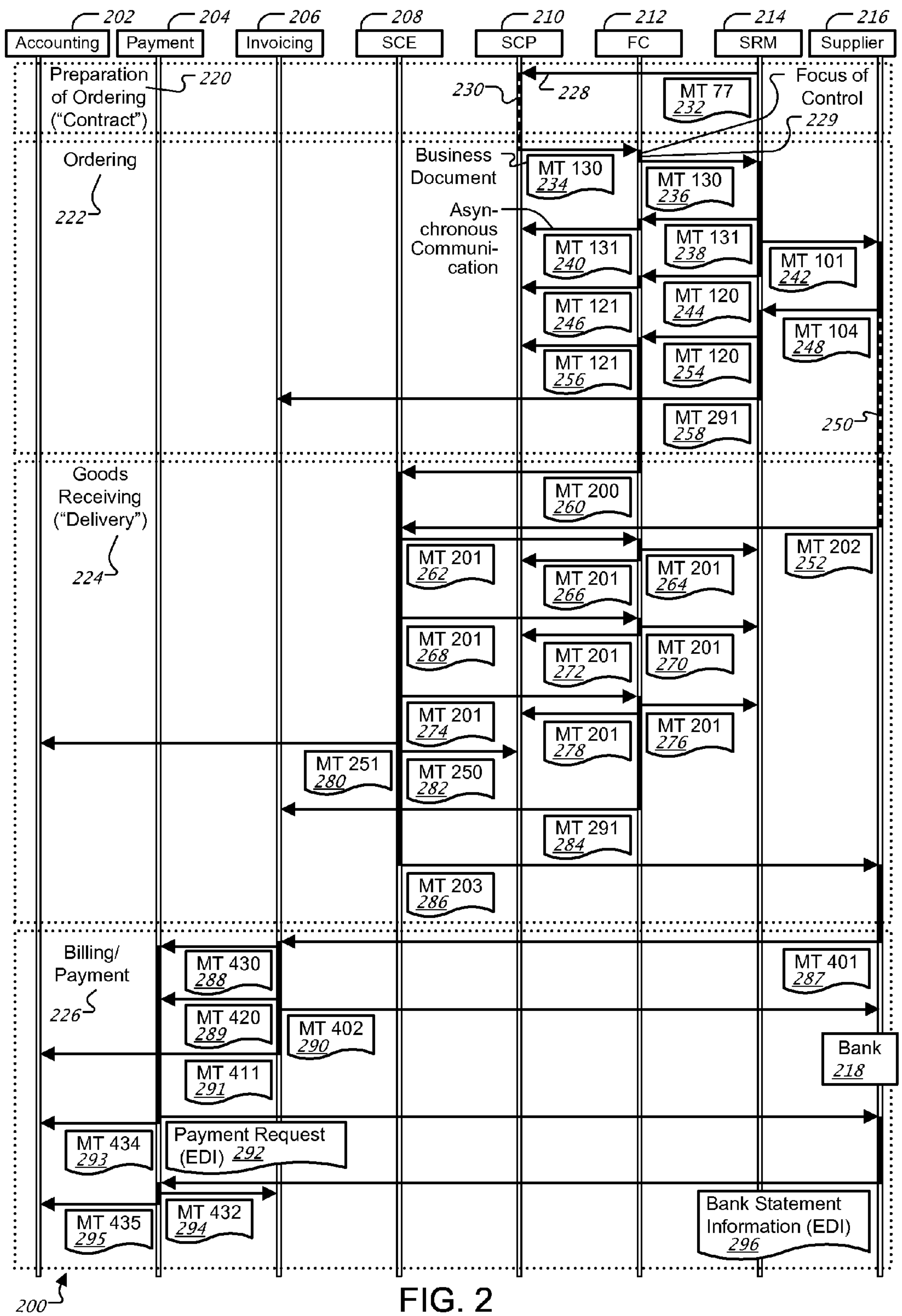
FIG. 2 depicts a business document flow for an invoice request in accordance with methods and systems consistent with the subject matter described herein.

FIG. 2 depicts an example business document flow 200 for the process of purchasing a product or service. The business entities involved with the illustrative purchase process include Accounting 202, Payment 204, Invoicing 206, Supply Chain Execution ("SCE") 208, Supply Chain Planning ("SCP") 210, Fulfillment Coordination ("FC") 212, Supply Relationship Management ("SRM") 214, Supplier 216, and Bank 218. The business document flow 200 is divided into four different transactions: Preparation of Ordering ("Contract") 220, Ordering 222, Goods Receiving ("Delivery") 224, and Billing/Payment 226. In the business document flow, arrows 228 represent the transmittal of documents. Each document reflects a message transmitted between entities. One of ordinary skill in the art will appreciate that the messages transferred may be considered to be a communications protocol. The process flow follows the focus of control, which is depicted as a solid vertical line (e.g., 229) when the step is required, and a dotted vertical line (e.g., 230) when the step is optional.

During the Contract transaction 220, the SRM 214 sends a Source of Supply Notification 232 to the SCP 210. This step is optional, as illustrated by the optional control line 230 coupling this step to the remainder of the business document flow 200. During the Ordering transaction 222, the SCP 210 sends a Purchase Requirement Request 234 to the FC 212, which forwards a Purchase Requirement Request 236 to the SRM 214. The SRM 214 then sends a Purchase Requirement Confirmation 238 to the FC 212, and the FC 212 sends a Purchase Requirement Confirmation 240 to the SCP 210. The SRM 214 also sends a Purchase Order Request 242 to the Supplier 216, and sends Purchase Order Information 244 to the FC 212. The FC 212 then sends a Purchase Order Planning Notification 246 to the SCP 210. The Supplier 216, after receiving the Purchase Order Request 242, sends a Purchase Order Confirmation 248 to the SRM 214, which sends a Purchase Order Information confirmation message 254 to the FC 212, which sends a message 256 confirming the Purchase Order Planning Notification to the SCP 210. The SRM 214 then sends an Invoice Due Notification 258 to Invoicing 206.

During the Delivery transaction 224, the FC 212 sends a Delivery Execution Request 260 to the SCE 208. The Supplier 216 could optionally (illustrated at control line 250) send a Dispatched Delivery Notification 252 to the SCE 208. The SCE 208 then sends a message 262 to the FC 212 notifying the FC 212 that the request for the Delivery Information was created. The FC 212 then sends a message 264 notifying the SRM 214 that the request for the Delivery Information was created. The FC 212 also sends a message 266 notifying the SCP 210 that the request for the Delivery Information was created. The SCE 208 sends a message 268 to the FC 212 when the goods have been set aside for delivery. The FC 212 sends a message 270 to the SRM 214 when the goods have been set aside for delivery. The FC 212 also sends a message 272 to the SCP 210 when the goods have been set aside for delivery.

The SCE 208 sends a message 274 to the FC 212 when the goods have been delivered. The FC 212 then sends a message 276 to the SRM 214 indicating that the goods have been delivered, and sends a message 278 to the SCP 210 indicating that the goods have been delivered. The SCE 208 then sends an Inventory Change Accounting Notification 280 to Accounting 202, and an Inventory Change Notification 282 to the SCP 210. The FC 212 sends an Invoice Due Notification 284 to Invoicing 206, and SCE 208 sends a Received Delivery Notification 286 to the Supplier 216.

During the Billing/Payment transaction 226, the Supplier 216 sends an Invoice Request 287 to Invoicing 206. Invoicing 206 then sends a Payment Due Notification 288 to Payment 204, a Tax Due Notification 289 to Payment 204, an Invoice Confirmation 290 to the Supplier 216, and an Invoice Accounting Notification 291 to Accounting 202. Payment 204 sends a Payment Request 292 to the Bank 218, and a Payment Requested Accounting Notification 293 to Accounting 202. Bank 218 sends a Bank Statement Information 296 to Payment 204. Payment 204 then sends a Payment Done Information 294 to Invoicing 206 and a Payment Done Accounting Notification 295 to Accounting 202.

Within a business document flow, business documents having the same or similar structures are marked. For example, in the business document flow 200 depicted in FIG. 2, Purchase Requirement Requests 234, 236 and Purchase Requirement Confirmations 238, 240 have the same structures. Thus, each of these business documents is marked with an "O6." Similarly, Purchase Order Request 242 and Purchase Order Confirmation 248 have the same structures. Thus, both documents are marked with an "O1." Each business document or message is based on a message type.

From the business document flow, the developers identify the business documents having identical or similar structures, and use these business documents to create the business object model (step 110). The business object model includes the objects contained within the business documents. These objects are reflected as packages containing related information, and are arranged in a hierarchical structure within the business object model, as discussed below.

Methods and systems consistent with the subject matter described herein then generate interfaces from the business object model (step 112). The heterogeneous programs use instantiations of these interfaces (called "business document objects" below) to create messages (step 114), which are sent to complete the business transaction (step 116). Business entities use these messages to exchange information with other business entities during an end-to-end business transaction. Since the business object model is shared by heterogeneous programs, the interfaces are consistent among these programs. The heterogeneous programs use these consistent interfaces to communicate in a consistent manner, thus facilitating the business transactions.

Standardized Business-to-Business ("B2B") messages are compliant with at least one of the e-business standards (i.e., they include the business-relevant fields of the standard). The e-business standards include, for example, RosettaNet for the high-tech industry, Chemical Industry Data Exchange ("CIDX"), Petroleum Industry Data Exchange ("PIDX") for the oil industry, UCCnet for trade, PapiNet for the paper industry, Odette for the automotive industry, FIR-XML for human resources, and XML Common Business Library ("xCBL"). Thus, B2B messages enable simple integration of components in heterogeneous system landscapes. Application-to-Application ("A2A") messages often exceed the standards and thus may provide the benefit of the full functionality of application components. Although various steps of FIG. 1 were described as being performed manually, one skilled in the art will appreciate that such steps could be computer-assisted or performed entirely by a computer, including being performed by either hardware, software, or any other combination thereof.

B. Implementation Details

As discussed above, methods and systems consistent with the subject matter described herein create consistent interfaces by generating the interfaces from a business object model. Details regarding the creation of the business object model, the generation of an interface from the business object model, and the use of an interface generated from the business object model are provided below.

Figure 3A:
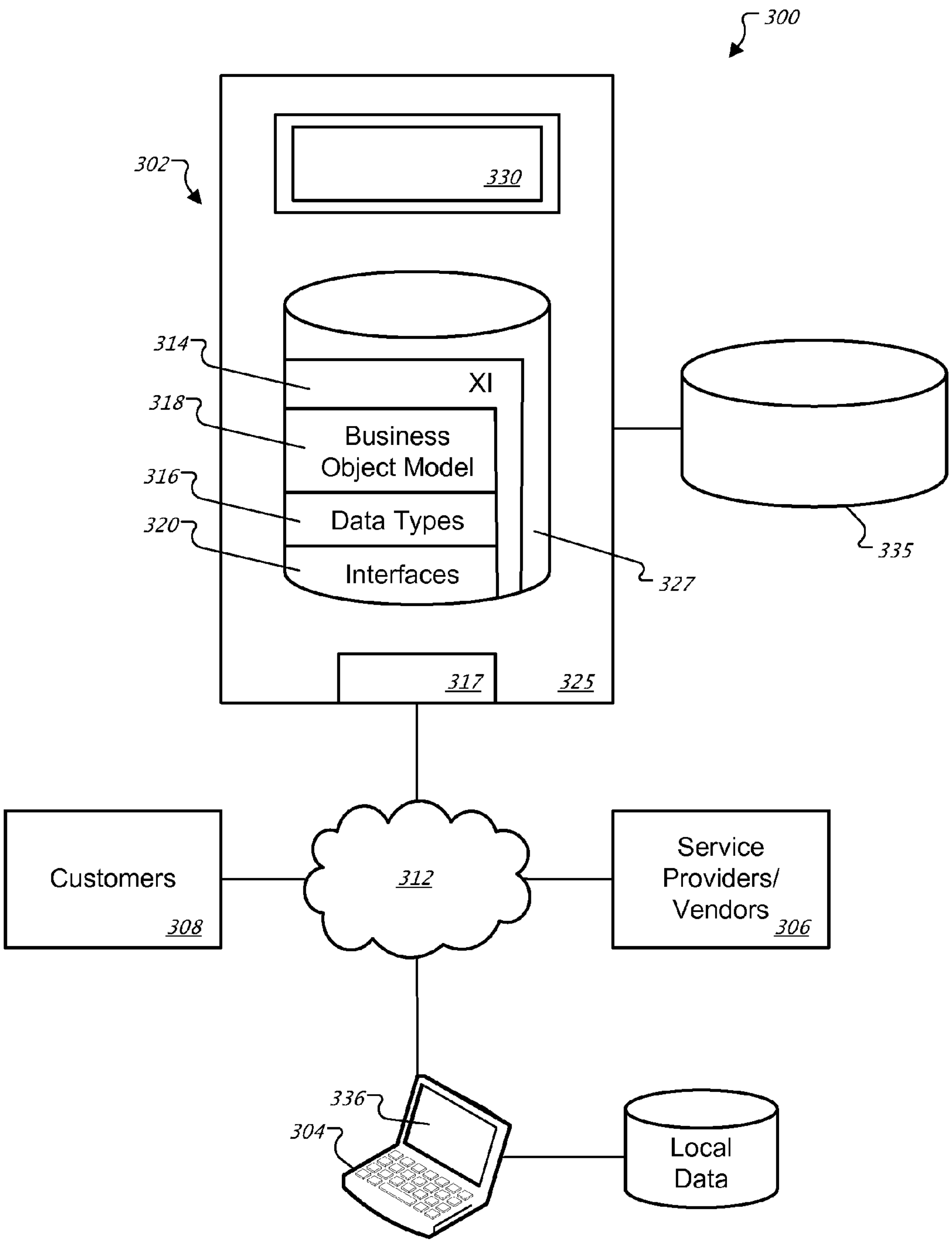
FIGS. 3A-B illustrate example environments implementing the transmission, receipt, and processing of data between heterogeneous applications in accordance with certain embodiments included in the present disclosure.

Turning to the illustrated embodiment in FIG. 3A, environment 300 includes or is communicably coupled (such as via a one-, bi- or multi-directional link or network) with server 302, one or more clients 304, one or more or vendors 306, one or more customers 308, at least some of which communicate across network 312. But, of course, this illustration is for example purposes only, and any distributed system or environment implementing one or more of the techniques described herein may be within the scope of this disclosure. Server 302 comprises an electronic computing device operable to receive, transmit, process and store data associated with environment 300. Generally, FIG. 3A provides merely one example of computers that may be used with the disclosure. Each computer is generally intended to encompass any suitable processing device. For example, although FIG. 3A illustrates one server 302 that may be used with the disclosure, environment 300 can be implemented using computers other than servers, as well as a server pool. Indeed, server 302 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 302 may be adapted to execute any operating system including Linux, UNIX, Windows Server, or any other suitable operating system. According to one embodiment, server 302 may also include or be communicably coupled with a web server and/or a mail server.

As illustrated (but not required), the server 302 is communicably coupled with a relatively remote repository 335 over a portion of the network 312. The repository 335 is any electronic storage facility, data processing center, or archive that may supplement or replace local memory (such as 327). The repository 335 may be a central database communicably coupled with the one or more servers 302 and the clients 304 via a virtual private network (VPN), SSH (Secure Shell) tunnel, or other secure network connection. The repository 335 may be physically or logically located at any appropriate location including in one of the example enterprises or offshore, so long as it remains operable to store information associated with the environment 300 and communicate such data to the server 302 or at least a subset of plurality of the clients 304.

Illustrated server 302 includes local memory 327. Memory 327 may include any memory or database module and may take the form of volatile or non-volatile memory including, without limitation, magnetic media, optical media, random access memory (RAM), read-only memory (ROM), removable media, or any other suitable local or remote memory component. Illustrated memory 327 includes an exchange infrastructure ("XI") 314, which is an infrastructure that supports the technical interaction of business processes across heterogeneous system environments. XI 314 centralizes the communication between components within a business entity and between different business entities. When appropriate, XI 314 carries out the mapping between the messages. XI 314 integrates different versions of systems implemented on different platforms (e.g., Java and ABAP). XI 314 is based on an open architecture, and makes use of open standards, such as eXtensible Markup Language (XML)™ and Java environments. XI 314 offers services that are useful in a heterogeneous and complex system landscape. In particular, XI 314 offers a runtime infrastructure for message exchange, configuration options for managing business processes and message flow, and options for transforming message contents between sender and receiver systems.

XI 314 stores data types 316, a business object model 318, and interfaces 320. The details regarding the business object model are described below. Data types 316 are the building blocks for the business object model 318. The business object model 318 is used to derive consistent interfaces 320. XI 314 allows for the exchange of information from a first company having one computer system to a second company having a second computer system over network 312 by using the standardized interfaces 320.

While not illustrated, memory 327 may also include business objects and any other appropriate data such as services, interfaces, VPN applications or services, firewall policies, a security or access log, print or other reporting files, HTML files or templates, data classes or object interfaces, child software applications or sub-systems, and others. This stored data may be stored in one or more logical or physical repositories. In some embodiments, the stored data (or pointers thereto) may be stored in one or more tables in a relational database described in terms of SQL statements or scripts. In the same or other embodiments, the stored data may also be formatted, stored, or defined as various data structures in text files, XML documents, Virtual Storage Access Method (VSAM) files, flat files, Btrieve files, comma-separated-value (CSV) files, internal variables, or one or more libraries. For example, a particular data service record may merely be a pointer to a particular piece of third party software stored remotely. In another example, a particular data service may be an internally stored software object usable by authenticated customers or internal development. In short, the stored data may comprise one table or file or a plurality of tables or files stored on one computer or across a plurality of computers in any appropriate format. Indeed, some or all of the stored data may be local or remote without departing from the scope of this disclosure and store any type of appropriate data.

Server 302 also includes processor 325. Processor 325 executes instructions and manipulates data to perform the operations of server 302 such as, for example, a central processing unit (CPU), a blade, an application specific integrated circuit (ASIC), or a field-programmable gate array (FPGA). Although FIG. 3A illustrates a single processor 325 in server 302, multiple processors 325 may be used according to particular needs and reference to processor 325 is meant to include multiple processors 325 where applicable. In the illustrated embodiment, processor 325 executes at least business application 330.

Figure 4:
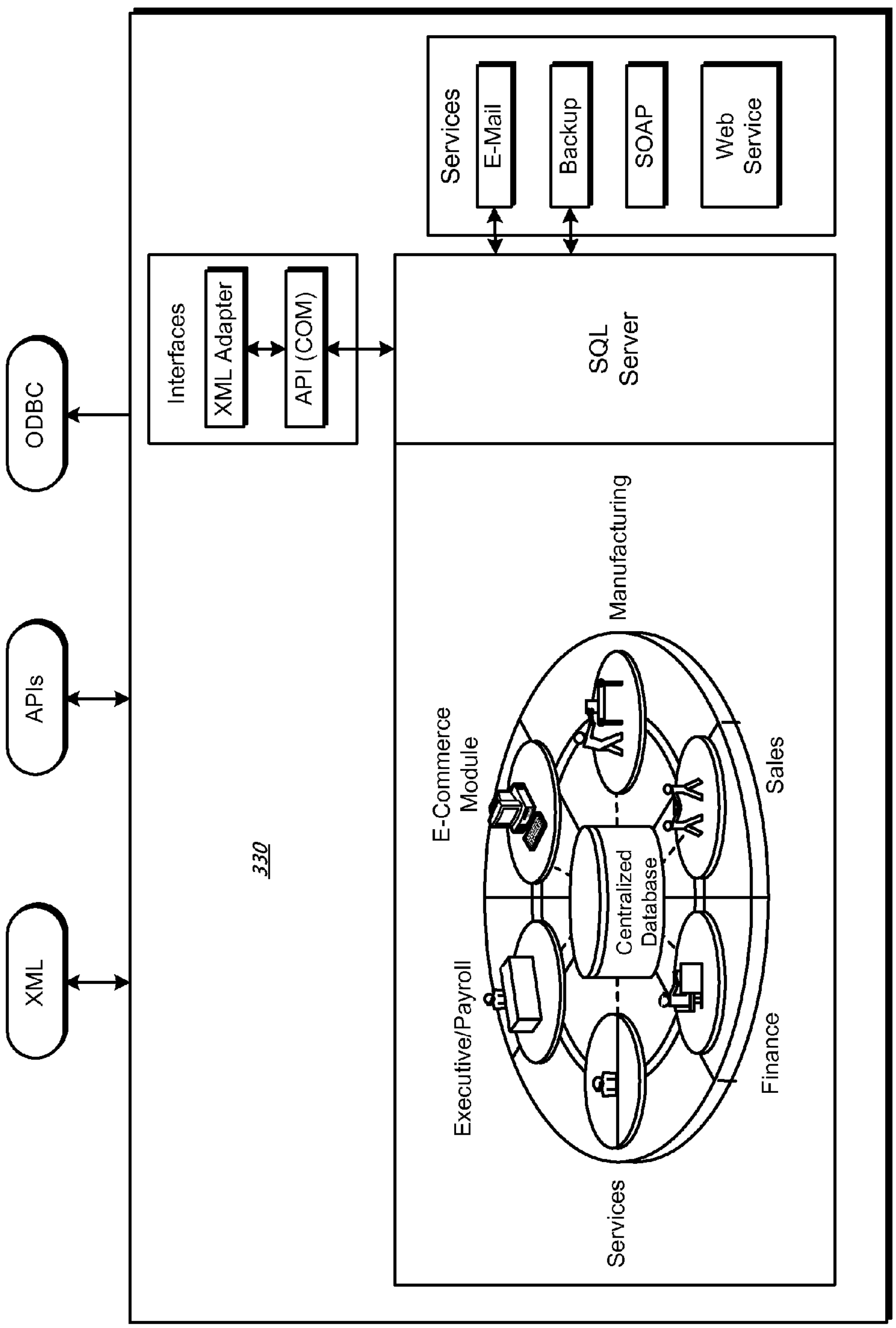
FIG. 4 illustrates an example application implementing certain techniques and components in accordance with one embodiment of the system of FIG. 1.

At a high level, business application 330 is any application, program, module, process, or other software that utilizes or facilitates the exchange of information via messages (or services) or the use of business objects. For example, application 330 may implement, utilize or otherwise leverage an enterprise service-oriented architecture (enterprise SOA), which may be considered a blueprint for an adaptable, flexible, and open IT architecture for developing services-based, enterprise-scale business solutions. This example enterprise service may be a series of web services combined with business logic that can be accessed and used repeatedly to support a particular business process. Aggregating web services into business-level enterprise services helps provide a more meaningful foundation for the task of automating enterprise-scale business scenarios Put simply, enterprise services help provide a holistic combination of actions that are semantically linked to complete the specific task, no matter how many cross-applications are involved. In certain cases, environment 300 may implement a composite application 330, as described below in FIG. 4. Regardless of the particular implementation, "software" may include software, firmware, wired or programmed hardware, or any combination thereof as appropriate. Indeed, application 330 may be written or described in any appropriate computer language including C, C++, Java, Visual Basic, assembler, Perl, any suitable version of 4GL, as well as others. For example, returning to the above mentioned composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's NET. It will be understood that while application 330 is illustrated in FIG. 4 as including various sub-modules, application 330 may include numerous other sub-modules or may instead be a single multi-tasked module that implements the various features and functionality through various objects, methods, or other processes. Further, while illustrated as internal to server 302, one or more processes associated with application 330 may be stored, referenced, or executed remotely. For example, a portion of application 330 may be a web service that is remotely called, while another portion of application 330 may be an interface object bundled for processing at remote client 304. Moreover, application 330 may be a child or sub-module of another software module or enterprise application (not illustrated) without departing from the scope of this disclosure. Indeed, application 330 may be a hosted solution that allows multiple related or third parties in different portions of the process to perform the respective processing.

More specifically, as illustrated in FIG. 4, application 330 may be a composite application, or an application built on other applications, that includes an object access layer (OAL) and a service layer. In this example, application 330 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help the composite application to orchestrate a business process in synchronization with other existing processes (e.g., native processes of enterprise base systems) and leverage existing investments in the IT platform. Further, composite application 330 may run on a heterogeneous IT platform. In doing so, composite application may be cross-functional in that it may drive business processes across different applications, technologies, and organizations. Accordingly, composite application 330 may drive end-to-end business processes across heterogeneous systems or sub-systems. Application 330 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes a composite application 330, it may instead be a standalone or (relatively) simple software program. Regardless, application 330 may also perform processing automatically, which may indicate that the appropriate processing is substantially performed by at least one component of environment 300. It should be understood that automatically further contemplates any suitable administrator or other user interaction with application 330 or other components of environment 300 without departing from the scope of this disclosure.

Returning to FIG. 3A, illustrated server 302 may also include interface 317 for communicating with other computer systems, such as clients 304, over network 312 in a client-server or other distributed environment. In certain embodiments, server 302 receives data from internal or external senders through interface 317 for storage in memory 327, for storage in DB 335, and/or processing by processor 325. Generally, interface 317 comprises logic encoded in software and/or hardware in a suitable combination and operable to communicate with network 312. More specifically, interface 317 may comprise software supporting one or more communications protocols associated with communications network 312 or hardware operable to communicate physical signals.

Network 312 facilitates wireless or wireline communication between computer server 302 and any other local or remote computer, such as clients 304. Network 312 may be all or a portion of an enterprise or secured network. In another example, network 312 may be a VPN merely between server 302 and client 304 across wireline or wireless link. Such an example wireless link may be via 802.11a, 802.11b, 802.11g, 802.20, WiMax, and many others. While illustrated as a single or continuous network, network 312 may be logically divided into various sub-nets or virtual networks without departing from the scope of this disclosure, so long as at least portion of network 312 may facilitate communications between server 302 and at least one client 304. For example, server 302 may be communicably coupled to one or more "local" repositories through one sub-net while communicably coupled to a particular client 304 or "remote" repositories through another. In other words, network 312 encompasses any internal or external network, networks, sub-network, or combination thereof operable to facilitate communications between various computing components in environment 300. Network 312 may communicate, for example, Internet Protocol (IP) packets, Frame Relay frames, Asynchronous Transfer Mode (ATM) cells, voice, video, data, and other suitable information between network addresses. Network 312 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 312 may be a secure network associated with the enterprise and certain local or remote vendors 306 and customers 308. As used in this disclosure, customer 308 is any person, department, organization, small business, enterprise, or any other entity that may use or request others to use environment 300. As described above, vendors 306 also may be local or remote to customer 308. Indeed, a particular vendor 306 may provide some content to business application 330, while receiving or purchasing other content (at the same or different times) as customer 308. As illustrated, customer 308 and vendor 06 each typically perform some processing (such as uploading or purchasing content) using a computer, such as client 304.

Client 304 is any computing device operable to connect or communicate with server 302 or network 312 using any communication link. For example, client 304 is intended to encompass a personal computer, touch screen terminal, workstation, network computer, kiosk, wireless data port, smart phone, personal data assistant (PDA), one or more processors within these or other devices, or any other suitable processing device used by or for the benefit of business 308, vendor 306, or some other user or entity. At a high level, each client 304 includes or executes at least GUI 336 and comprises an electronic computing device operable to receive, transmit, process and store any appropriate data associated with environment 300. It will be understood that there may be any number of clients 304 communicably coupled to server 302. Further, "client 304," "business," "business analyst," "end user," and "user" may be used interchangeably as appropriate without departing from the scope of this disclosure. Moreover, for ease of illustration, each client 304 is described in terms of being used by one user. But this disclosure contemplates that many users may use one computer or that one user may use multiple computers. For example, client 304 may be a PDA operable to wirelessly connect with external or unsecured network. In another example, client 304 may comprise a laptop that includes an input device, such as a keypad, touch screen, mouse, or other device that can accept information, and an output device that conveys information associated with the operation of server 302 or clients 304, including digital data, visual information, or GUI 336. Both the input device and output device may include fixed or removable storage media such as a magnetic computer disk, CD-ROM, or other suitable media to both receive input from and provide output to users of clients 304 through the display, namely the client portion of GUI or application interface 336.

GUI 336 comprises a graphical user interface operable to allow the user of client 304 to interface with at least a portion of environment 300 for any suitable purpose, such as viewing application or other transaction data. Generally, GUI 336 provides the particular user with an efficient and user-friendly presentation of data provided by or communicated within environment 300. For example, GUI 336 may present the user with the components and information that is relevant to their task, increase reuse of such components, and facilitate a sizable developer community around those components. GUI 336 may comprise a plurality of customizable frames or views having interactive fields, pull-down lists, and buttons operated by the user. For example, GUI 336 is operable to display data involving business objects and interfaces in a user-friendly form based on the user context and the displayed data. In another example, GUI 336 is operable to display different levels and types of information involving business objects and interfaces based on the identified or supplied user role. GUI 336 may also present a plurality of portals or dashboards. For example, GUI 336 may display a portal that allows users to view, create, and manage historical and real-time reports including role-based reporting and such. Of course, such reports may be in any appropriate output format including PDF, HTML, and printable text. Real-time dashboards often provide table and graph information on the current state of the data, which may be supplemented by business objects and interfaces. It should be understood that the term graphical user interface may be used in the singular or in the plural to describe one or more graphical user interfaces and each of the displays of a particular graphical user interface. Indeed, reference to GUI 336 may indicate a reference to the front-end or a component of business application 330, as well as the particular interface accessible via client 304, as appropriate, without departing from the scope of this disclosure. Therefore, GUI 336 contemplates any graphical user interface, such as a generic web browser or touchscreen, that processes information in environment 300 and efficiently presents the results to the user. Server 302 can accept data from client 304 via the web browser (e.g., Microsoft Internet Explorer or Netscape Navigator) and return the appropriate HTML or XML responses to the browser using network 312.

Figure 3B:
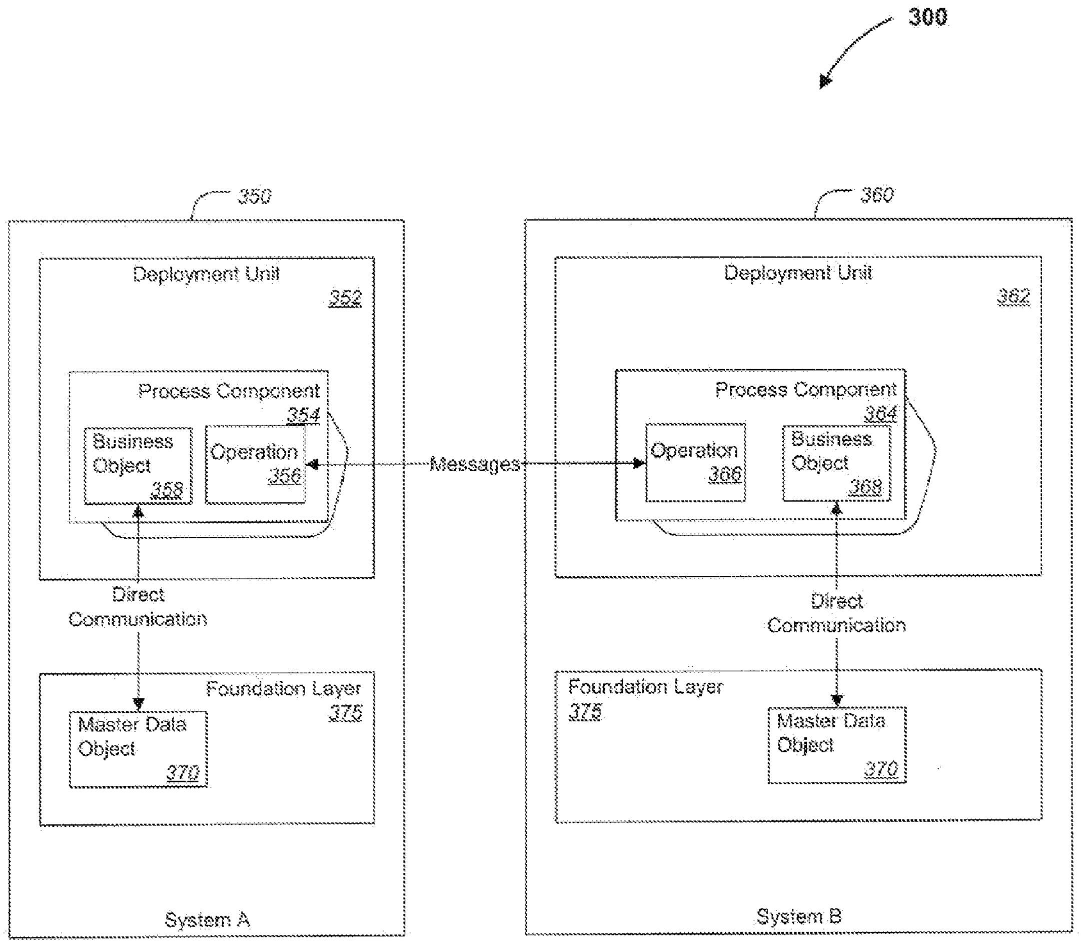

More generally in environment 300 as depicted in FIG. 3B, a Foundation Layer 375 can be deployed on multiple separate and distinct hardware platforms, e.g., System A 350 and System B 360, to support application software deployed as two or more deployment units distributed on the platforms, including deployment unit 352 deployed on System A and deployment unit 362 deployed on System B. In this example, the foundation layer can be used to support application software deployed in an application layer. In particular, the foundation layer can be used in connection with application software implemented in accordance with a software architecture that provides a suite of enterprise service operations having various application functionality. In some implementations, the application software is implemented to be deployed on an application platform that includes a foundation layer that contains all fundamental entities that can used from multiple deployment units. These entities can be process components, business objects, and reuse service components. A reuse service component is a piece of software that is reused in different transactions. A reuse service component is used by its defined interfaces, which can be, e.g., local APIs or service interfaces. As explained above, process components in separate deployment units interact through service operations, as illustrated by messages passing between service operations 356 and 366, which are implemented in process components 354 and 364, respectively, which are included in deployment units 352 and 362, respectively. As also explained above, some form of direct communication is generally the form of interaction used between a business object, e.g., business object 358 and 368, of an application deployment unit and a business object, such as master data object 370, of the Foundation Layer 375.

Various components of the present disclosure may be modeled using a model-driven environment. For example, the model-driven framework or environment may allow the developer to use simple drag-and-drop techniques to develop pattern-based or freestyle user interfaces and define the flow of data between them. The result could be an efficient, customized, visually rich online experience. In some cases, this model-driven development may accelerate the application development process and foster business-user self-service. It further enables business analysts or IT developers to compose visually rich applications that use analytic services, enterprise services, remote function calls (RFCs), APIs, and stored procedures. In addition, it may allow them to reuse existing applications and create content using a modeling process and a visual user interface instead of manual coding.

Figure 5A:
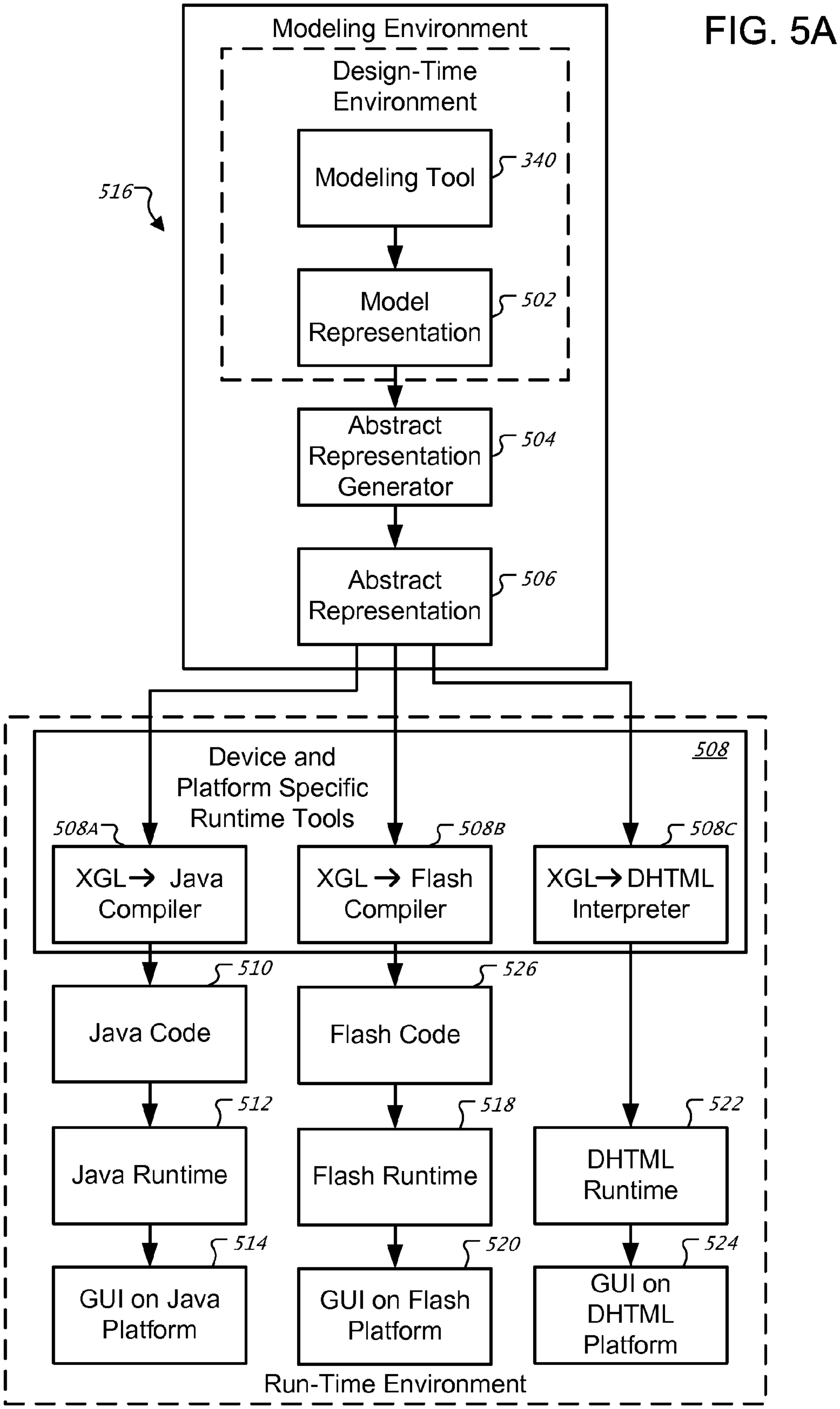
FIG. 5A depicts an example development environment in accordance with one embodiment of FIG. 1.

FIG. 5A depicts an example modeling environment 516, namely a modeling environment, in accordance with one embodiment of the present disclosure. Thus, as illustrated in FIG. 5A, such a modeling environment 516 may implement techniques for decoupling models created during design-time from the runtime environment. In other words, model representations for GUIs created in a design time environment are decoupled from the runtime environment in which the GUIs are executed. Often in these environments, a declarative and executable representation for GUIs for applications is provided that is independent of any particular runtime platform, GUI framework, device, or programming language.

According to some embodiments, a modeler (or other analyst) may use the model-driven modeling environment 516 to create pattern-based or freestyle user interfaces using simple drag-and-drop services. Because this development may be model-driven, the modeler can typically compose an application using models of business objects without having to write much, if any, code. In some cases, this example modeling environment 516 may provide a personalized, secure interface that helps unify enterprise applications, information, and processes into a coherent, role-based portal experience. Further, the modeling environment 516 may allow the developer to access and share information and applications in a collaborative environment. In this way, virtual collaboration rooms allow developers to work together efficiently, regardless of where they are located, and may enable powerful and immediate communication that crosses organizational boundaries while enforcing security requirements. Indeed, the modeling environment 516 may provide a shared set of services for finding, organizing, and accessing unstructured content stored in third-party repositories and content management systems across various networks 312. Classification tools may automate the organization of information, while subject-matter experts and content managers can publish information to distinct user audiences. Regardless of the particular implementation or architecture, this modeling environment 516 may allow the developer to easily model hosted business objects 140 using this model-driven approach.

In certain embodiments, the modeling environment 516 may implement or utilize a generic, declarative, and executable GUI language (generally described as XGL). This example XGL is generally independent of any particular GUI framework or runtime platform. Further, XGL is normally not dependent on characteristics of a target device on which the graphic user interface is to be displayed and may also be independent of any programming language. XGL is used to generate a generic representation (occasionally referred to as the XGL representation or XGL-compliant representation) for a design-time model representation. The XGL representation is thus typically a device-independent representation of a GUI. The XGL representation is declarative in that the representation does not depend on any particular GUI framework, runtime platform, device, or programming language. The XGL representation can be executable and therefore can unambiguously encapsulate execution semantics for the GUI described by a model representation. In short, models of different types can be transformed to XGL representations.

The XGL representation may be used for generating representations of various different GUIs and supports various GUI features including full windowing and componentization support, rich data visualizations and animations, rich modes of data entry and user interactions, and flexible connectivity to any complex application data services. While a specific embodiment of XGL is discussed, various other types of XGLs may also be used in alternative embodiments. In other words, it will be understood that XGL is used for example description only and may be read to include any abstract or modeling language that can be generic, declarative, and executable.

Turning to the illustrated embodiment in FIG. 5A, modeling tool 340 may be used by a GUI designer or business analyst during the application design phase to create a model representation 502 for a GUI application. It will be understood that modeling environment 516 may include or be compatible with various different modeling tools 340 used to generate model representation 502. This model representation 502 may be a machine-readable representation of an application or a domain specific model. Model representation 502 generally encapsulates various design parameters related to the GUI such as GUI components, dependencies between the GUI components, inputs and outputs, and the like. Put another way, model representation 502 provides a form in which the one or more models can be persisted and transported, and possibly handled by various tools such as code generators, runtime interpreters, analysis and validation tools, merge tools, and the like. In one embodiment, model representation 502 maybe a collection of XML documents with a well-formed syntax.

Illustrated modeling environment 516 also includes an abstract representation generator (or XGL generator) 504 operable to generate an abstract representation (for example, XGL representation or XGL-compliant representation) 506 based upon model representation 502. Abstract representation generator 504 takes model representation 502 as input and outputs abstract representation 506 for the model representation. Model representation 502 may include multiple instances of various forms or types depending on the tool/language used for the modeling. In certain cases, these various different model representations may each be mapped to one or more abstract representations 506. Different types of model representations may be transformed or mapped to XGL representations. For each type of model representation, mapping rules may be provided for mapping the model representation to the XGL representation 506. Different mapping rules may be provided for mapping a model representation to an XGL representation.

This XGL representation 506 that is created from a model representation may then be used for processing in the runtime environment. For example, the XGL representation 506 may be used to generate a machine-executable runtime GUI (or some other runtime representation) that may be executed by a target device. As part of the runtime processing, the XGL representation 506 may be transformed into one or more runtime representations, which may indicate source code in a particular programming language, machine-executable code for a specific runtime environment, executable GUI, and so forth, which may be generated for specific runtime environments and devices. Since the XGL representation 506, rather than the design-time model representation, is used by the runtime environment, the design-time model representation is decoupled from the runtime environment. The XGL representation 506 can thus serve as the common ground or interface between design-time user interface modeling tools and a plurality of user interface runtime frameworks. It provides a self-contained, closed, and deterministic definition of all aspects of a graphical user interface in a device-independent and programming-language independent manner. Accordingly, abstract representation 506 generated for a model representation 502 is generally declarative and executable in that it provides a representation of the GUI of model representation 502 that is not dependent on any device or runtime platform, is not dependent on any programming language, and unambiguously encapsulates execution semantics for the GUI. The execution semantics may include, for example, identification of various components of the GUI, interpretation of connections between the various GUI components, information identifying the order of sequencing of events, rules governing dynamic behavior of the GUI, rules governing handling of values by the GUI, and the like. The abstract representation 506 is also not GUI runtime-platform specific. The abstract representation 506 provides a self-contained, closed, and deterministic definition of all aspects of a graphical user interface that is device independent and language independent.

Abstract representation 506 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs), the GUI generated by the devices are consistent with each other in their appearance and behavior.

Abstract representation generator 504 may be configured to generate abstract representation 506 for models of different types, which may be created using different modeling tools 340. It will be understood that modeling environment 516 may include some, none, or other sub-modules or components as those shown in this example illustration. In other words, modeling environment 516 encompasses the design-time environment (with or without the abstract generator or the various representations), a modeling toolkit (such as 340) linked with a developer's space, or any other appropriate software operable to decouple models created during design-time from the runtime environment. Abstract representation 506 provides an interface between the design time environment and the runtime environment. As shown, this abstract representation 506 may then be used by runtime processing.

As part of runtime processing, modeling environment 516 may include various runtime tools 508 and may generate different types of runtime representations based upon the abstract representation 506. Examples of runtime representations include device or language-dependent (or specific) source code, runtime platform-specific machine-readable code, GUIs for a particular target device, and the like. The runtime tools 508 may include compilers, interpreters, source code generators, and other such tools that are configured to generate runtime platform-specific or target device-specific runtime representations of abstract representation 506. The runtime tool 508 may generate the runtime representation from abstract representation 506 using specific rules that map abstract representation 506 to a particular type of runtime representation. These mapping rules may be dependent on the type of runtime tool, characteristics of the target device to be used for displaying the GUI, runtime platform, and/or other factors. Accordingly, mapping rules may be provided for transforming the abstract representation 506 to any number of target runtime representations directed to one or more target GUI runtime platforms. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

For example, as depicted in example FIG. 5A, an XGL-to-Java compiler 508A may take abstract representation 506 as input and generate Java code 510 for execution by a target device comprising a Java runtime 512. Java runtime 512 may execute Java code 510 to generate or display a GUI 514 on a Java-platform target device. As another example, an XGL-to-Flash compiler 508B may take abstract representation 506 as input and generate Flash code 526 for execution by a target device comprising a Flash runtime 518. Flash runtime 518 may execute Flash code 516 to generate or display a GUI 520 on a target device comprising a Flash platform. As another example, an XGL-to-DHTML (dynamic HTML) interpreter 508C may take abstract representation 506 as input and generate DHTML statements (instructions) on the fly which are then interpreted by a DHTML runtime 522 to generate or display a GUI 524 on a target device comprising a DHTML platform.

It should be apparent that abstract representation 506 may be used to generate GUIs for Extensible Application Markup Language (XAML) or various other runtime platforms and devices. The same abstract representation 506 may be mapped to various runtime representations and device-specific and runtime platform-specific GUIs. In general, in the runtime environment, machine executable instructions specific to a runtime environment may be generated based upon the abstract representation 506 and executed to generate a GUI in the runtime environment. The same XGL representation may be used to generate machine executable instructions specific to different runtime environments and target devices.

According to certain embodiments, the process of mapping a model representation 502 to an abstract representation 506 and mapping an abstract representation 506 to some runtime representation may be automated. For example, design tools may automatically generate an abstract representation for the model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Since the runtime environment uses abstract representation 506 rather than model representation 502 for runtime processing, the model representation 502 that is created during design-time is decoupled from the runtime environment. Abstract representation 506 thus provides an interface between the modeling environment and the runtime environment. As a result, changes may be made to the design time environment, including changes to model representation 502 or changes that affect model representation 502, generally to not substantially affect or impact the runtime environment or tools used by the runtime environment. Likewise, changes may be made to the runtime environment generally to not substantially affect or impact the design time environment. A designer or other developer can thus concentrate on the design aspects and make changes to the design without having to worry about the runtime dependencies such as the target device platform or programming language dependencies.

Figure 5B:
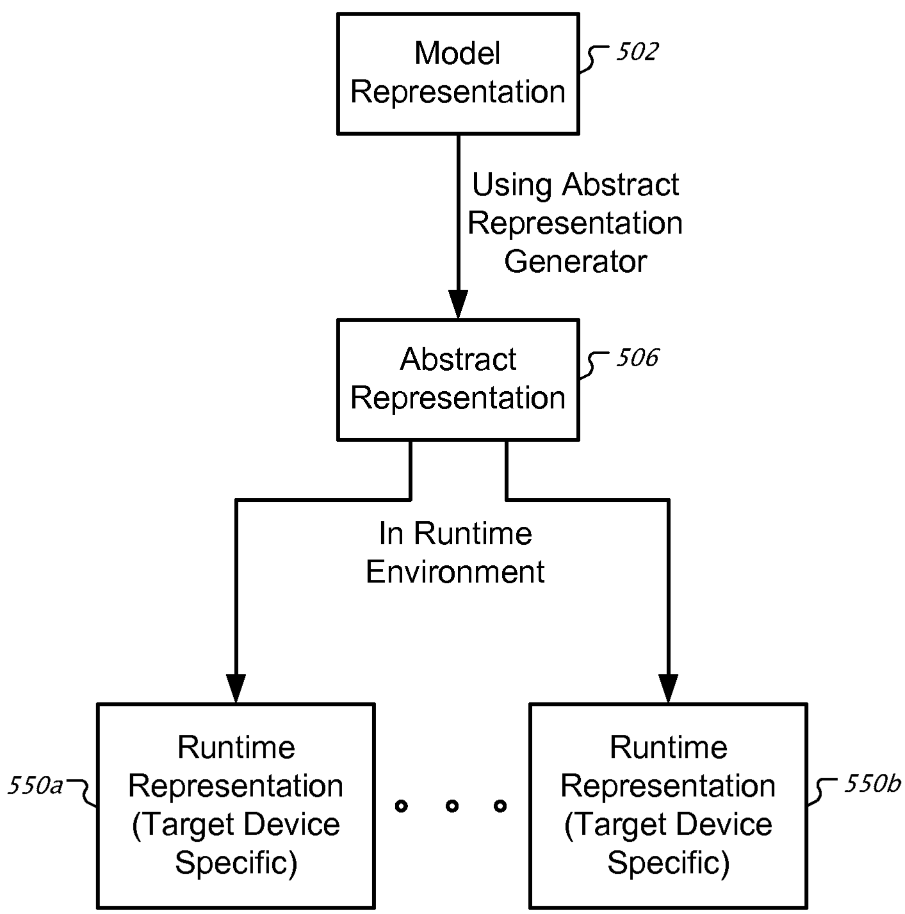
FIG. 5B depicts a simplified process for mapping a model representation to a runtime representation using the example development environment of FIG. 5A or some other development environment.

FIG. 5B depicts an example process for mapping a model representation 502 to a runtime representation using the example modeling environment 516 of FIG. 5A or some other modeling environment. Model representation 502 may comprise one or more model components and associated properties that describe a data object, such as hosted business objects and interfaces. As described above, at least one of these model components is based on or otherwise associated with these hosted business objects and interfaces. The abstract representation 506 is generated based upon model representation 502. Abstract representation 506 may be generated by the abstract representation generator 504. Abstract representation 506 comprises one or more abstract GUI components and properties associated with the abstract GUI components. As part of generation of abstract representation 506, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI, such as in response to events whether clicking/dragging or scrolling, interactions between GUI components and such.

One or more runtime representations 550*a*, including GUIs for specific runtime environment platforms, may be generated from abstract representation 506. A device-dependent runtime representation may be generated for a particular type of target device platform to be used for executing and displaying the GUI encapsulated by the abstract representation. The GUIs generated from abstract representation 506 may comprise various types of GUI elements such as buttons, windows, scrollbars, input boxes, etc. Rules may be provided for mapping an abstract representation to a particular runtime representation. Various mapping rules may be provided for different runtime environment platforms.

Methods and systems consistent with the subject matter described herein provide and use interfaces 320 derived from the business object model 318 suitable for use with more than one business area, for example different departments within a company such as finance, or marketing. Also, they are suitable across industries and across businesses. Interfaces 320 are used during an end-to-end business transaction to transfer business process information in an application-independent manner. For example the interfaces can be used for fulfilling a sales order.

1. Message Overview

To perform an end-to-end business transaction, consistent interfaces are used to create business documents that are sent within messages between heterogeneous programs or modules.

(a) Message Categories

Figure 6:
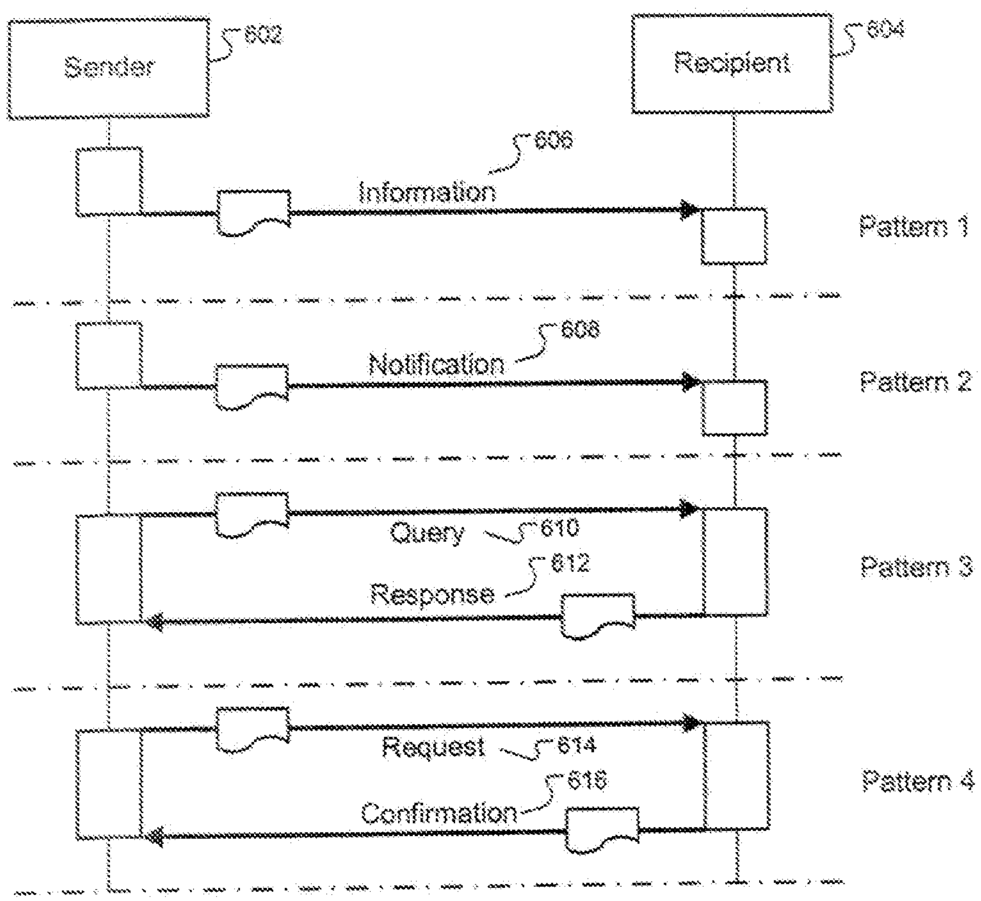
FIG. 6 depicts message categories in accordance with methods and systems consistent with the subject matter described herein.

As depicted in FIG. 6, the communication between a sender 602 and a recipient 604 can be broken down into basic categories that describe the type of the information exchanged and simultaneously suggest the anticipated reaction of the recipient 604. A message category is a general business classification for the messages. Communication is sender-driven. In other words, the meaning of the message categories is established or formulated from the perspective of the sender 602. The message categories include information 606, notification 608, query 610, response 612, request 614, and confirmation 616.

(i) Information

Information 606 is a message sent from a sender 602 to a recipient 604 concerning a condition or a statement of affairs. No reply to information is expected. Information 606 is sent to make business partners or business applications aware of a situation. Information 606 is not compiled to be application-specific. Examples of "information" are an announcement, advertising, a report, planning information, and a message to the business warehouse.

(ii) Notification

A notification 608 is a notice or message that is geared to a service. A sender 602 sends the notification 608 to a recipient 604. No reply is expected for a notification. For example, a billing notification relates to the preparation of an invoice while a dispatched delivery notification relates to preparation for receipt of goods.

(iii) Query

A query 610 is a question from a sender 602 to a recipient 604 to which a response 612 is expected. A query 610 implies no assurance or obligation on the part of the sender 602.

Examples of a query 610 are whether space is available on a specific flight or whether a specific product is available. These queries do not express the desire for reserving the flight or purchasing the product.

(iv) Response

A response 612 is a reply to a query 610. The recipient 604 sends the response 612 to the sender 602. A response 612 generally implies no assurance or obligation on the part of the recipient 604. The sender 602 is not expected to reply. Instead, the process is concluded with the response 612. Depending on the business scenario, a response 612 also may include a commitment, i.e., an assurance or obligation on the part of the recipient 604. Examples of responses 612 are a response stating that space is available on a specific flight or that a specific product is available. With these responses, no reservation was made.

(v) Request

A request 614 is a binding requisition or requirement from a sender 602 to a recipient 604. Depending on the business scenario, the recipient 604 can respond to a request 614 with a confirmation 616. The request 614 is binding on the sender 602. In making the request 614, the sender 602 assumes, for example, an obligation to accept the services rendered in the request 614 under the reported conditions. Examples of a request 614 are a parking ticket, a purchase order, an order for delivery and a job application.

(vi) Confirmation

A confirmation 616 is a binding reply that is generally made to a request 614. The recipient 604 sends the confirmation 616 to the sender 602. The information indicated in a confirmation 616, such as deadlines, products, quantities and prices, can deviate from the information of the preceding request 614. A request 614 and confirmation 616 may be used in negotiating processes. A negotiating process can consist of a series of several request 614 and confirmation 616 messages. The confirmation 616 is binding on the recipient 604. For example, 100 units of X may be ordered in a purchase order request; however, only the delivery of 80 units is confirmed in the associated purchase order confirmation.

(b) Message Choreography

A message choreography is a template that specifies the sequence of messages between business entities during a given transaction. The sequence with the messages contained in it describes in general the message "lifecycle" as it proceeds between the business entities. If messages from a choreography are used in a business transaction, they appear in the transaction in the sequence determined by the choreography. This illustrates the template character of a choreography, i.e., during an actual transaction, it is not necessary for all messages of the choreography to appear. Those messages that are contained in the transaction, however, follow the sequence within the choreography. A business transaction is thus a derivation of a message choreography. The choreography makes it possible to determine the structure of the individual message types more precisely and distinguish them from one another.

2. Components of the Business Object Model

The overall structure of the business object model ensures the consistency of the interfaces that are derived from the business object model. The derivation ensures that the same business-related subject matter or concept is represented and structured in the same way in all interfaces.

The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Each business object is generally a capsule with an internal hierarchical structure, behavior offered by its operations, and integrity constraints. Business objects are semantically disjoint, i.e., the same business information is represented once. In the business object model, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects are arranged from the top to the bottom based on defined order of the business areas, e.g., finance could be arranged at the top of the business object model with CRM below finance and SRM below CRM.

To ensure the consistency of interfaces, the business object model may be built using standardized data types as well as packages to group related elements together, and package templates and entity templates to specify the arrangement of packages and entities within the structure.

(a) Data Types

Data types are used to type object entities and interfaces with a structure. This typing can include business semantic. Such data types may include those generally described at pages 96 through 1642 (which are incorporated by reference herein) of U.S. patent application Ser. No. 11/803,178, filed on May 11, 2007 and entitled "Consistent Set Of Interfaces Derived From A Business Object Model". For example, the data type BusinessTransactionDocumentID is a unique identifier for a document in a business transaction. Also, as an example, Data type BusinessTransactionDocumentParty contains the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types are based on Core Component Types ("CCTs"), which themselves are based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is typically constructed with reference to a use and is thus a use-specific assembly of GDTs and CDTs. The data types can be aggregated to complex data types.

To achieve a harmonization across business objects and interfaces, the same subject matter is typed with the same data type. For example, the data type "GeoCoordinates" is built using the data type "Measure" so that the measures in a GeoCoordinate (i.e., the latitude measure and the longitude measure) are represented the same as other "Measures" that appear in the business object model.

(b) Entities

Entities are discrete business elements that are used during a business transaction. Entities are not to be confused with business entities or the components that interact to perform a transaction. Rather, "entities" are one of the layers of the business object model and the interfaces. For example, a Catalogue entity is used in a Catalogue Publication Request and a Purchase Order is used in a Purchase Order Request. These entities are created using the data types defined above to ensure the consistent representation of data throughout the entities.

(c) Packages

Packages group the entities in the business object model and the resulting interfaces into groups of semantically associated information. Packages also may include "sub"-packages, i.e., the packages may be nested.

Figure 7:
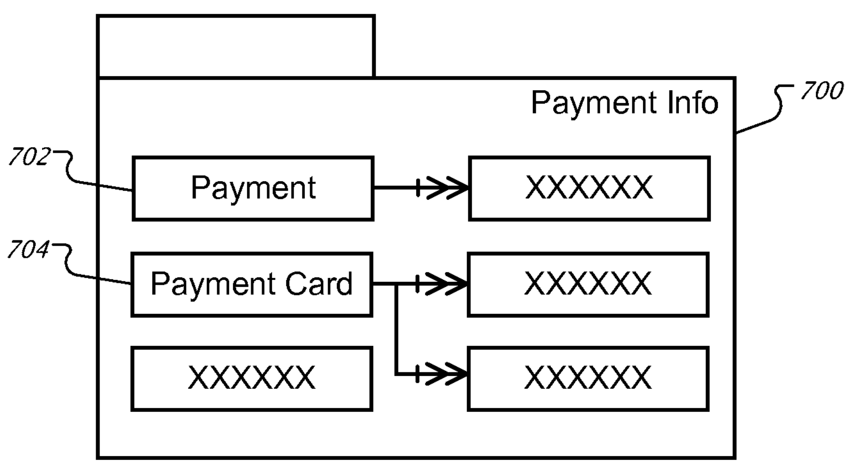
FIG. 7 depicts an example of a package in accordance with methods and systems consistent with the subject matter described herein.

Packages may group elements together based on different factors, such as elements that occur together as a rule with regard to a business-related aspect. For example, as depicted in FIG. 7, in a Purchase Order, different information regarding the purchase order, such as the type of payment 702, and payment card 704, are grouped together via the PaymentInformation package 700.

Figure 8:
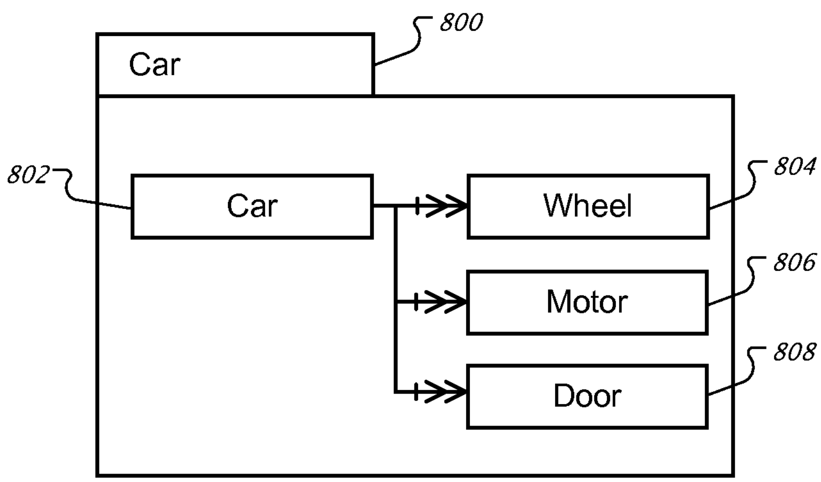
FIG. 8 depicts another example of a package in accordance with methods and systems consistent with the subject matter described herein.

Packages also may combine different components that result in a new object. For example, as depicted in FIG. 8, the components wheels 804, motor 806, and doors 808 are combined to form a composition "Car" 802. The "Car" package 800 includes the wheels, motor and doors as well as the composition "Car."

Figure 9:
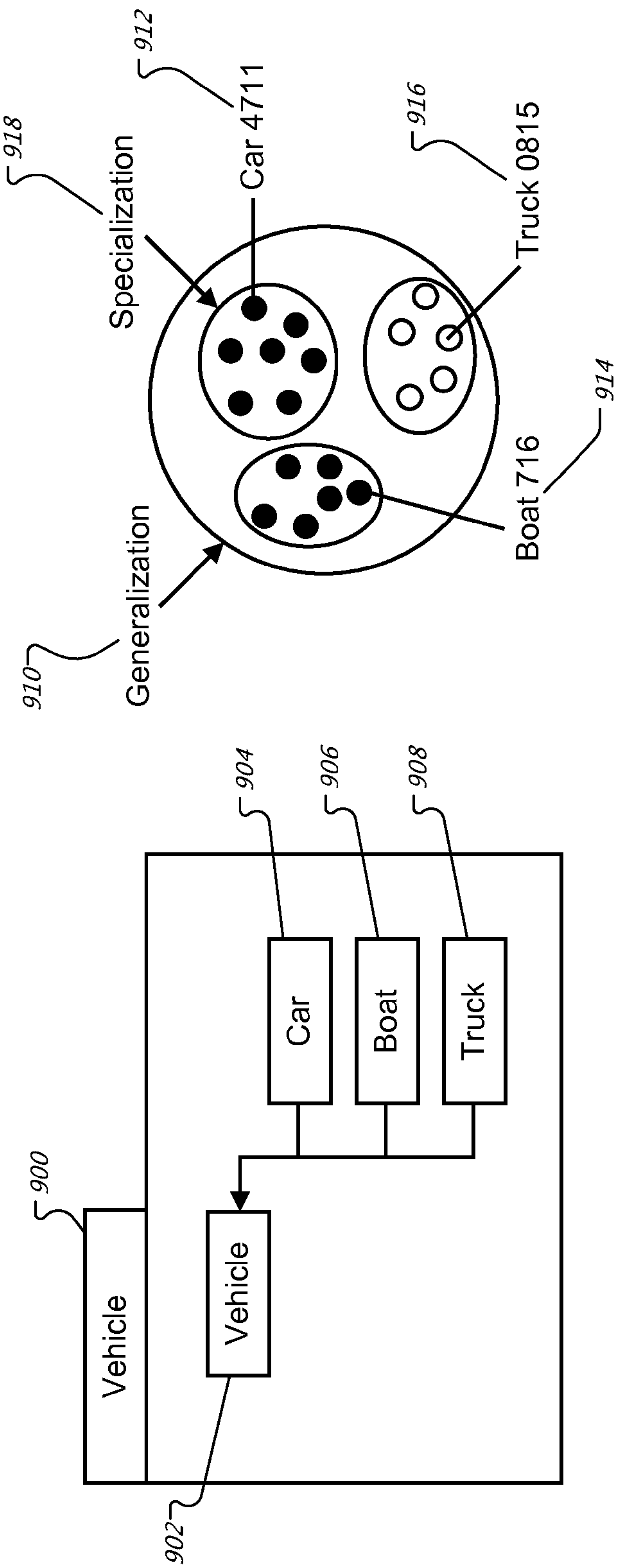
FIG. 9 depicts a third example of a package in accordance with methods and systems consistent with the subject matter described herein.

Another grouping within a package may be subtypes within a type. In these packages, the components are specialized forms of a generic package. For example, as depicted in FIG. 9, the components Car 904, Boat 906, and Truck 908 can be generalized by the generic term Vehicle 902 in Vehicle package 900. Vehicle in this case is the generic package 910, while Car 912, Boat 914, and Truck 916 are the specializations 918 of the generalized vehicle 910.

Figure 10:
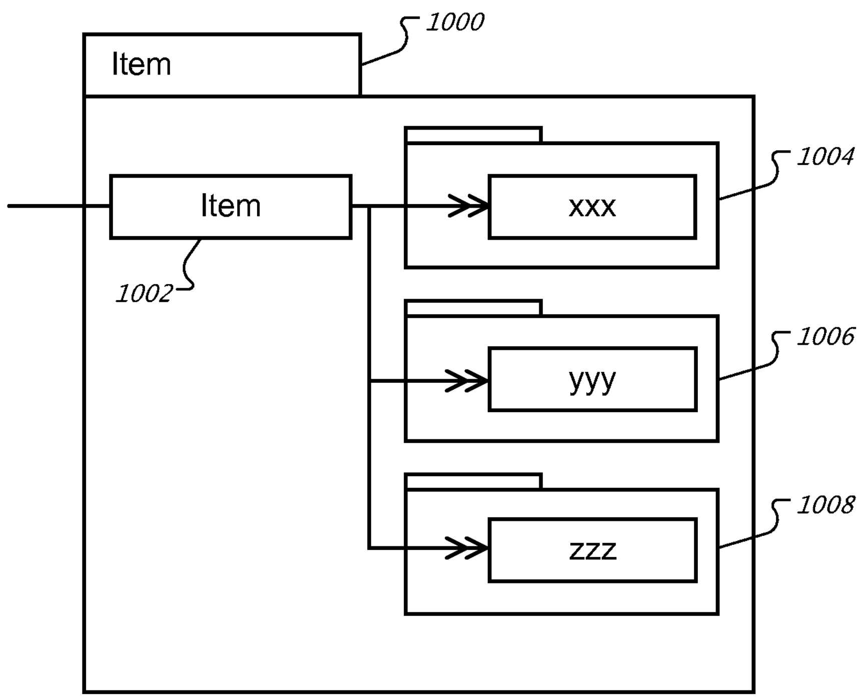
FIG. 10 depicts a fourth example of a package in accordance with methods and systems consistent with the subject matter described herein.

Packages also may be used to represent hierarchy levels. For example, as depicted in FIG. 10, the Item Package 1000 includes Item 1002 with subitem xxx 1004, subitem yyy 1006, and subitem zzz 1008.

Figure 11:
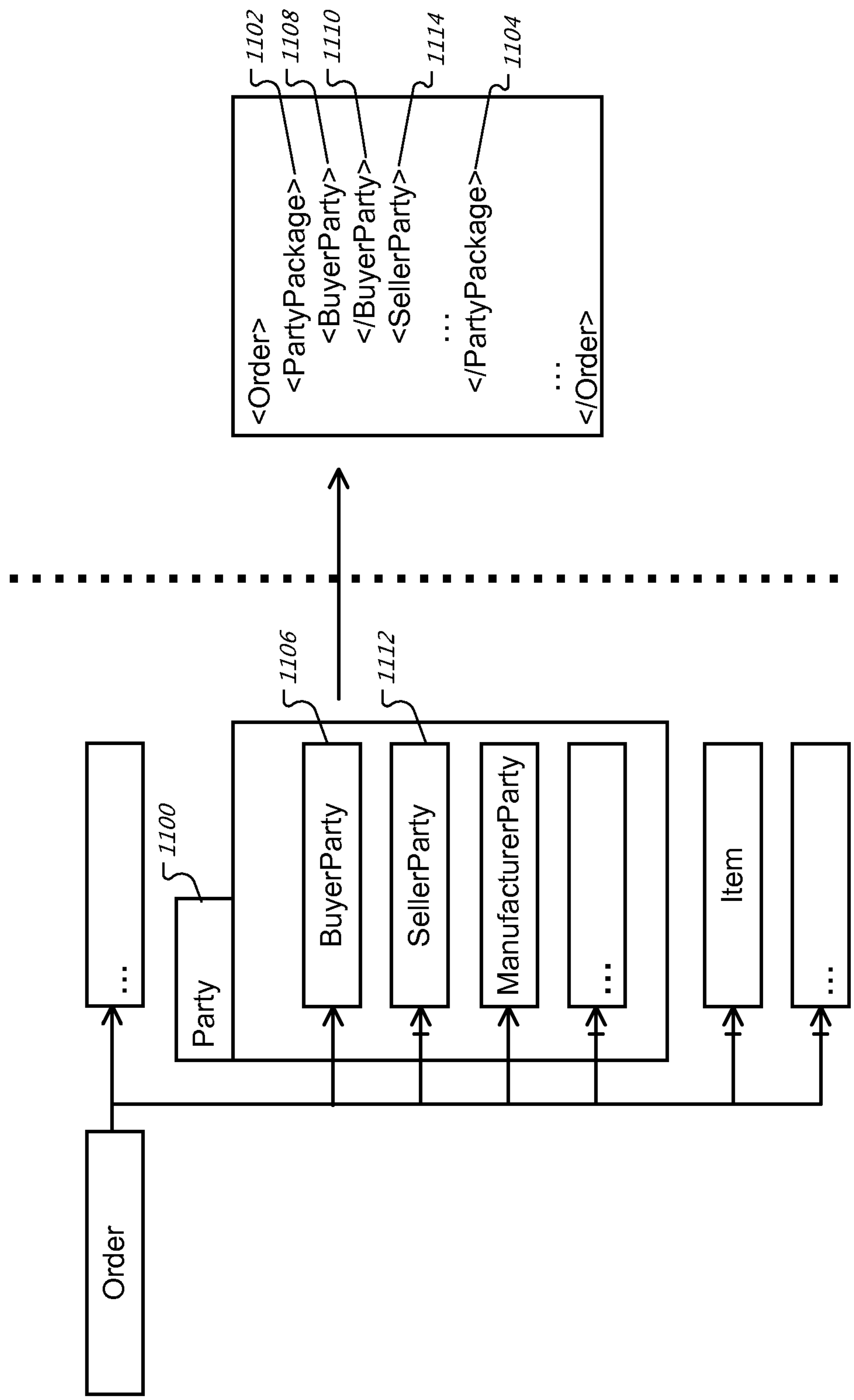
FIG. 11 depicts the representation of a package in the XML schema in accordance with methods and systems consistent with the subject matter described herein.

Packages can be represented in the XML schema as a comment. One advantage of this grouping is that the document structure is easier to read and is more understandable. The names of these packages are assigned by including the object name in brackets with the suffix "Package." For example, as depicted in FIG. 11, Party package 1100 is enclosed by <PartyPackage> 1102 and <PartyPackage> 1104. Party package 1100 illustratively includes a Buyer Party 1106, identified by <BuyerParty> 1108 and <BuyerParty> 1110, and a Seller Party 1112, identified by <SellerParty> 1114 and <SellerParty>, etc.

(d) Relationships

Relationships describe the interdependencies of the entities in the business object model, and are thus an integral part of the business object model.

(i) Cardinality of Relationships

Figure 12:
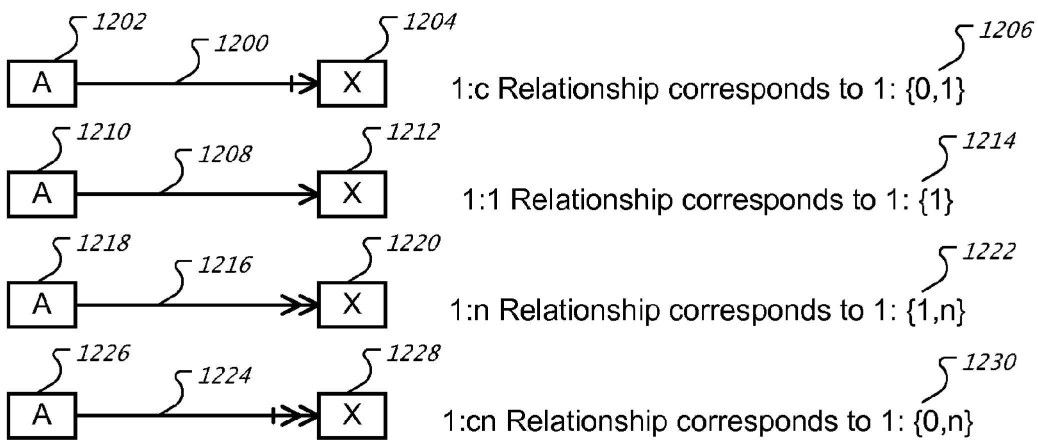
FIG. 12 depicts a graphical representation of cardinalities between two entities in accordance with methods and systems consistent with the subject matter described herein.

FIG. 12 depicts a graphical representation of the cardinalities between two entities. The cardinality between a first entity and a second entity identifies the number of second entities that could possibly exist for each first entity. Thus, a 1:c cardinality 1200 between entities A 1202 and X 1204 indicates that for each entity A 1202, there is either one or zero 1206 entity X 1204. A 1:1 cardinality 1208 between entities A 1210 and X 1212 indicates that for each entity A 1210, there is exactly one 1214 entity X 1212. A 1:n cardinality 1216 between entities A 1218 and X 1220 indicates that for each entity A 1218, there are one or more 1222 entity Xs 1220. A 1:cn cardinality 1224 between entities A 1226 and X 1228 indicates that for each entity A 1226, there are any number 1230 of entity Xs 1228 (i.e., 0 through n Xs for each A).

(ii) Types of Relationships a. Composition

Figure 13:
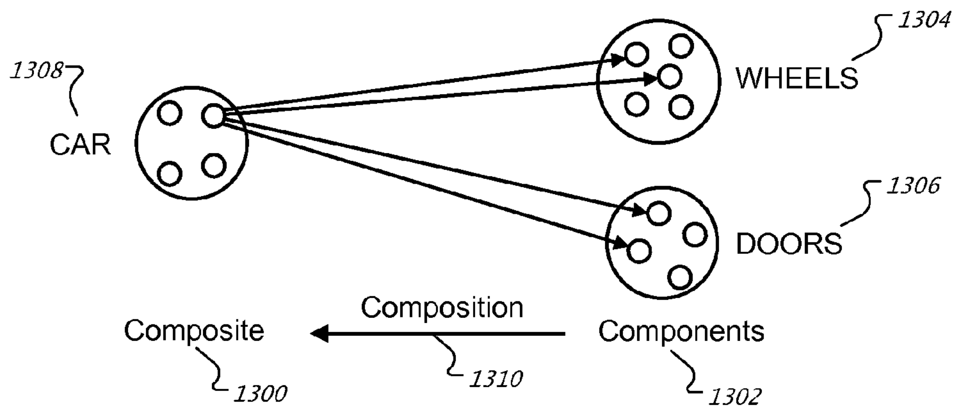
FIG. 13 depicts an example of a composition in accordance with methods and systems consistent with the subject matter described herein.
Figure 14:
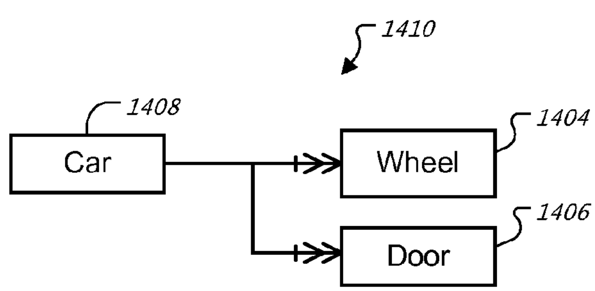
FIG. 14 depicts an example of a hierarchical relationship in accordance with methods and systems consistent with the subject matter described herein.

A composition or hierarchical relationship type is a strong whole-part relationship which is used to describe the structure within an object. The parts, or dependent entities, represent a semantic refinement or partition of the whole, or less dependent entity. For example, as depicted in FIG. 13, the components 1302, wheels 1304, and doors 1306 may be combined to form the composite 1300 "Car" 1308 using the composition 1310. FIG. 14 depicts a graphical representation of the composition 1410 between composite Car 1408 and components wheel 1404 and door 1406.

b. Aggregation

Figure 15:
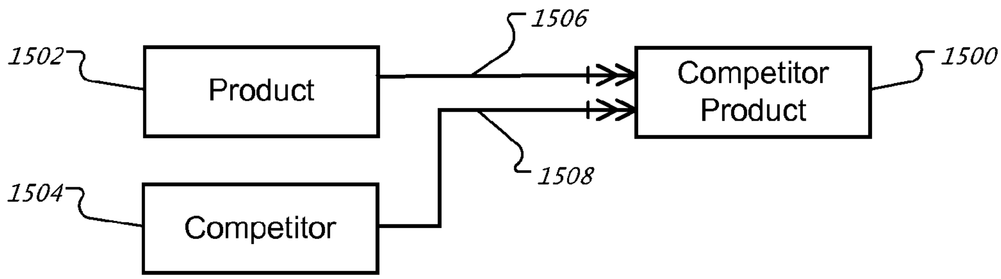
FIG. 15 depicts an example of an aggregating relationship in accordance with methods and systems consistent with the subject matter described herein.

An aggregation or an aggregating relationship type is a weak whole-part relationship between two objects. The dependent object is created by the combination of one or several less dependent objects. For example, as depicted in FIG. 15, the properties of a competitor product 1500 are determined by a product 1502 and a competitor 1504. A hierarchical relationship 1506 exists between the product 1502 and the competitor product 1500 because the competitor product 1500 is a component of the product 1502. Therefore, the values of the attributes of the competitor product 1500 are determined by the product 1502. An aggregating relationship 1508 exists between the competitor 1504 and the competitor product 1500 because the competitor product 1500 is differentiated by the competitor 1504. Therefore the values of the attributes of the competitor product 1500 are determined by the competitor 1504.

c. Association

Figure 16:
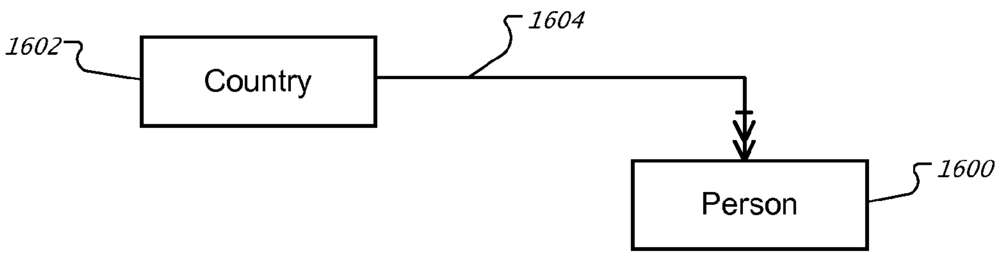
FIG. 16 depicts an example of an association in accordance with methods and systems consistent with the subject matter described herein.

An association or a referential relationship type describes a relationship between two objects in which the dependent object refers to the less dependent object. For example, as depicted in FIG. 16, a person 1600 has a nationality, and thus, has a reference to its country 1602 of origin. There is an association 1604 between the country 1602 and the person 1600. The values of the attributes of the person 1600 are not determined by the country 1602.

(iii) Specialization

Figure 17:
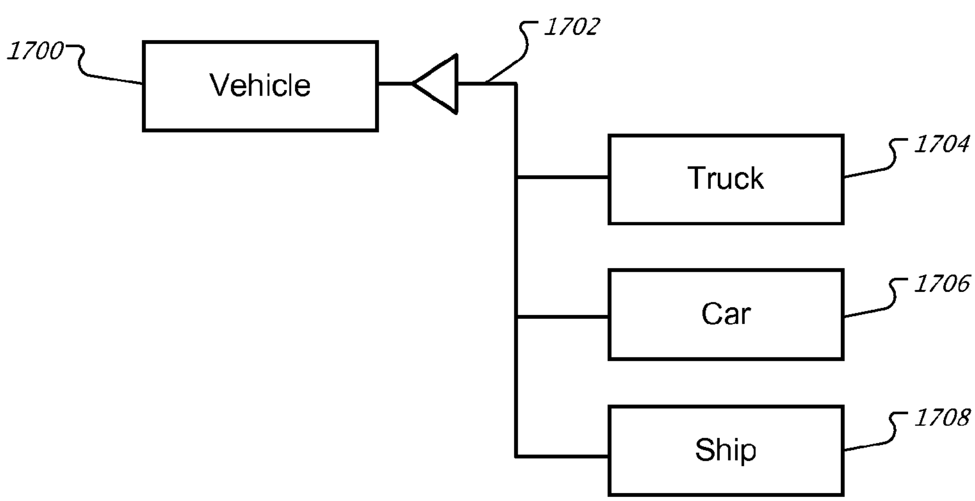
FIG. 17 depicts an example of a specialization in accordance with methods and systems consistent with the subject matter described herein.

Entity types may be divided into subtypes based on characteristics of the entity types. For example, FIG. 17 depicts an entity type "vehicle" 1700 specialized 1702 into subtypes "truck" 1704, "car" 1706, and "ship" 1708. These subtypes represent different aspects or the diversity of the entity type.

Subtypes may be defined based on related attributes. For example, although ships and cars are both vehicles, ships have an attribute, "draft," that is not found in cars. Subtypes also may be defined based on certain methods that can be applied to entities of this subtype and that modify such entities. For example, "drop anchor" can be applied to ships. If outgoing relationships to a specific object are restricted to a subset, then a subtype can be defined which reflects this subset.

Figure 18:
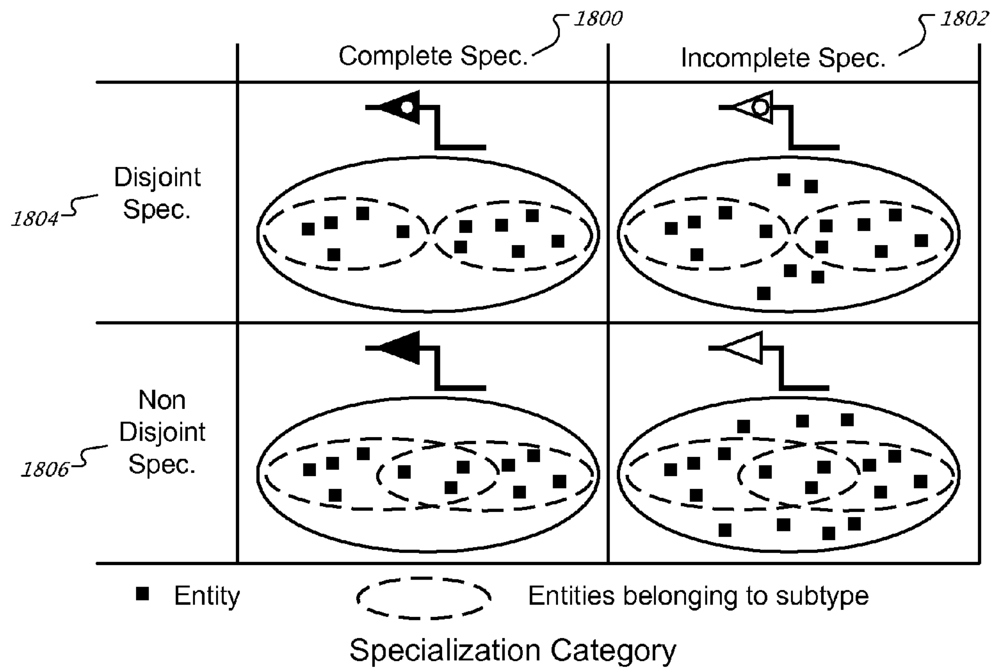
FIG. 18 depicts the categories of specializations in accordance with methods and systems consistent with the subject matter described herein.

As depicted in FIG. 18, specializations may further be characterized as complete specializations 1800 or incomplete specializations 1802. There is a complete specialization 1800 where each entity of the generalized type belongs to at least one subtype. With an incomplete specialization 1802, there is at least one entity that does not belong to a subtype. Specializations also may be disjoint 1804 or nondisjoint 1806. In a disjoint specialization 1804, each entity of the generalized type belongs to a maximum of one subtype. With a nondisjoint specialization 1806, one entity may belong to more than one subtype. As depicted in FIG. 18, four specialization categories result from the combination of the specialization characteristics.

(e) Structural Patterns (i) Item

An item is an entity type which groups together features of another entity type. Thus, the features for the entity type chart of accounts are grouped together to form the entity type chart of accounts item. For example, a chart of accounts item is a category of values or value flows that can be recorded or represented in amounts of money in accounting, while a chart of accounts is a superordinate list of categories of values or value flows that is defined in accounting.

The cardinality between an entity type and its item is often either 1:n or 1:cn. For example, in the case of the entity type chart of accounts, there is a hierarchical relationship of the cardinality 1:n with the entity type chart of accounts item since a chart of accounts has at least one item in all cases.

(ii) Hierarchy

Figure 19:
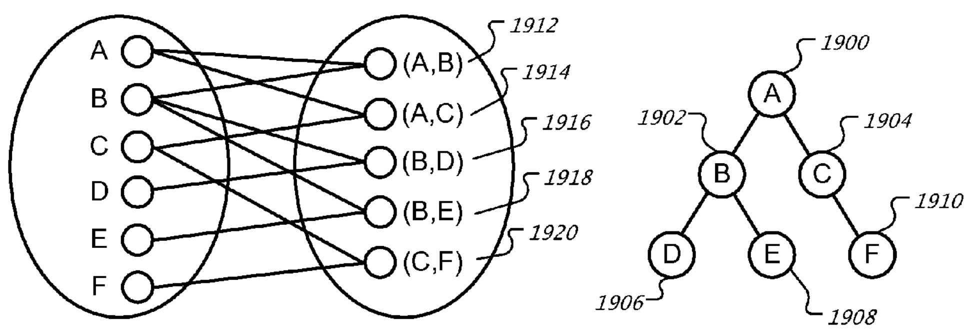
FIG. 19 depicts an example of a hierarchy in accordance with methods and systems consistent with the subject matter described herein.

A hierarchy describes the assignment of subordinate entities to superordinate entities and vice versa, where several entities of the same type are subordinate entities that have, at most, one directly superordinate entity. For example, in the hierarchy depicted in FIG. 19, entity B 1902 is subordinate to entity A 1900, resulting in the relationship (A,B) 1912. Similarly, entity C 1904 is subordinate to entity A 1900, resulting in the relationship (A,C) 1914. Entity D 1906 and entity E 1908 are subordinate to entity B 1902, resulting in the relationships (B,D) 1916 and (B,E) 1918, respectively. Entity F 1910 is subordinate to entity C 1904, resulting in the relationship (C,F) 1920.

Figure 20:
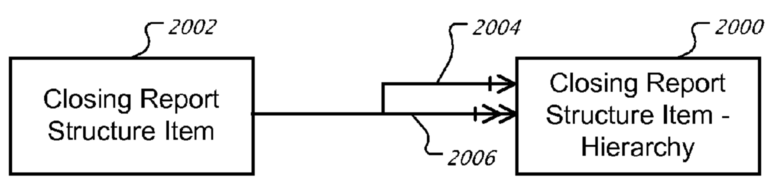
FIG. 20 depicts a graphical representation of a hierarchy in accordance with methods and systems consistent with the subject matter described herein.

Because each entity has at most one superordinate entity, the cardinality between a subordinate entity and its superordinate entity is 1:c. Similarly, each entity may have 0, 1 or many subordinate entities. Thus, the cardinality between a superordinate entity and its subordinate entity is 1:cn. FIG. 20 depicts a graphical representation of a Closing Report Structure Item hierarchy 2000 for a Closing Report Structure Item 2002. The hierarchy illustrates the 1:c cardinality 2004 between a subordinate entity and its superordinate entity, and the 1:cn cardinality 2006 between a superordinate entity and its subordinate entity.

3. Creation of the Business Object Model

Figure 21A:
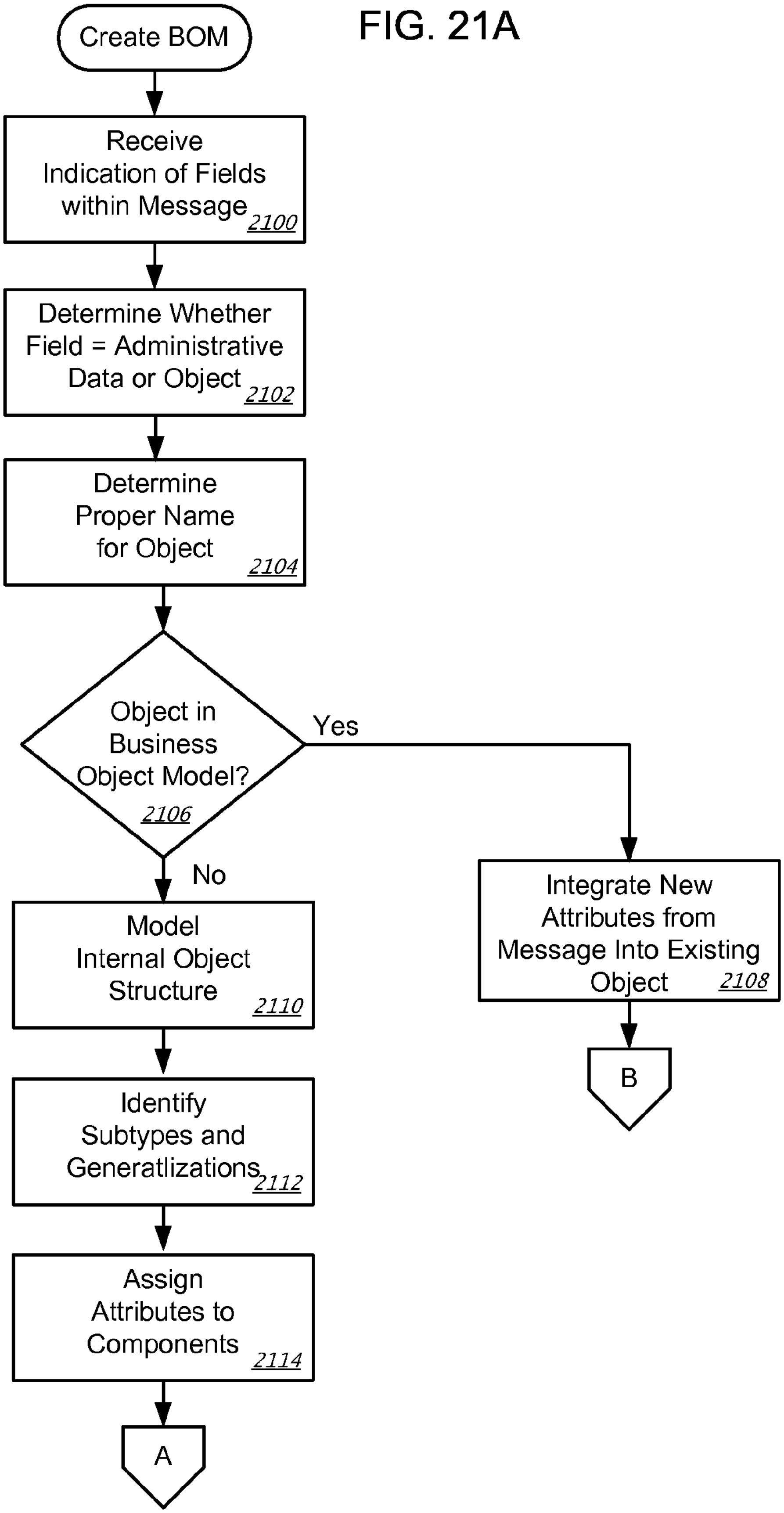
FIGS. 21A-B depict a flow diagram of the steps performed to create a business object model in accordance with methods and systems consistent with the subject matter described herein.
Figure 21B:
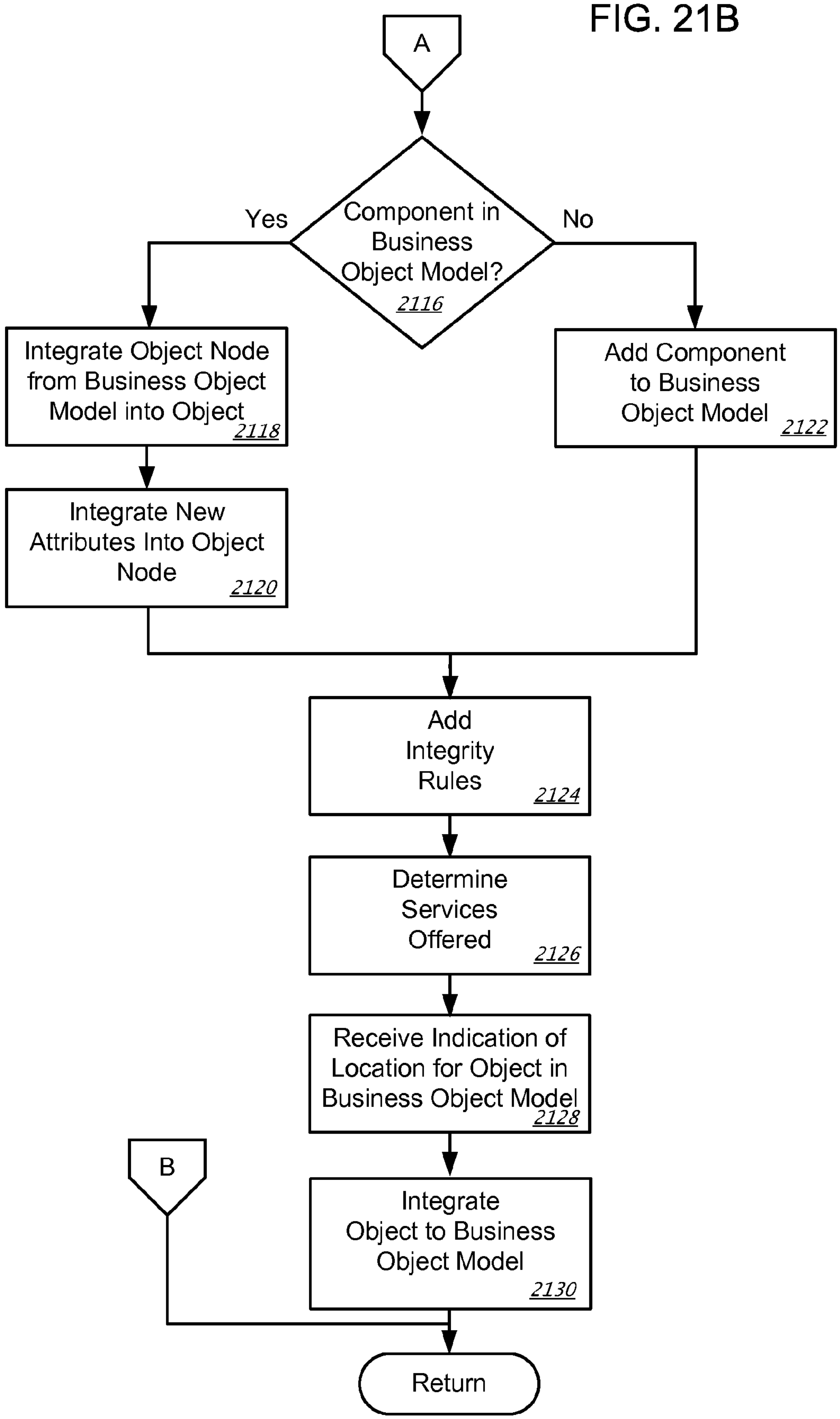

FIGS. 21A-B depict the steps performed using methods and systems consistent with the subject matter described herein to create a business object model. Although some steps are described as being performed by a computer, these steps may alternatively be performed manually, or computer-assisted, or any combination thereof. Likewise, although some steps are described as being performed by a computer, these steps may also be computer-assisted, or performed manually, or any combination thereof.

As discussed above, the designers create message choreographies that specify the sequence of messages between business entities during a transaction. After identifying the messages, the developers identify the fields contained in one of the messages (step 2100, FIG. 21A). The designers then determine whether each field relates to administrative data or is part of the object (step 2102). Thus, the first eleven fields identified below in the left column are related to administrative data, while the remaining fields are part of the object.

| | |
|---|---|
| MessageID | Admin |
| ReferenceID | |
| CreationDate | |
| SenderID | |
| AdditionalSenderID | |
| ContactPersonID | |
| SenderAddress | |

-continued

| | |
|---|---|
| RecipientID | |
| AdditionalRecipientID | |
| ContactPersonID | |
| RecipientAddress | |
| ID | Main Object |
| AdditionalID | |
| PostingDate | |
| LastChangeDate | |
| AcceptanceStatus | |
| Note | |
| CompleteTransmission Indicator | |
| Buyer | |
| BuyerOrganisationName | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobileNumber | |
| Facsimile | |
| Email | |
| Seller | |
| SellerAddress | |
| Location | |
| LocationType | |
| DeliveryItemGroupID | |
| DeliveryPriority | |
| DeliveryCondition | |
| TransferLocation | |
| NumberofPartialDelivery | |
| QuantityTolerance | |
| MaximumLeadTime | |
| TransportServiceLevel | |
| TranportCondition | |
| TransportDescription | |
| CashDiscountTerms | |
| PaymentForm | |
| PaymentCardID | |
| PaymentCardReferenceID | |
| SequenceID | |
| Holder | |
| ExpirationDate | |
| AttachmentID | |
| AttachmentFilename | |
| DescriptionofMessage | |
| ConfirmationDescriptionof Message | |
| FollowUpActivity | |
| ItemID | |
| ParentItemID | |
| HierarchyType | |
| ProductID | |
| ProductType | |
| ProductNote | |
| ProductCategoryID | |
| Amount | |
| BaseQuantity | |
| ConfirmedAmount | |
| ConfirmedBaseQuantity | |
| ItemBuyer | |
| ItemBuyerOrganisationName | |
| Person Name | |
| FunctionalTitle | |

-continued

| | |
|---|---|
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobilNumber | |
| Facsimile | |
| Email | |
| ItemSeller | |
| ItemSellerAddress | |
| ItemLocation | |
| ItemLocationType | |
| ItemDeliveryItemGroupID | |
| ItemDeliveryPriority | |
| ItemDeliveryCondition | |
| ItemTransferLocation | |
| ItemNumberofPartialDelivery | |
| ItemQuantityTolerance | |
| ItemMaximumLeadTime | |
| ItemTransportServiceLevel | |
| ItemTranportCondition | |
| ItemTransportDescription | |
| ContractReference | |
| QuoteReference | |
| CatalogueReference | |
| ItemAttachmentID | |
| ItemAttachmentFilename | |
| ItemDescription | |
| ScheduleLineID | |
| DeliveryPeriod | |
| Quantity | |
| ConfirmedScheduleLineID | |
| ConfirmedDeliveryPeriod | |
| ConfirmedQuantity | |

Next, the designers determine the proper name for the object according to the ISO 11179 naming standards (step 2104). In the example above, the proper name for the "Main Object" is "Purchase Order." After naming the object, the system that is creating the business object model determines whether the object already exists in the business object model (step 2106). If the object already exists, the system integrates new attributes from the message into the existing object (step 2108), and the process is complete.

If at step 2106 the system determines that the object does not exist in the business object model, the designers model the internal object structure (step 2110). To model the internal structure, the designers define the components. For the above example, the designers may define the components identified below.

| | | |
|---|---|---|
| ID | Pur-chase Order | |
| AdditionalID | | |
| PostingDate | | |
| LastChangeDate | | |
| AcceptanceStatus | | |
| Note | | |

-continued

| | | |
|---|---|---|
| CompleteTransmission Indicator | | |
| Buyer | Buyer | |
| BuyerOrganisationName | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |
| PO Box Country Code | | |
| PO Box Region Code | | |
| PO Box City Name | | |
| Street Name | | |
| House ID | | |
| Building ID | | |
| Floor ID | | |
| Room ID | | |
| Care Of Name | | |
| AddressDescription | | |
| Telefonnumber | | |
| MobileNumber | | |
| Facsimile | | |
| Email | | |
| Seller | Seller | |
| SellerAddress | | |
| Location | Location | |
| LocationType | | |
| DeliveryItemGroupID | DeliveryTerms | |
| DeliveryPriority | | |
| DeliveryCondition | | |
| TransferLocation | | |
| NumberofPartialDelivery | | |
| QuantityTolerance | | |
| MaximumLeadTime | | |
| TransportServiceLevel | | |
| TranportCondition | | |
| TransportDescription | | |
| CashDiscountTerms | | |
| PaymentForm | Payment | |
| PaymentCardID | | |
| PaymentCardReferenceID | | |
| SequenceID | | |
| Holder | | |
| ExpirationDate | | |
| AttachmentID | | |
| AttachmentFilename | | |
| DescriptionofMessage | | |
| ConfirmationDescriptionof Message | | |
| FollowUpActivity | | |
| ItemID | Purchase Order Item | |
| ParentItemID | | |
| HierarchyType | | |
| ProductID | | Product |
| ProductType | | |
| ProductNote | | |
| ProductCategoryID | | ProductCategory |
| Amount | | |
| BaseQuantity | | |
| ConfirmedAmount | | |
| ConfirmedBaseQuantity | | |
| ItemBuyer | | Buyer |
| ItemBuyerOrganisation Name | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |

-continued

| | |
|---|---|
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobilNumber | |
| Facsimile | |
| Email | |
| ItemSeller | Seller |
| ItemSellerAddress | |
| ItemLocation | Location |

-continued

| |
|---|
| ItemLocationType |
| ItemDeliveryItemGroupID |
| ItemDeliveryPriority |
| ItemDeliveryCondition |
| ItemTransferLocation |
| ItemNumberofPartial Delivery |
| ItemQuantityTolerance |
| ItemMaximumLeadTime |

-continued

| | |
|---|---|
| ItemTransportServiceLevel | |
| ItemTranportCondition | |
| ItemTransportDescription | |
| ContractReference | Contract |
| QuoteReference | Quote |
| CatalogueReference | Catalogue |
| ItemAttachmentID | |
| ItemAttachmentFilename | |
| ItemDescription | |
| ScheduleLineID | |
| DeliveryPeriod | |
| Quantity | |
| ConfirmedScheduleLineID | |
| ConfirmedDeliveryPeriod | |
| ConfirmedQuantity | |

During the step of modeling the internal structure, the designers also model the complete internal structure by identifying the compositions of the components and the corresponding cardinalities, as shown below.

| | | | | |
|---|---|---|---|---|
| PurchaseOrder | | | | 1 |
| | Buyer | | | 0 . . . 1 |
| | | Address | | 0 . . . 1 |
| | | ContactPerson | | 0 . . . 1 |
| | | | Address | 0 . . . 1 |
| | Seller | | | 0 . . . 1 |
| | Location | | | 0 . . . 1 |
| | | Address | | 0 . . . 1 |
| | DeliveryTerms | | | 0 . . . 1 |
| | | Incoterms | | 0 . . . 1 |
| | | PartialDelivery | | 0 . . . 1 |
| | | QuantityTolerance | | 0 . . . 1 |
| | | Transport | | 0 . . . 1 |
| | CashDiscountTerms | | | 0 . . . 1 |
| | | MaximumCashDiscount | | 0 . . . 1 |
| | | NormalCashDiscount | | 0 . . . 1 |
| | PaymentForm | | | 0 . . . 1 |
| | | PaymentCard | | 0 . . . 1 |
| | Attachment | | | 0 . . . n |
| | Description | | | 0 . . . 1 |
| | ConfirmationDescription | | | 0 . . . 1 |
| | Item | | | 0 . . . n |
| | | HierarchyRelationship | | 0 . . . 1 |
| | | Product | | 0 . . . 1 |
| | | ProductCategory | | 0 . . . 1 |
| | | Price | | 0 . . . 1 |
| | | | NetunitPrice | 0 . . . 1 |
| | | ConfirmedPrice | | 0 . . . 1 |
| | | | NetunitPrice | 0 . . . 1 |
| | | Buyer | | 0 . . . 1 |
| | | Seller | | 0 . . . 1 |
| | | Location | | 0 . . . 1 |
| | | DeliveryTerms | | 0 . . . 1 |
| | | Attachment | | 0 . . . n |
| | | Description | | 0 . . . 1 |
| | | ConfirmationDescription | | 0 . . . 1 |
| | | ScheduleLine | | 0 . . . n |
| | | | DeliveryPeriod | 1 |
| | | ConfirmedScheduleLine | | 0 . . . n |

After modeling the internal object structure, the developers identify the subtypes and generalizations for all objects and components (step 2112). For example, the Purchase Order may have subtypes Purchase Order Update, Purchase Order Cancellation and Purchase Order Information. Purchase Order Update may include Purchase Order Request, Purchase Order Change, and Purchase Order Confirmation. Moreover, Party may be identified as the generalization of Buyer and Seller. The subtypes and generalizations for the above example are shown below.

| | | | | | |
|---|---|---|---|---|---|
| PurchaseOrder | | | | | 1 |
| | PurchaseOrderUpdate | | | | |
| | | PurchaseOrder Request | | | |
| | | PurchaseOrder Change | | | |
| | | PurchaseOrder Confirmation | | | |
| | PurchaseOrderCancellation | | | | |
| | PurchaseOrderInformation | | | | |
| | Party | | | | |
| | | BuyerParty | | | 0 . . . 1 |
| | | | Address | | 0 . . . 1 |
| | | | ContactPerson | | 0 . . . 1 |
| | | | | Address | 0 . . . 1 |
| | | SellerParty | | | 0 . . . 1 |
| | Location | | | | |
| | | ShipToLocation | | | 0 . . . 1 |
| | | | Address | | 0 . . . 1 |
| | | ShipFromLocation | | | 0 . . . 1 |
| | | | Address | | 0 . . . 1 |
| | DeliveryTerms | | | | 0 . . . 1 |
| | | Incoterms | | | 0 . . . 1 |
| | | PartialDelivery | | | 0 . . . 1 |
| | | QuantityTolerance | | | 0 . . . 1 |
| | | Transport | | | 0 . . . 1 |
| | CashDiscountTerms | | | | 0 . . . 1 |
| | | MaximumCash Discount | | | 0 . . . 1 |
| | | NormalCashDiscount | | | 0 . . . 1 |
| | PaymentForm | | | | 0 . . . 1 |
| | | PaymentCard | | | 0 . . . 1 |
| | Attachment | | | | 0 . . . n |
| | Description | | | | 0 . . . 1 |
| | ConfirmationDescription | | | | 0 . . . 1 |
| | Item | | | | 0 . . . n |
| | | HierarchyRelationship | | | 0 . . . 1 |
| | | Product | | | 0 . . . 1 |
| | | ProductCategory | | | 0 . . . 1 |
| | | Price | | | 0 . . . 1 |
| | | | NetunitPrice | | 0 . . . 1 |
| | | ConfirmedPrice | | | 0 . . . 1 |
| | | | NetunitPrice | | 0 . . . 1 |
| | | Party | | | |
| | | | BuyerParty | | 0 . . . 1 |
| | | | SellerParty | | 0 . . . 1 |
| | | Location | | | |
| | | | ShipToLocation | | 0 . . . 1 |
| | | | ShipFromLocation | | 0 . . . 1 |
| | | DeliveryTerms | | | 0 . . . 1 |
| | | Attachment | | | 0 . . . n |
| | | Description | | | 0 . . . 1 |
| | | ConfirmationDescription | | | 0 . . . 1 |
| | | ScheduleLine | | | 0 . . . n |
| | | | DeliveryPeriod | | 1 |
| | | ConfirmedScheduleLine | | | 0 . . . n |

After identifying the subtypes and generalizations, the developers assign the attributes to these components (step 2114). The attributes for a portion of the components are shown below.

| | | |
|---|---|---|
| Purchase Order | | 1 |
| | ID | 1 |
| | SellerID | 0 . . . 1 |
| | BuyerPosting DateTime | 0 . . . 1 |
| | BuyerLast ChangeDate Time | 0 . . . 1 |
| | SellerPosting DateTime | 0 . . . 1 |
| | SellerLast ChangeDate Time | 0 . . . 1 |
| | Acceptance StatusCode | 0 . . . 1 |
| | Note | 0 . . . 1 |

-continued

| | | | |
|---|---|---|---|
| ItemList Complete Transmission Indicator | | | 0 . . . 1 |
| BuyerParty | | | 0 . . . 1 |
| | StandardID | | 0 . . . n |
| | BuyerID | | 0 . . . 1 |
| | SellerID | | 0 . . . 1 |
| | Address | | 0 . . . 1 |
| | ContactPerson | | 0 . . . 1 |
| | | BuyerID | 0 . . . 1 |
| | | SellerID | 0 . . . 1 |
| | | Address | 0 . . . 1 |
| SellerParty | | | 0 . . . 1 |
| Product RecipientParty | | | 0 . . . 1 |
| VendorParty | | | 0 . . . 1 |
| Manufacturer Party | | | 0 . . . 1 |
| BillToParty | | | 0 . . . 1 |
| PayerParty | | | 0 . . . 1 |
| CarrierParty | | | 0 . . . 1 |

-continued

| | | | |
|---|---|---|---|
| ShipTo Location | | | 0 . . . 1 |
| | StandardID | | 0 . . . n |
| | BuyerID | | 0 . . . 1 |
| | SellerID | | 0 . . . 1 |
| | Address | | 0 . . . 1 |
| ShipFrom Location | | | 0 . . . 1 |

The system then determines whether the component is one of the object nodes in the business object model (step 2116, FIG. 21B). If the system determines that the component is one of the object nodes in the business object model, the system integrates a reference to the corresponding object node from the business object model into the object (step 2118). In the above example, the system integrates the reference to the Buyer party represented by an ID and the reference to the ShipToLocation represented by an into the object, as shown below. The attributes that were formerly located in the PurchaseOrder object are now assigned to the new found object party. Thus, the attributes are removed from the PurchaseOrder object.

| | | |
|---|---|---|
| PurchaseOrder | | |
| | ID | |
| | SellerID | |
| | BuyerPostingDateTime | |
| | BuyerLastChangeDateTime | |
| | SellerPostingDateTime | |
| | SellerLastChangeDateTime | |
| | AcceptanceStatusCode | |
| | Note | |
| | ItemListComplete | |
| | TransmissionIndicator | |
| | BuyerParty | |
| | | ID |
| | SellerParty | |
| | ProductRecipientParty | |
| | VendorParty | |
| | ManufacturerParty | |
| | BillToParty | |
| | PayerParty | |
| | CarrierParty | |
| | ShipToLocation | |
| | | ID |
| | ShipFromLocation | |

During the integration step, the designers classify the relationship (i.e., aggregation or association) between the object node and the object being integrated into the business object model. The system also integrates the new attributes into the object node (step 2120). If at step 2116, the system determines that the component is not in the business object model, the system adds the component to the business object model (step 2122).

Regardless of whether the component was in the business object model at step 2116, the next step in creating the business object model is to add the integrity rules (step 2124). There are several levels of integrity rules and constraints which should be described. These levels include consistency rules between attributes, consistency rules between components, and consistency rules to other objects. Next, the designers determine the services offered, which can be accessed via interfaces (step 2126). The services offered in the example above include PurchaseOrderCreateRequest, PurchaseOrderCancellationRequest, and PurchaseOrderReleaseRequest. The system then receives an indication of the location for the object in the business object model (step 2128). After receiving the indication of the location, the system integrates the object into the business object model (step 2130).

4. Structure of the Business Object Model

The business object model, which serves as the basis for the process of generating consistent interfaces, includes the elements contained within the interfaces. These elements are arranged in a hierarchical structure within the business object model.

5. Interfaces Derived from Business Object Model

Figure 27A:
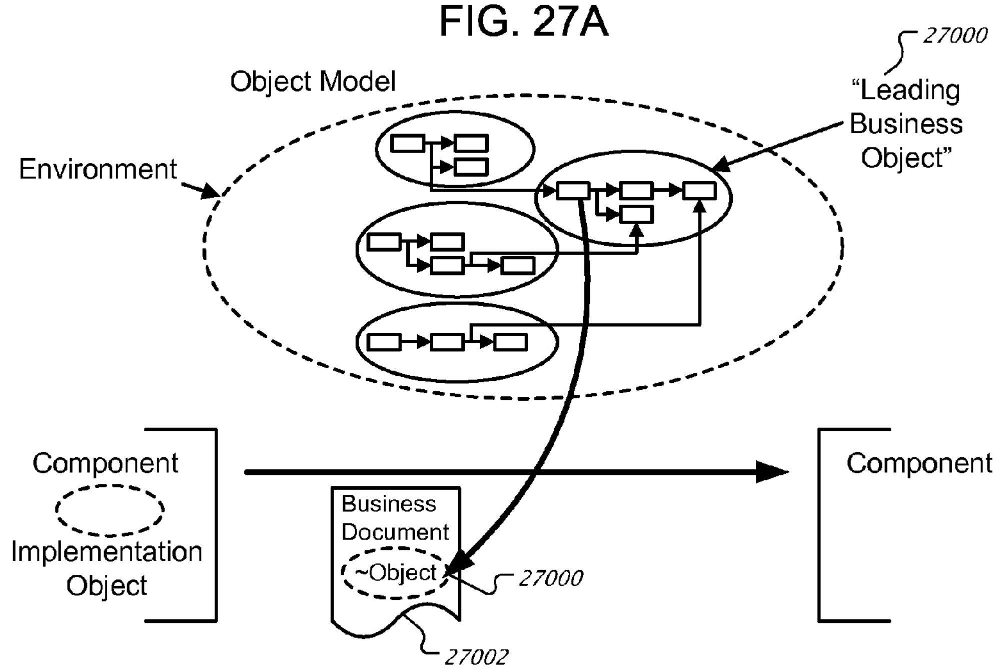
FIGS. 27A-E depict a hierarchization process in accordance with methods and systems consistent with the subject matter described herein.

Interfaces are the starting point of the communication between two business entities. The structure of each interface determines how one business entity communicates with another business entity. The business entities may act as a unified whole when, based on the business scenario, the business entities know what an interface contains from a business perspective and how to fill the individual elements or fields of the interface. As illustrated in FIG. 27A, communication between components takes place via messages that contain business documents (e.g., business document 27002). The business document 27002 ensures a holistic business-related understanding for the recipient of the message. The business documents are created and accepted or consumed by interfaces, specifically by inbound and outbound interfaces. The interface structure and, hence, the structure of the business document are derived by a mapping rule. This mapping rule is known as "hierarchization." An interface structure thus has a hierarchical structure created based on the leading business object 27000. The interface represents a usage-specific, hierarchical view of the underlying usage-neutral object model.

Figure 27B:
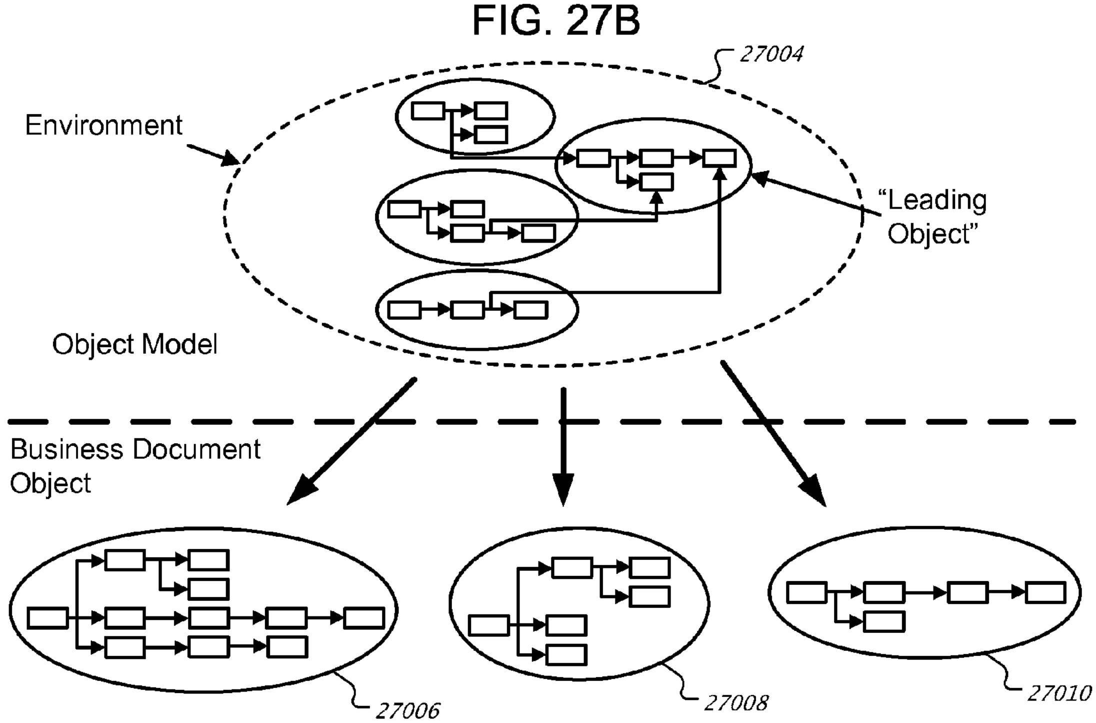

As illustrated in FIG. 27B, several business document objects 27006, 27008, and 27010 as overlapping views may be derived for a given leading object 27004. Each business document object results from the object model by hierarchization.

Figure 27C:
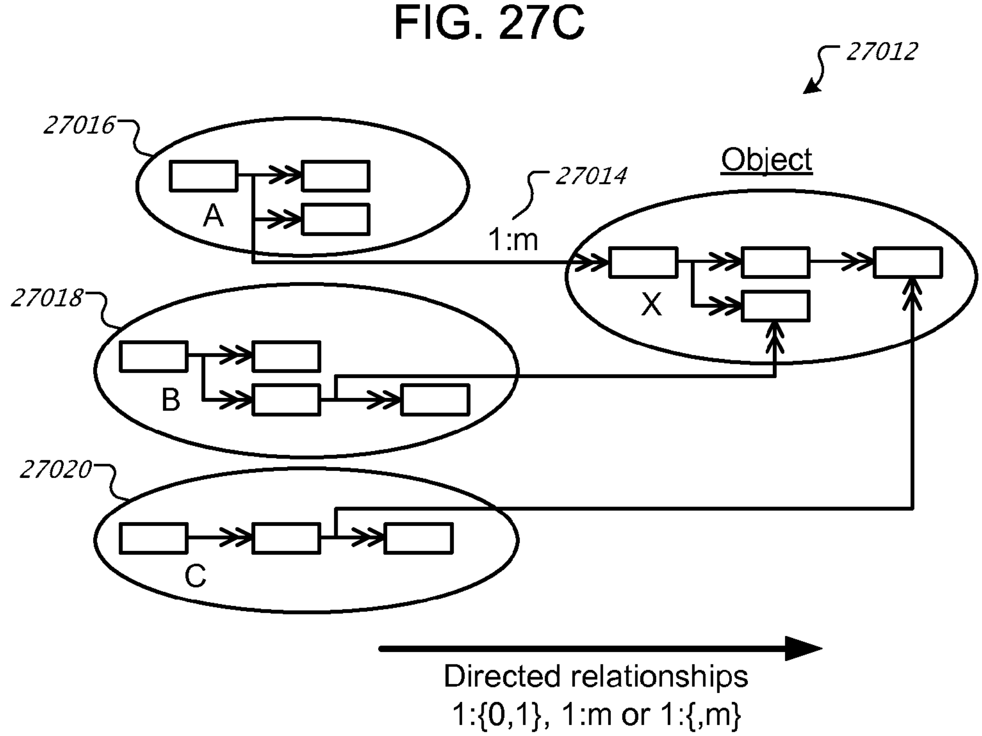

To illustrate the hierarchization process, FIG. 27C depicts an example of an object model 27012 (i.e., a portion of the business object model) that is used to derive a service operation signature (business document object structure). As depicted, leading object X 27014 in the object model 27012 is integrated in a net of object A 27016, object B 27018, and object C 27020. Initially, the parts of the leading object 27014 that are required for the business object document are adopted. In one variation, all parts required for a business document object are adopted from leading object 27014 (making such an operation a maximal service operation). Based on these parts, the relationships to the superordinate objects (i.e., objects A, B, and C from which object X depends) are inverted. In other words, these objects are adopted as dependent or subordinate objects in the new business document object.

For example, object A 27016, object B 27018, and object C 27020 have information that characterize object X. Because object A 27016, object B 27018, and object C 27020 are superordinate to leading object X 27014, the dependencies of these relationships change so that object A 27016, object B 27018, and object C 27020 become dependent and subordinate to leading object X 27014. This procedure is known as "derivation of the business document object by hierarchization."

Business-related objects generally have an internal structure (parts). This structure can be complex and reflect the individual parts of an object and their mutual dependency. When creating the operation signature, the internal structure of an object is strictly hierarchized. Thus, dependent parts keep their dependency structure, and relationships between the parts within the object that do not represent the hierarchical structure are resolved by prioritizing one of the relationships.

Relationships of object X to external objects that are referenced and whose information characterizes object X are added to the operation signature. Such a structure can be quite complex (see, for example, FIG. 27D). The cardinality to these referenced objects is adopted as 1:1 or 1:C, respectively. By this, the direction of the dependency changes. The required parts of this referenced object are adopted identically, both in their cardinality and in their dependency arrangement.

Figure 27D:
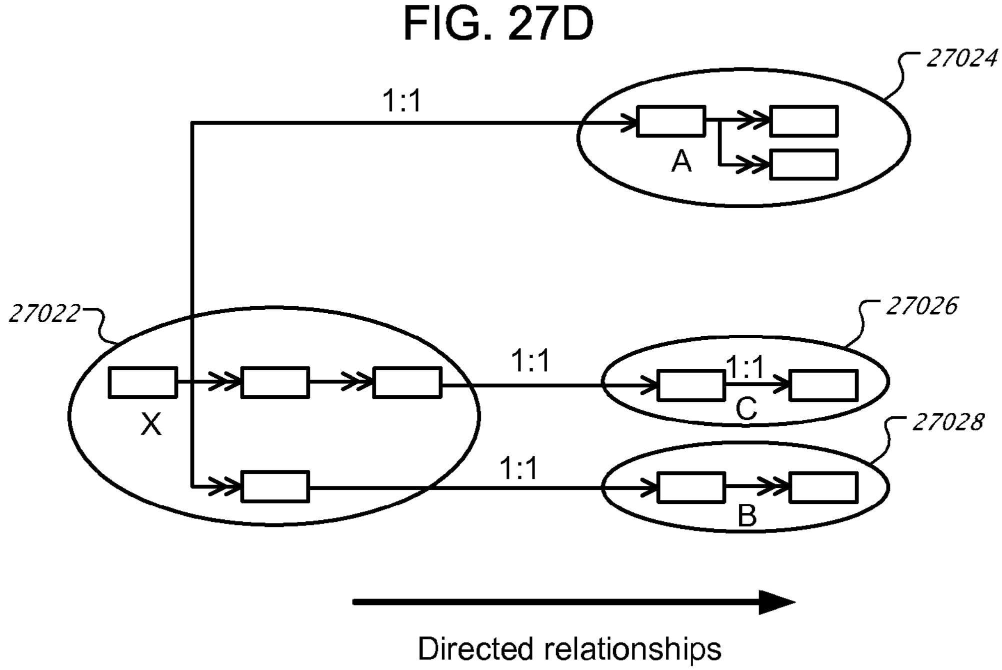

The newly created business document object contains all required information, including the incorporated master data information of the referenced objects. As depicted in FIG. 27D, components Xi in leading object X 27022 are adopted directly. The relationship of object X 27022 to object A 27024, object B 27028, and object C 27026 are inverted, and the parts required by these objects are added as objects that depend from object X 27022. As depicted, all of object A 27024 is adopted. B3 and B4 are adopted from object B 27028, but B1 is not adopted. From object C 27026, C2 and C1 are adopted, but C3 is not adopted.

Figure 27E:
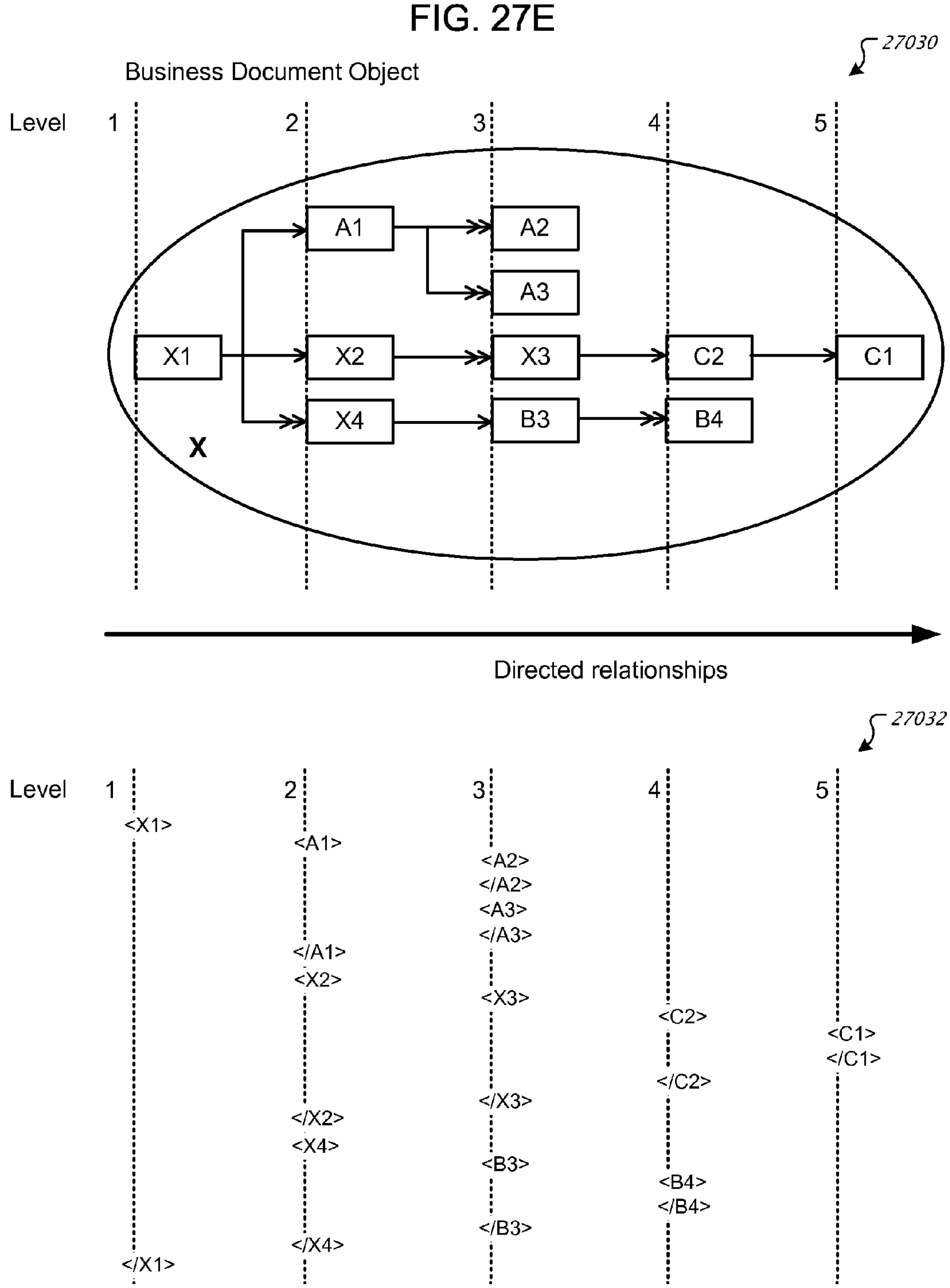

FIG. 27E depicts the business document object X 27030 created by this hierarchization process. As shown, the arrangement of the elements corresponds to their dependency levels, which directly leads to a corresponding representation as an XML structure 27032.

The following provides certain rules that can be adopted singly or in combination with regard to the hierarchization process:

- A business document object always refers to a leading business document object and is derived from this object.
- The name of the root entity in the business document entity is the name of the business object or the name of a specialization of the business object or the name of a service specific view onto the business object.
- The nodes and elements of the business object that are relevant (according to the semantics of the associated message type) are contained as entities and elements in the business document object.
- The name of a business document entity is predefined by the name of the corresponding business object node. The name of the superordinate entity is not repeated in the name of the business document entity. The "full" semantic name results from the concatenation of the entity names along the hierarchical structure of the business document object.
- The structure of the business document object is, except for deviations due to hierarchization, the same as the structure of the business object.
- The cardinalities of the business document object nodes and elements are adopted identically or more restrictively to the business document object.
- An object from which the leading business object is dependent can be adopted to the business document object. For this arrangement, the relationship is inverted, and the object (or its parts, respectively) are hierarchically subordinated in the business document object.
- Nodes in the business object representing generalized business information can be adopted as explicit entities to the business document object (generally speaking, multiply TypeCodes out). When this adoption occurs, the entities are named according to their more specific semantic (name of TypeCode becomes prefix).
    - Party nodes of the business object are modeled as explicit entities for each party role in the business document object. These nodes are given the name <Prefix><Party Role>Party, for example, BuyerParty, ItemBuyerParty.
    - BTDReference nodes are modeled as separate entities for each reference type in the business document object. These nodes are given the name <Qualifier><BO><Node>Reference, for example SalesOrderReference, OriginSalesOrderReference, SalesOrderItemReference.
    - A product node in the business object comprises all of the information on the Product, ProductCategory, and Batch. This information is modeled in the business document object as explicit entities for Product, ProductCategory, and Batch.
- Entities which are connected by a 1:1 relationship as a result of hierarchization can be combined to a single entity, if they are semantically equivalent. Such a combination can often occurs if a node in the business document object that results from an assignment node is removed because it does not have any elements.
- The message type structure is typed with data types.
    - Elements are typed by GDTs according to their business objects.
    - Aggregated levels are typed with message type specific data types (Intermediate Data Types), with their names being built according to the corresponding paths in the message type structure.
    - The whole message type structured is typed by a message data type with its name being built according to the root entity with the suffix "Message".
- For the message type, the message category (e.g., information, notification, query, response, request, confirmation, etc.) is specified according to the suited transaction communication pattern.

In one variation, the derivation by hierarchization can be initiated by specifying a leading business object and a desired view relevant for a selected service operation. This view determines the business document object. The leading business object can be the source object, the target object, or a third object. Thereafter, the parts of the business object required for the view are determined. The parts are connected to the root node via a valid path along the hierarchy. Thereafter, one or more independent objects (object parts, respectively) referenced by the leading object which are relevant for the service may be determined (provided that a relationship exists between the leading object and the one or more independent objects).

Once the selection is finalized, relevant nodes of the leading object node that are structurally identical to the message type structure can then be adopted. If nodes are adopted from independent objects or object parts, the relationships to such independent objects or object parts are inverted. Linearization can occur such that a business object node containing certain TypeCodes is represented in the message type structure by explicit entities (an entity for each value of the TypeCode). The structure can be reduced by checking all 1:1 cardinalities in the message type structure. Entities can be combined if they are semantically equivalent, one of the entities carries no elements, or an entity solely results from an n:m assignment in the business object.

After the hierarchization is completed, information regarding transmission of the business document object (e.g., CompleteTransmissionIndicator, ActionCodes, message category, etc.) can be added. A standardized message header can be added to the message type structure and the message structure can be typed. Additionally, the message category for the message type can be designated.

Invoice Request and Invoice Confirmation are examples of interfaces. These invoice interfaces are used to exchange invoices and invoice confirmations between an invoicing party and an invoice recipient (such as between a seller and a buyer) in a B2B process. Companies can create invoices in electronic as well as in paper form. Traditional methods of communication, such as mail or fax, for invoicing are cost intensive, prone to error, and relatively slow, since the data is recorded manually. Electronic communication eliminates such problems. The motivating business scenarios for the Invoice Request and Invoice Confirmation interfaces are the Procure to Stock (PTS) and Sell from Stock (SFS) scenarios. In the PTS scenario, the parties use invoice interfaces to purchase and settle goods. In the SFS scenario, the parties use invoice interfaces to sell and invoice goods. The invoice interfaces directly integrate the applications implementing them and also form the basis for mapping data to widely-used XML standard formats such as RosettaNet, PIDX, xCBL, and CIDX.

The invoicing party may use two different messages to map a B2B invoicing process: (1) the invoicing party sends the message type InvoiceRequest to the invoice recipient to start a new invoicing process; and (2) the invoice recipient sends the message type InvoiceConfirmation to the invoicing party to confirm or reject an entire invoice or to temporarily assign it the status "pending."

An InvoiceRequest is a legally binding notification of claims or liabilities for delivered goods and rendered services—usually, a payment request for the particular goods and services. The message type InvoiceRequest is based on the message data type InvoiceMessage. The InvoiceRequest message (as defined) transfers invoices in the broader sense. This includes the specific invoice (request to settle a liability), the debit memo, and the credit memo.

InvoiceConfirmation is a response sent by the recipient to the invoicing party confirming or rejecting the entire invoice received or stating that it has been assigned temporarily the status "pending." The message type InvoiceConfirmation is based on the message data type InvoiceMessage. An InvoiceConfirmation is not mandatory in a B2B invoicing process, however, it automates collaborative processes and dispute management.

Usually, the invoice is created after it has been confirmed that the goods were delivered or the service was provided. The invoicing party (such as the seller) starts the invoicing process by sending an InvoiceRequest message. Upon receiving the InvoiceRequest message, the invoice recipient (for instance, the buyer) can use the InvoiceConfirmation message to completely accept or reject the invoice received or to temporarily assign it the status "pending." The InvoiceConfirmation is not a negotiation tool (as is the case in order management), since the options available are either to accept or reject the entire invoice. The invoice data in the InvoiceConfirmation message merely confirms that the invoice has been forwarded correctly and does not communicate any desired changes to the invoice. Therefore, the InvoiceConfirmation includes the precise invoice data that the invoice recipient received and checked. If the invoice recipient rejects an invoice, the invoicing party can send a new invoice after checking the reason for rejection (AcceptanceStatus and ConfirmationDescription at Invoice and InvoiceItem level). If the invoice recipient does not respond, the invoice is generally regarded as being accepted and the invoicing party can expect payment.

FIGS. 22A-F depict a flow diagram of the steps performed by methods and systems consistent with the subject matter described herein to generate an interface from the business object model. Although described as being performed by a computer, these steps may alternatively be performed manually, or using any combination thereof. The process begins when the system receives an indication of a package template from the designer, i.e., the designer provides a package template to the system (step 2200).

Package templates specify the arrangement of packages within a business transaction document. Package templates are used to define the overall structure of the messages sent between business entities. Methods and systems consistent with the subject matter described herein use package templates in conjunction with the business object model to derive the interfaces.

The system also receives an indication of the message type from the designer (step 2202). The system selects a package from the package template (step 2204), and receives an indication from the designer whether the package is required for the interface (step 2206). If the package is not required for the interface, the system removes the package from the package template (step 2208). The system then continues this analysis for the remaining packages within the package template (step 2210).

Figure 22A:
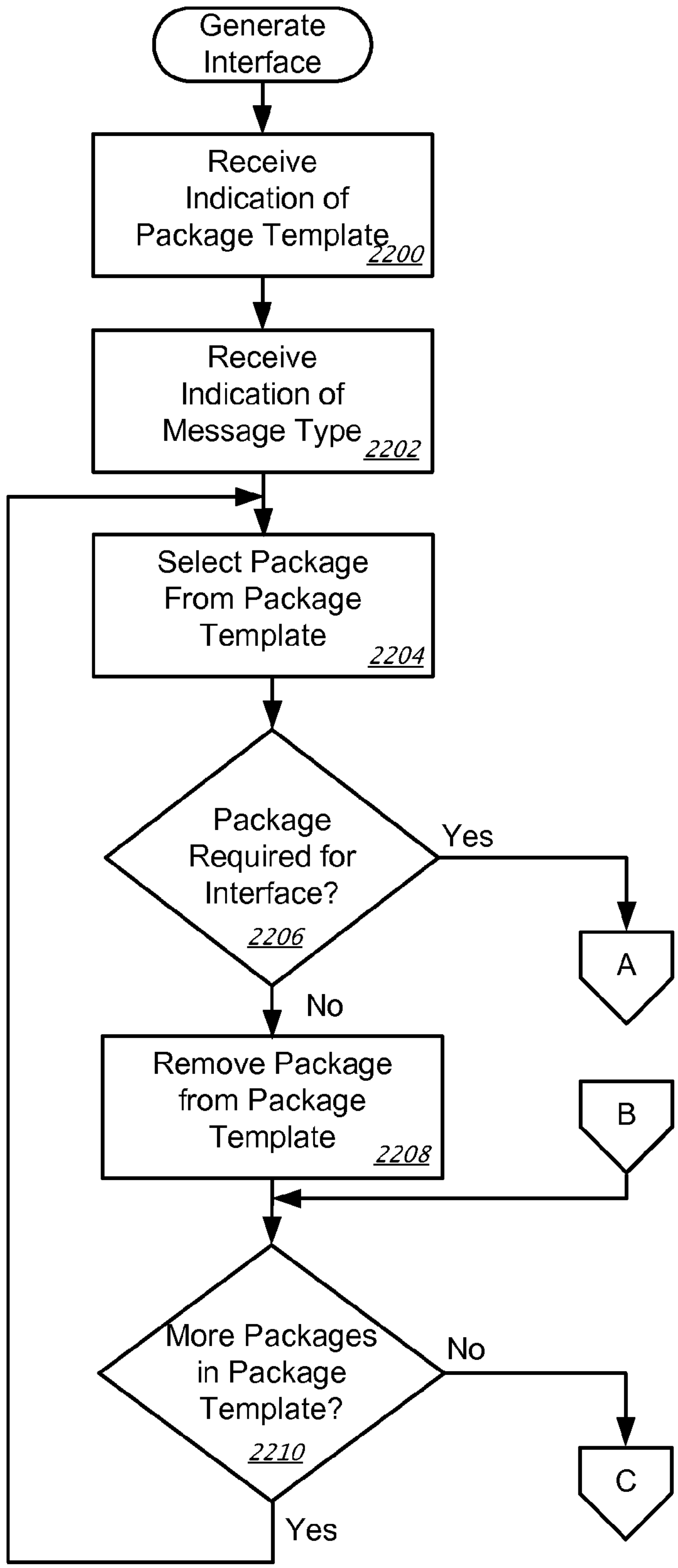
FIGS. 22A-F depict a flow diagram of the steps performed to generate an interface from the business object model in accordance with methods and systems consistent with the subject matter described herein.
Figure 22B:
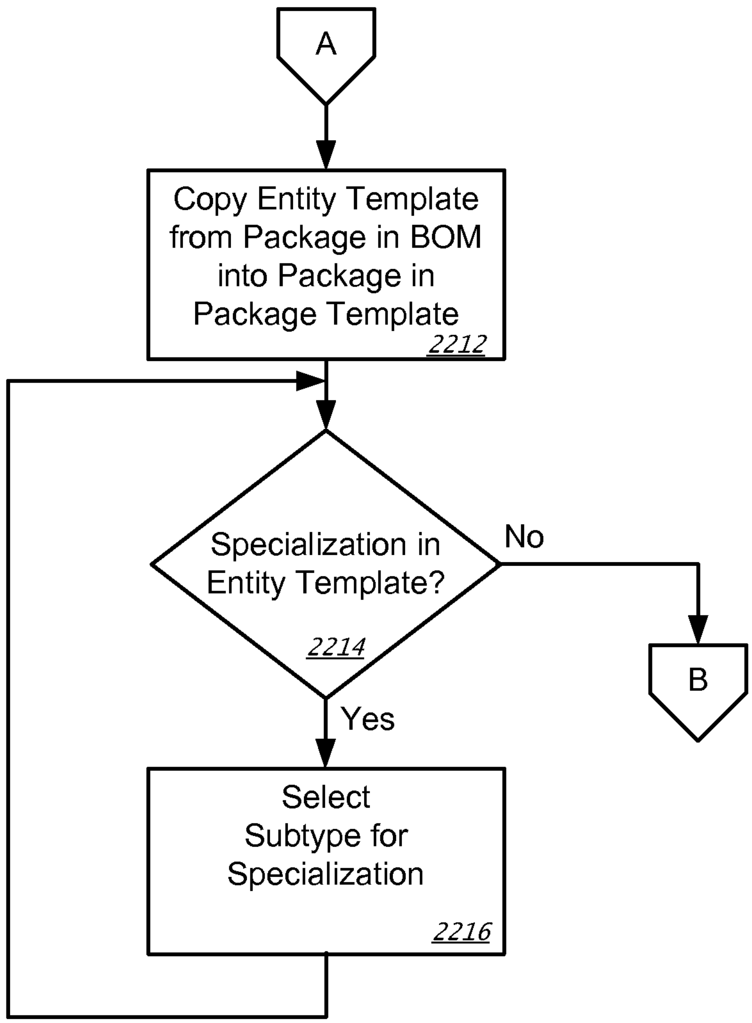
Figure 22C:
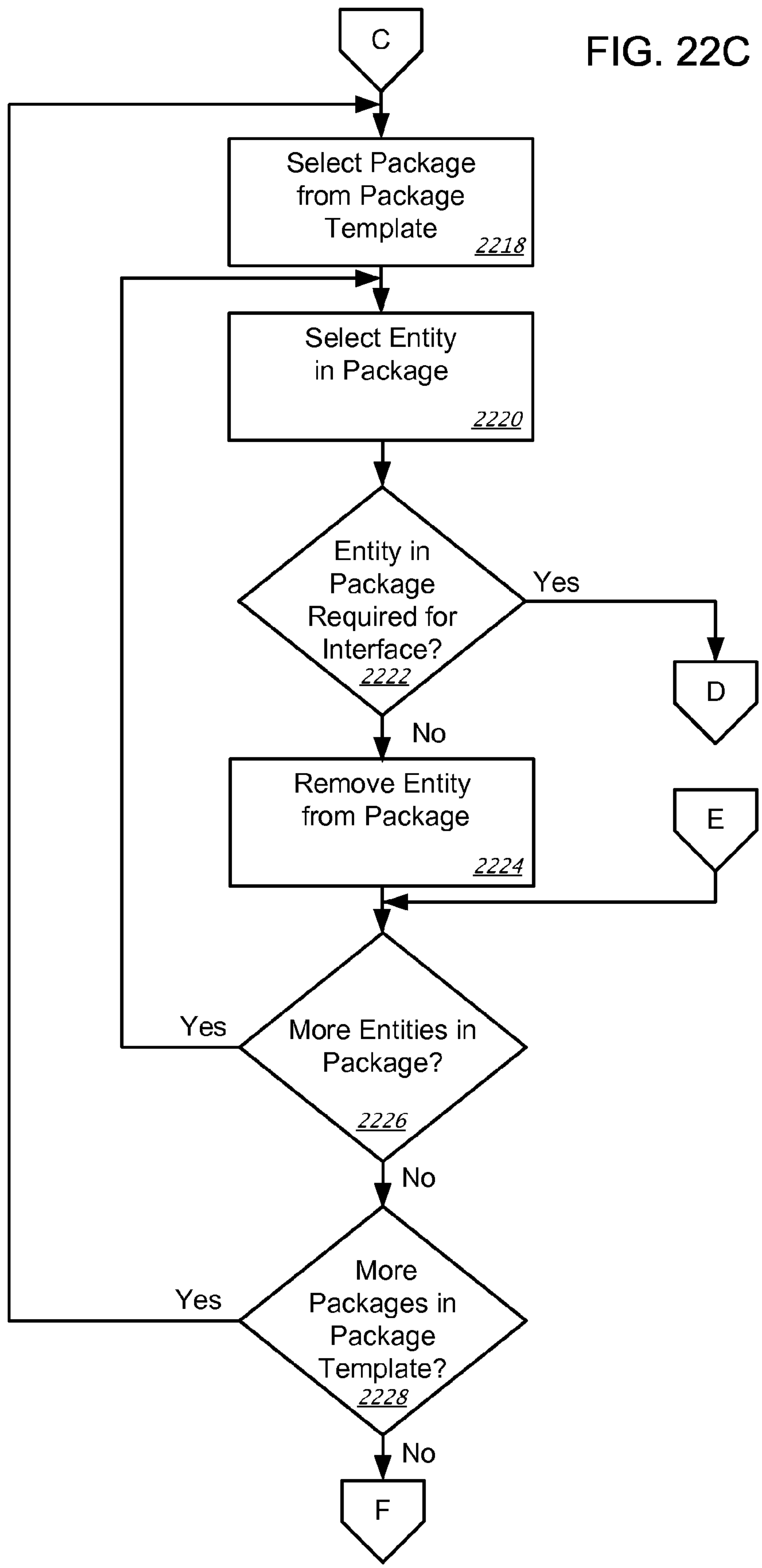

If, at step 2206, the package is required for the interface, the system copies the entity template from the package in the business object model into the package in the package template (step 2212, FIG. 22B). The system determines whether there is a specialization in the entity template (step 2214). If the system determines that there is a specialization in the entity template, the system selects a subtype for the specialization (step 2216). The system may either select the subtype for the specialization based on the message type, or it may receive this information from the designer. The system then determines whether there are any other specializations in the entity template (step 2214). When the system determines that there are no specializations in the entity template, the system continues this analysis for the remaining packages within the package template (step 2210, FIG. 22A).

At step 2210, after the system completes its analysis for the packages within the package template, the system selects one of the packages remaining in the package template (step 2218, FIG. 22C), and selects an entity from the package (step 2220). The system receives an indication from the designer whether the entity is required for the interface (step 2222). If the entity is not required for the interface, the system removes the entity from the package template (step 2224). The system then continues this analysis for the remaining entities within the package (step 2226), and for the remaining packages within the package template (step 2228).

Figure 22D:
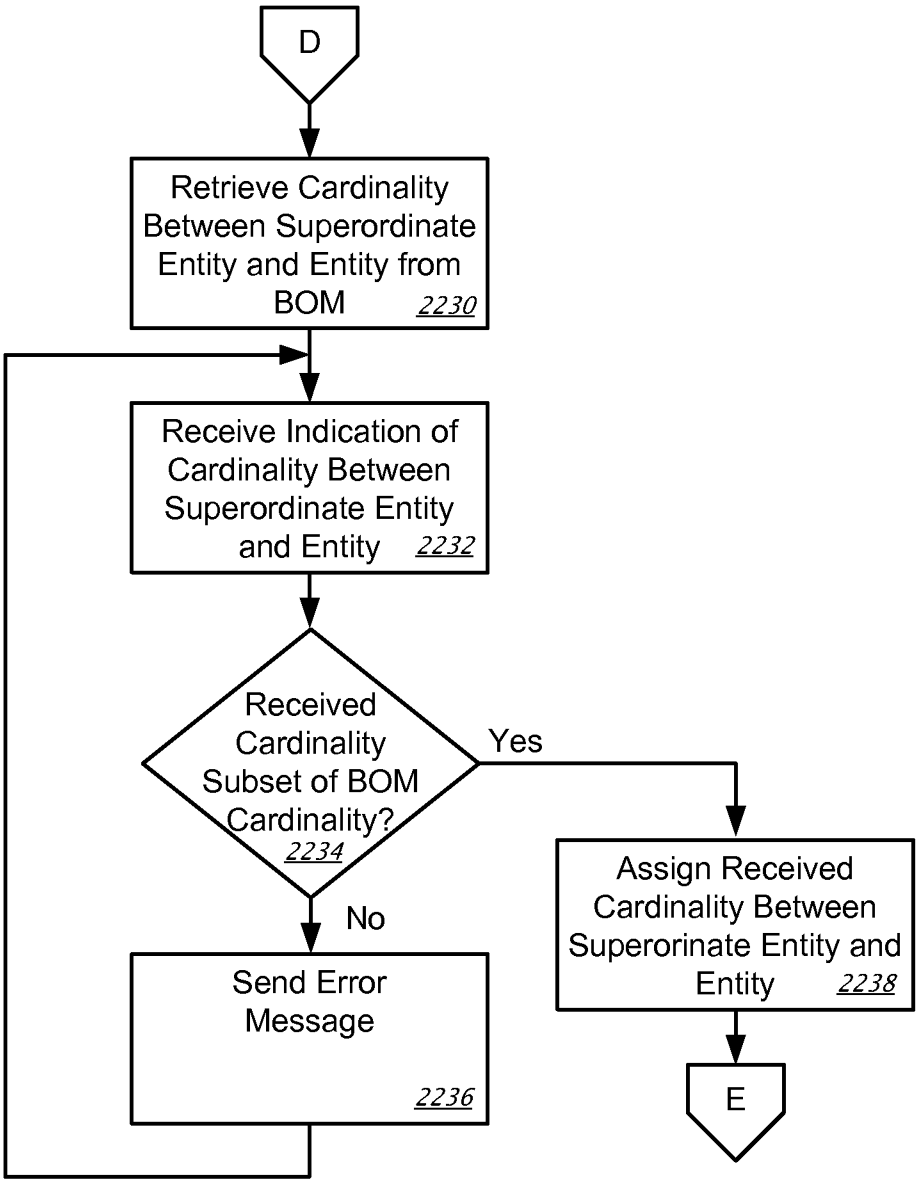

If, at step 2222, the entity is required for the interface, the system retrieves the cardinality between a superordinate entity and the entity from the business object model (step 2230, FIG. 22D). The system also receives an indication of the cardinality between the superordinate entity and the entity from the designer (step 2232). The system then determines whether the received cardinality is a subset of the business object model cardinality (step 2234). If the received cardinality is not a subset of the business object model cardinality, the system sends an error message to the designer (step 2236). If the received cardinality is a subset of the business object model cardinality, the system assigns the received cardinality as the cardinality between the superordinate entity and the entity (step 2238). The system then continues this analysis for the remaining entities within the package (step 2226, FIG. 22C), and for the remaining packages within the package template (step 2228).

Figure 22E:
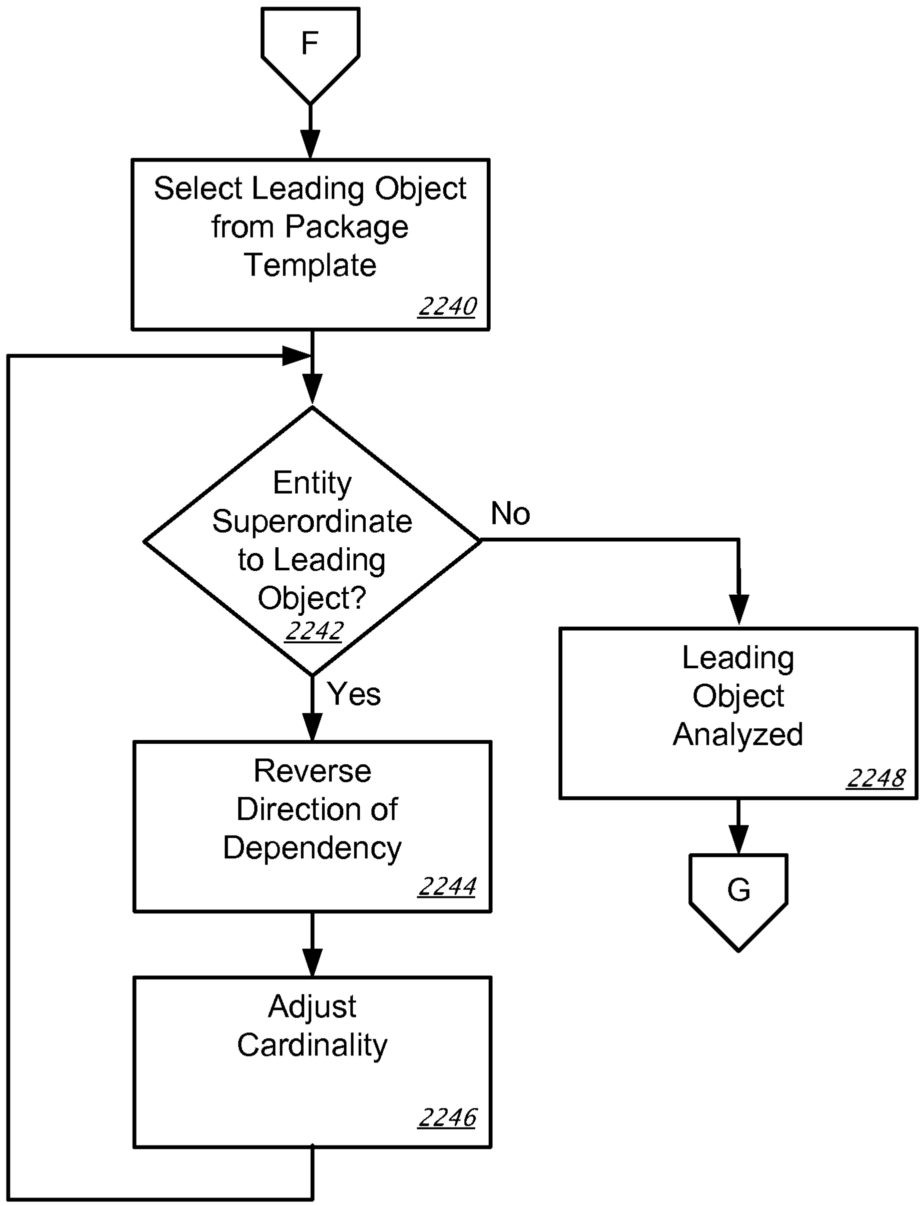

The system then selects a leading object from the package template (step 2240, FIG. 22E). The system determines whether there is an entity superordinate to the leading object (step 2242). If the system determines that there is an entity superordinate to the leading object, the system reverses the direction of the dependency (step 2244) and adjusts the cardinality between the leading object and the entity (step 2246). The system performs this analysis for entities that are superordinate to the leading object (step 2242). If the system determines that there are no entities superordinate to the leading object, the system identifies the leading object as analyzed (step 2248).

Figure 22F:
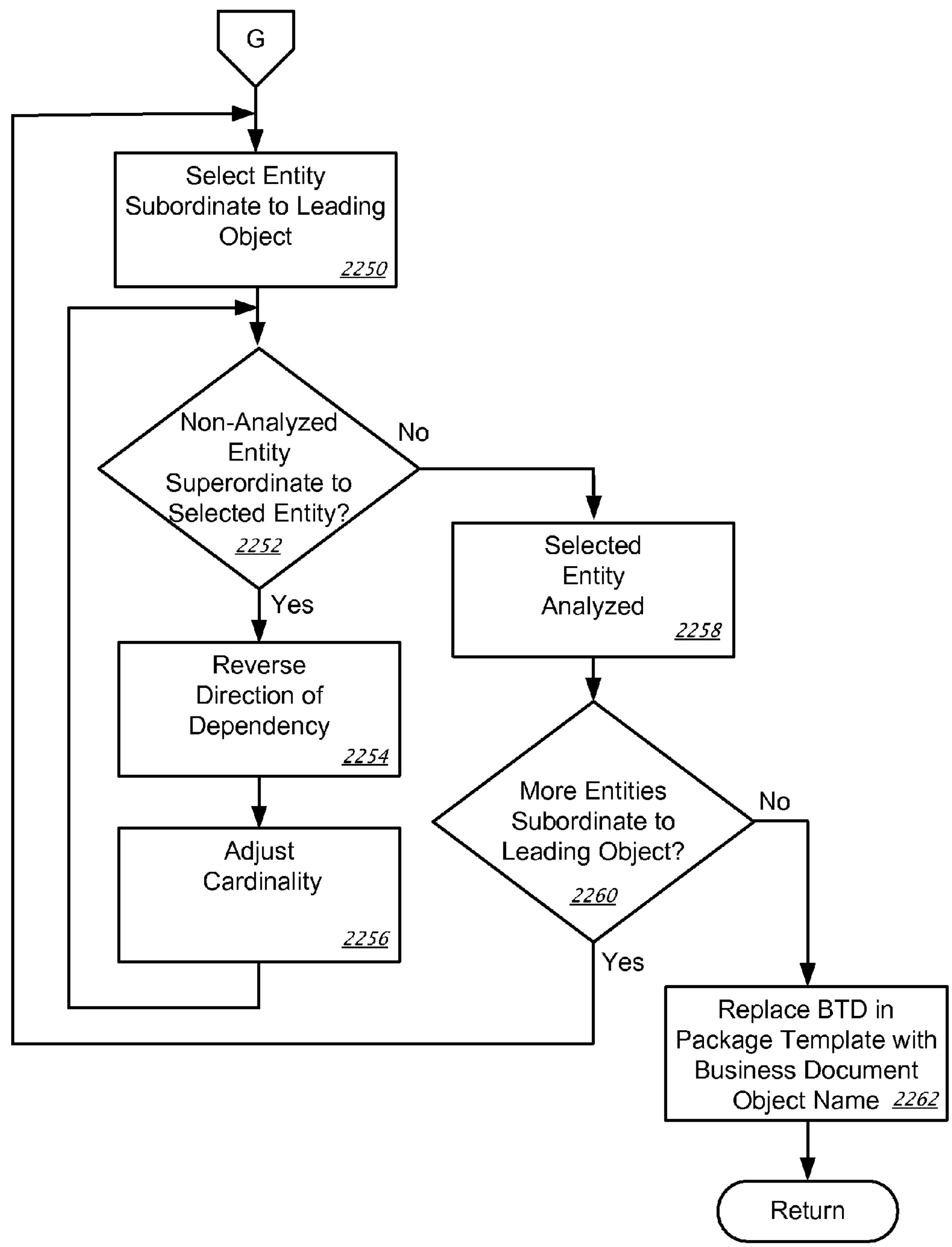

The system then selects an entity that is subordinate to the leading object (step 2250, FIG. 22F). The system determines whether any non-analyzed entities are superordinate to the selected entity (step 2252). If a non-analyzed entity is superordinate to the selected entity, the system reverses the direction of the dependency (step 2254) and adjusts the cardinality between the selected entity and the non-analyzed entity (step 2256). The system performs this analysis for non-analyzed entities that are superordinate to the selected entity (step 2252). If the system determines that there are no non-analyzed entities superordinate to the selected entity, the system identifies the selected entity as analyzed (step 2258), and continues this analysis for entities that are subordinate to the leading object (step 2260). After the packages have been analyzed, the system substitutes the BusinessTransactionDocument ("BTD") in the package template with the name of the interface (step 2262). This includes the "BTD" in the BTDItem package and the "BTD" in the BTDItemScheduleLine package.

6. Use of an Interface

Figure 23:
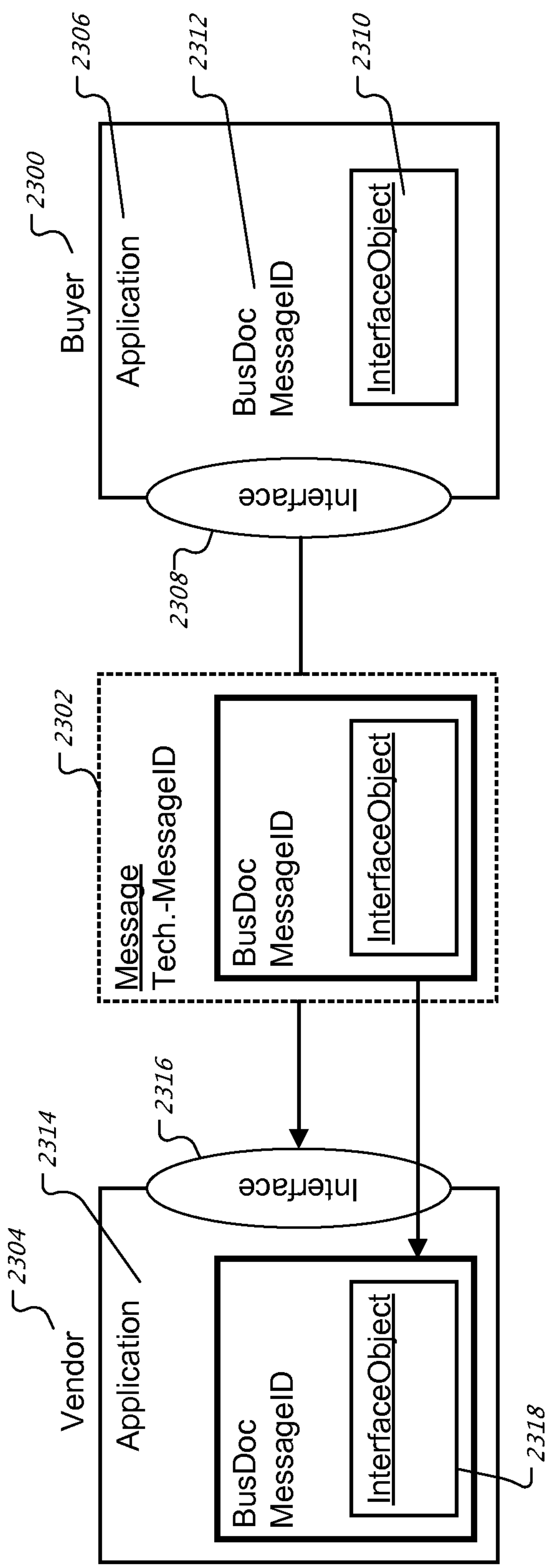
FIG. 23 depicts an example illustrating the transmittal of a business document in accordance with methods and systems consistent with the subject matter described herein.

The XI stores the interfaces (as an interface type). At runtime, the sending party's program instantiates the interface to create a business document, and sends the business document in a message to the recipient. The messages are preferably defined using XML. In the example depicted in FIG. 23, the Buyer 2300 uses an application 2306 in its system to instantiate an interface 2308 and create an interface object or business document object 2310. The Buyer's application 2306 uses data that is in the sender's component-specific structure and fills the business document object 2310 with the data. The Buyer's application 2306 then adds message identification 2312 to the business document and places the business document into a message 2302. The Buyer's application 2306 sends the message 2302 to the Vendor 2304. The Vendor 2304 uses an application 2314 in its system to receive the message 2302 and store the business document into its own memory. The Vendor's application 2314 unpacks the message 2302 using the corresponding interface 2316 stored in its XI to obtain the relevant data from the interface object or business document object 2318.

Figure 24:
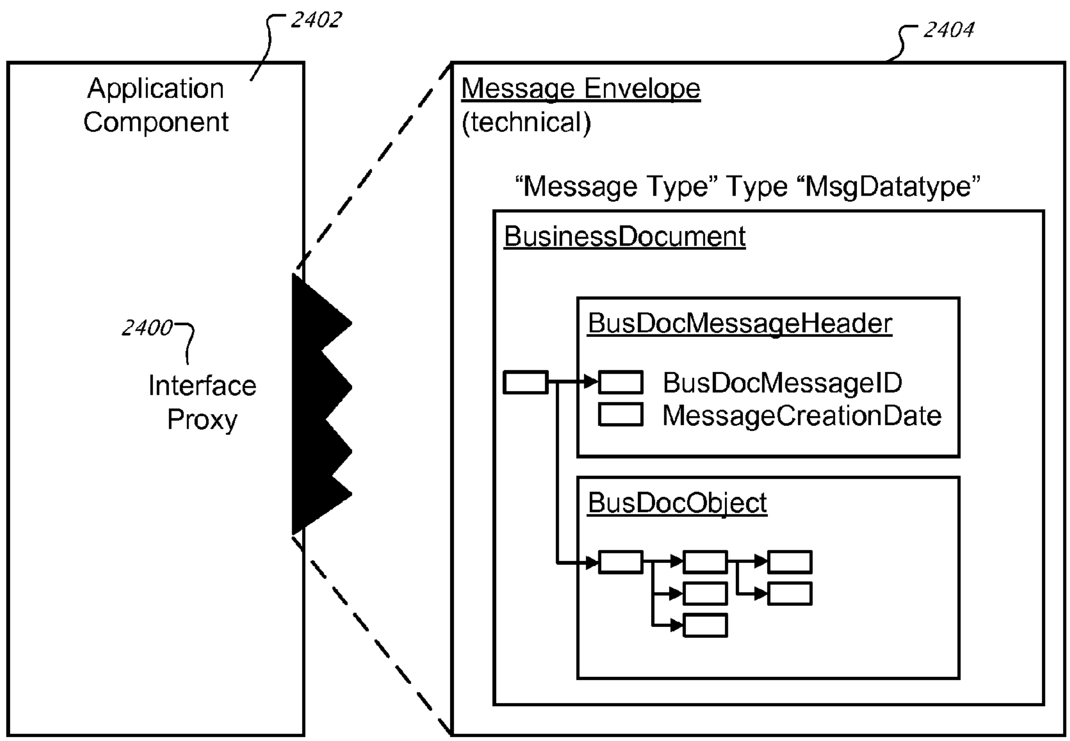
FIG. 24 depicts an interface proxy in accordance with methods and systems consistent with the subject matter described herein.
Figure 25:
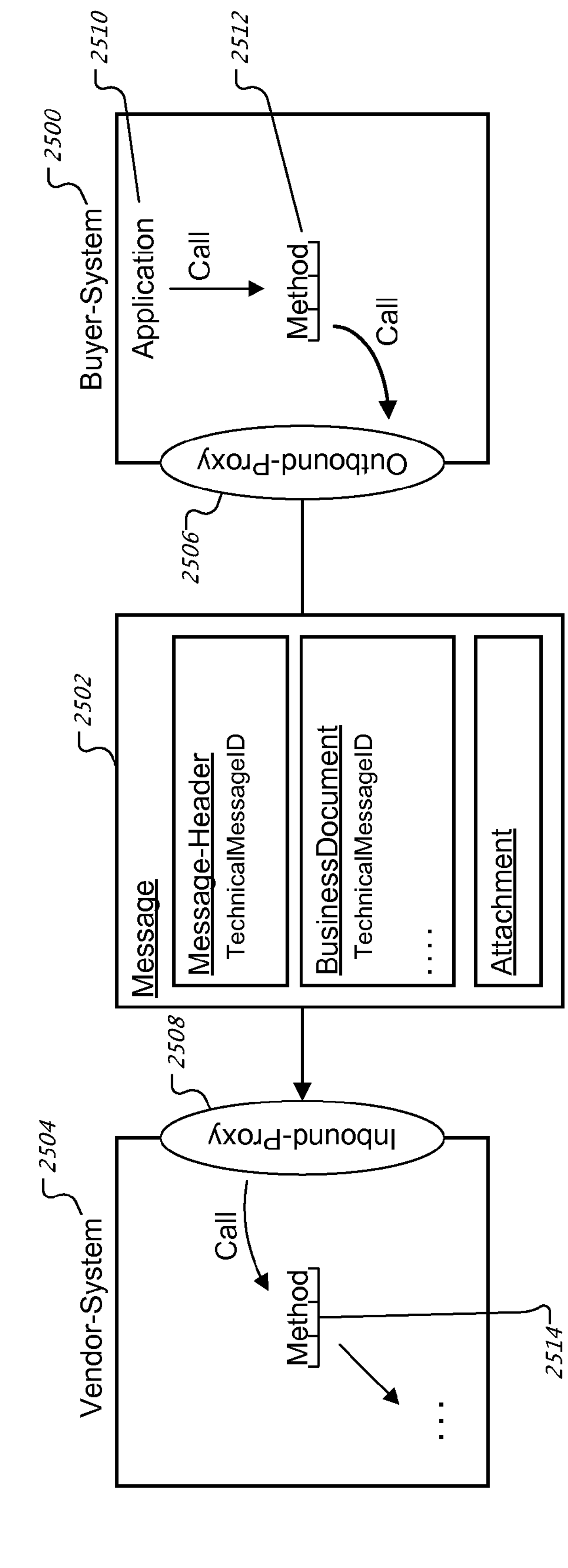
FIG. 25 depicts an example illustrating the transmittal of a message using proxies in accordance with methods and systems consistent with the subject matter described herein.

From the component's perspective, the interface is represented by an interface proxy 2400, as depicted in FIG. 24. The proxies 2400 shield the components 2402 of the sender and recipient from the technical details of sending messages 2404 via XI. In particular, as depicted in FIG. 25, at the sending end, the Buyer 2500 uses an application 2510 in its system to call an implemented method 2512, which generates the outbound proxy 2506. The outbound proxy 2506 parses the internal data structure of the components and converts them to the XML structure in accordance with the business document object. The outbound proxy 2506 packs the document into a message 2502. Transport, routing and mapping the XML message to the recipient 28304 is done by the routing system (XI, modeling environment 516, etc.).

When the message arrives, the recipient's inbound proxy 2508 calls its component-specific method 2514 for creating a document. The proxy 2508 at the receiving end downloads the data and converts the XML structure into the internal data structure of the recipient component 2504 for further processing.

Figure 26A:
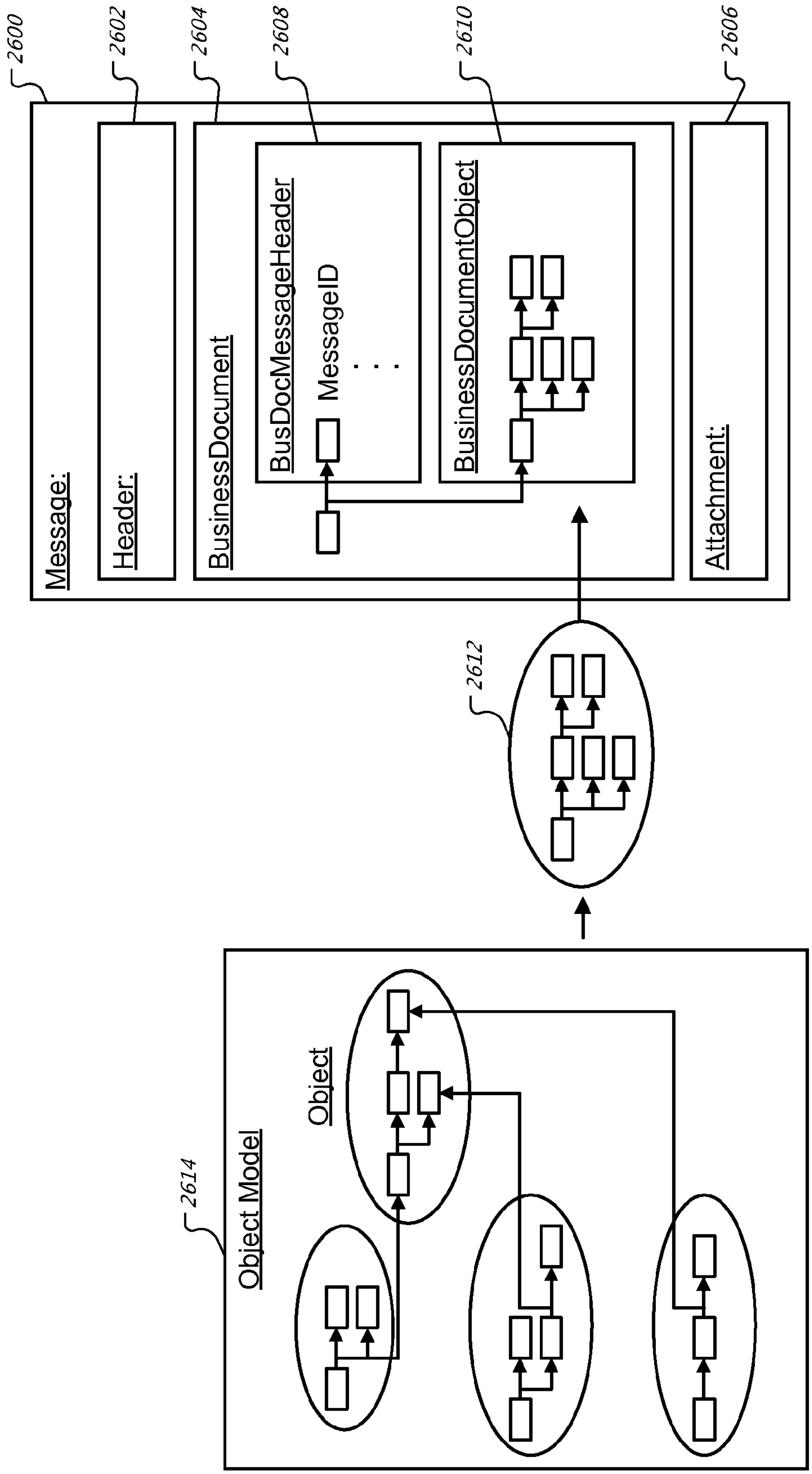
FIG. 26A depicts components of a message in accordance with methods and systems consistent with the subject matter described herein.

As depicted in FIG. 26A, a message 2600 includes a message header 2602 and a business document 2604. The message 2600 also may include an attachment 2606. For example, the sender may attach technical drawings, detailed specifications or pictures of a product to a purchase order for the product. The business document 2604 includes a business document message header 2608 and the business document object 2610. The business document message header 2608 includes administrative data, such as the message ID and a message description. As discussed above, the structure 2612 of the business document object 2610 is derived from the business object model 2614. Thus, there is a strong correlation between the structure of the business document object and the structure of the business object model. The business document object 2610 forms the core of the message 2600.

In collaborative processes as well as Q&A processes, messages should refer to documents from previous messages. A simple business document object ID or object ID is insufficient to identify individual messages uniquely because several versions of the same business document object can be sent during a transaction. A business document object ID with a version number also is insufficient because the same version of a business document object can be sent several times. Thus, messages require several identifiers during the course of a transaction.

Figure 26B:
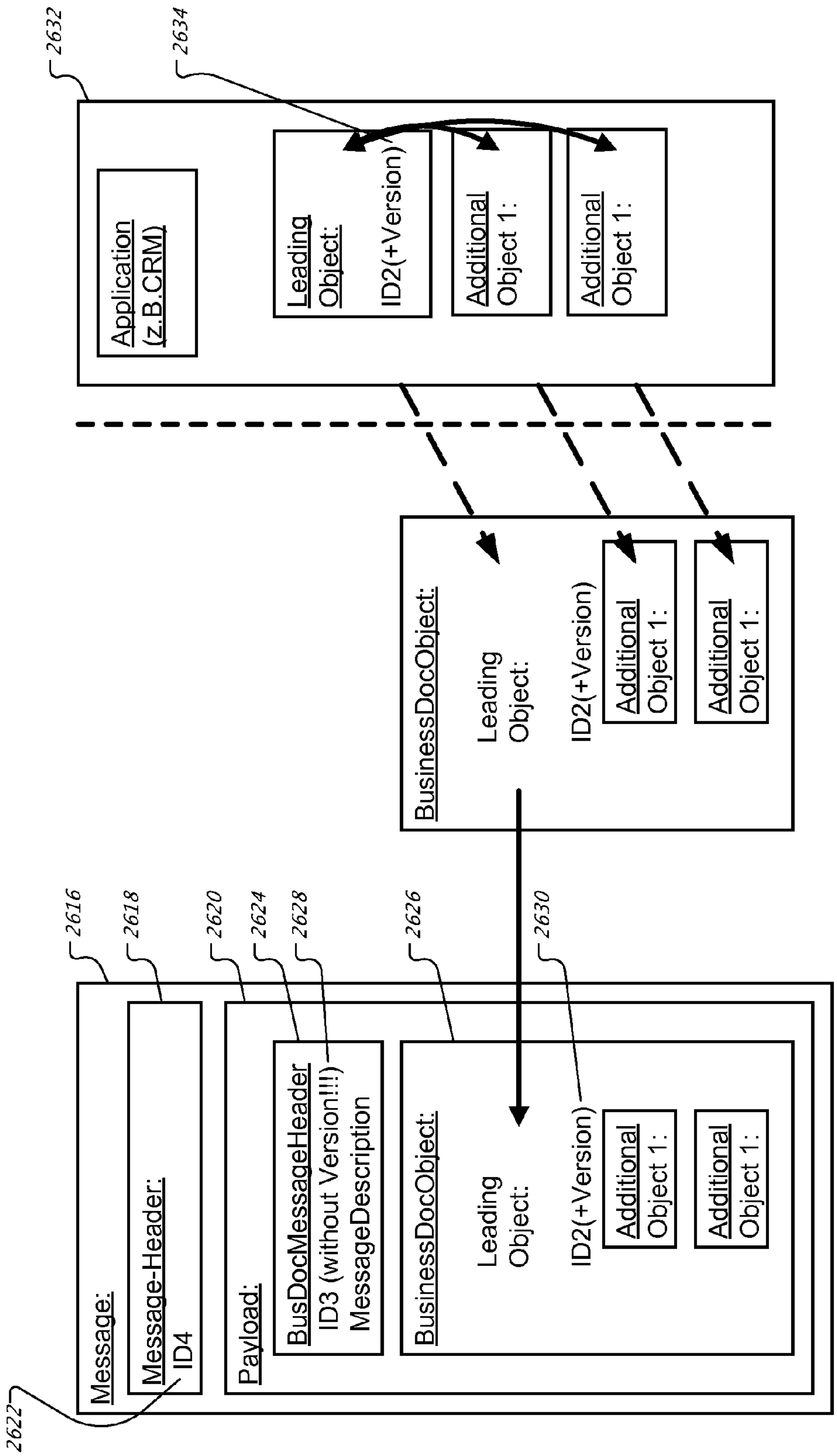
FIG. 26B depicts IDs used in a message in accordance with methods and systems consistent with the subject matter described herein.

As depicted in FIG. 26B, the message header 2618 in message 2616 includes a technical ID ("ID4") 2622 that identifies the address for a computer to route the message. The sender's system manages the technical ID 2622.

The administrative information in the business document message header 2624 of the payload or business document 2620 includes a BusinessDocumentMessageID ("ID3") 2628. The business entity or component 2632 of the business entity manages and sets the BusinessDocumentMessageID 2628. The business entity or component 2632 also can refer to other business documents using the BusinessDocumentMessageID 2628. The receiving component 2632 requires no knowledge regarding the structure of this ID. The BusinessDocumentMessageID 2628 is, as an ID, unique. Creation of a message refers to a point in time. No versioning is typically expressed by the ID. Besides the BusinessDocumentMessageID 2628, there also is a business document object ID 2630, which may include versions.

The component 2632 also adds its own component object ID 2634 when the business document object is stored in the component. The component object ID 2634 identifies the business document object when it is stored within the component. However, not all communication partners may be aware of the internal structure of the component object ID 2634. Some components also may include a versioning in their ID 2634.

7. Use of Interfaces Across Industries

Methods and systems consistent with the subject matter described herein provide interfaces that may be used across different business areas for different industries. Indeed, the interfaces derived using methods and systems consistent with the subject matter described herein may be mapped onto the interfaces of different industry standards. Unlike the interfaces provided by any given standard that do not include the interfaces required by other standards, methods and systems consistent with the subject matter described herein provide a set of consistent interfaces that correspond to the interfaces provided by different industry standards. Due to the different fields provided by each standard, the interface from one standard does not easily map onto another standard. By comparison, to map onto the different industry standards, the interfaces derived using methods and systems consistent with the subject matter described herein include most of the fields provided by the interfaces of different industry standards. Missing fields may easily be included into the business object model. Thus, by derivation, the interfaces can be extended consistently by these fields. Thus, methods and systems consistent with the subject matter described herein provide consistent interfaces or services that can be used across different industry standards.

Figure 28:
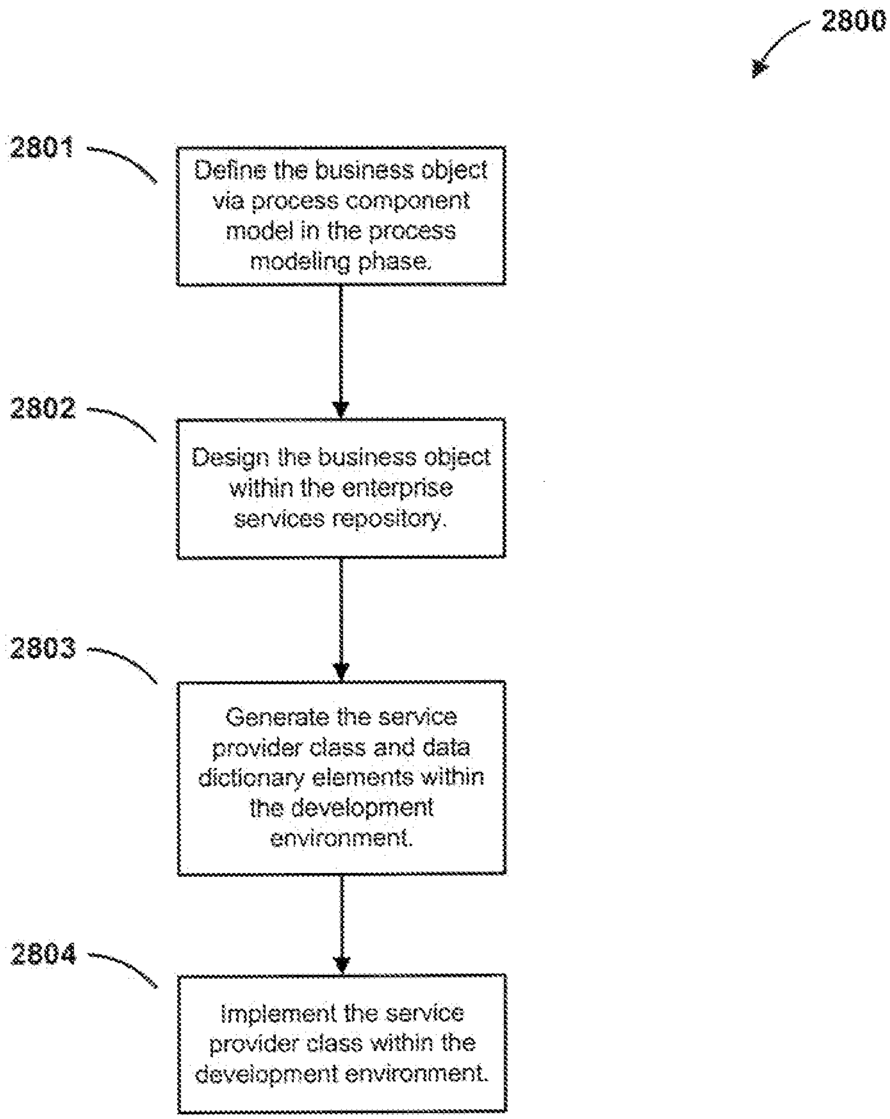
FIG. 28 illustrates an example method for service enabling in accordance with one embodiment of the present disclosure.
Figure 29:
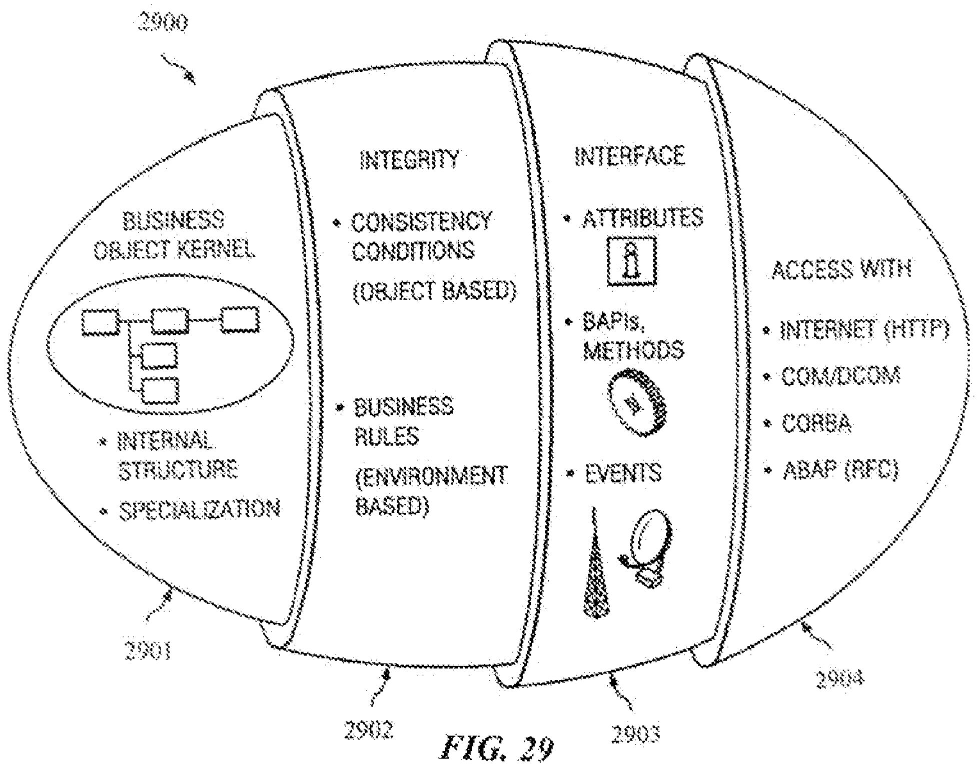
FIG. 29 is a graphical illustration of an example business object and associated components as may be used in the enterprise service infrastructure system of the present disclosure.

For example, FIG. 28 illustrates an example method 2800 for service enabling. In this example, the enterprise services infrastructure may offer one common and standard-based service infrastructure. Further, one central enterprise services repository may support uniform service definition, implementation and usage of services for user interface, and cross-application communication. In step 2801, a business object is defined via a process component model in a process modeling phase. Next, in step 2802, the business object is designed within an enterprise services repository. For example, FIG. 29 provides a graphical representation of one of the business objects 2900. As shown, an innermost layer or kernel 2901 of the business object may represent the business object's inherent data. Inherent data may include, for example, an employee's name, age, status, position, address, etc. A second layer 2902 may be considered the business object's logic. Thus, the layer 2902 includes the rules for consistently embedding the business object in a system environment as well as constraints defining values and domains applicable to the business object. For example, one such constraint may limit sale of an item only to a customer with whom a company has a business relationship. A third layer 2903 includes validation options for accessing the business object. For example, the third layer 2903 defines the business object's interface that may be interfaced by other business objects or applications. A fourth layer 2904 is the access layer that defines technologies that may externally access the business object.

Accordingly, the third layer 2903 separates the inherent data of the first layer 2901 and the technologies used to access the inherent data. As a result of the described structure, the business object reveals only an interface that includes a set of clearly defined methods. Thus, applications access the business object via those defined methods. An application wanting access to the business object and the data associated therewith usually includes the information or data to execute the clearly defined methods of the business object's interface. Such clearly defined methods of the business object's interface represent the business object's behavior. That is, when the methods are executed, the methods may change the business object's data. Therefore, an application may utilize any business object by providing the information or data without having any concern for the details related to the internal operation of the business object. Returning to method 2800, a service provider class and data dictionary elements are generated within a development environment at step 2803. In step 2804, the service provider class is implemented within the development environment.

Figure 30:
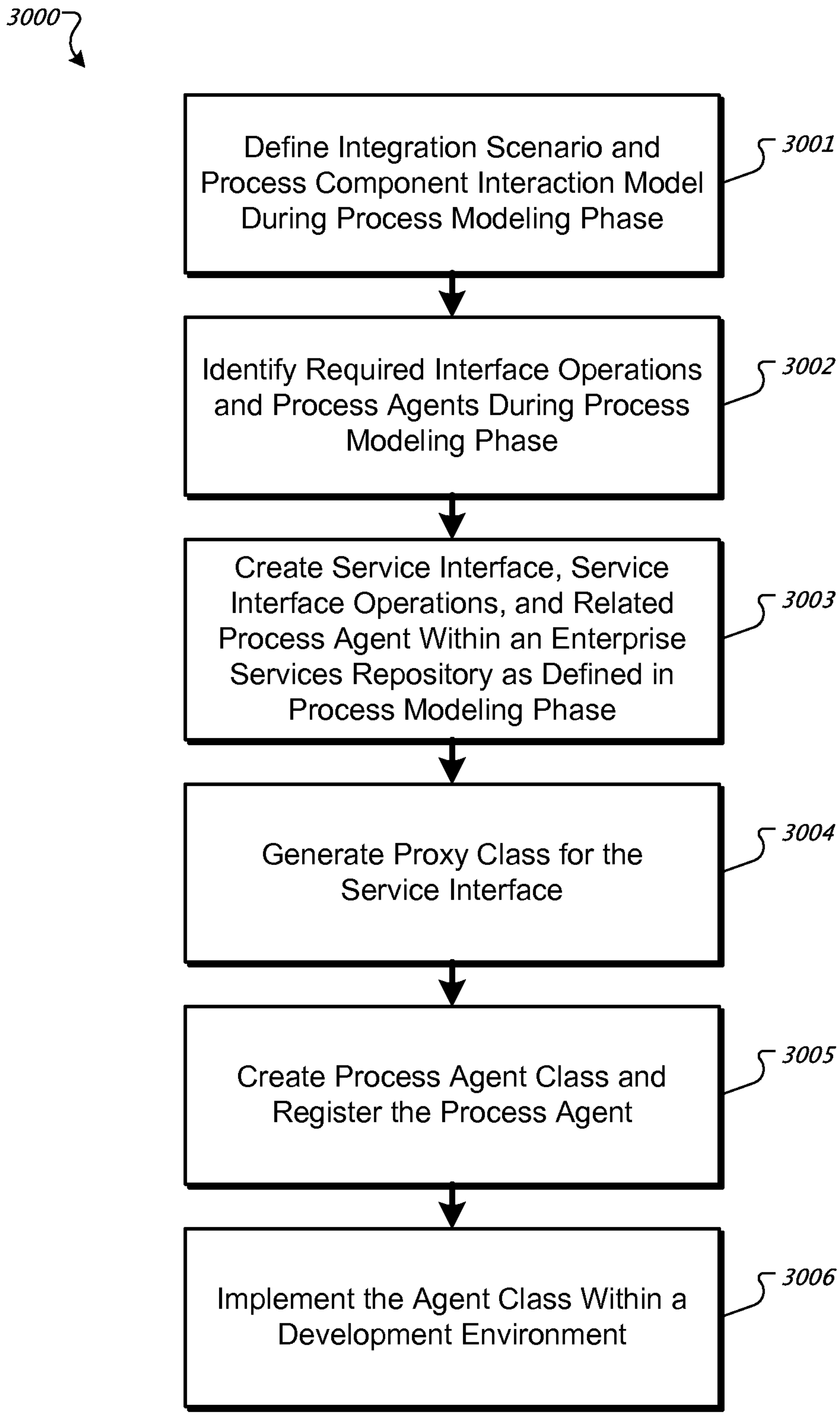
FIG. 30 illustrates an example method for managing a process agent framework in accordance with one embodiment of the present disclosure.

FIG. 30 illustrates an example method 3000 for a process agent framework. For example, the process agent framework may be the basic infrastructure to integrate business processes located in different deployment units. It may support a loose coupling of these processes by message based integration. A process agent may encapsulate the process integration logic and separate it from business logic of business objects. As shown in FIG. 30, an integration scenario and a process component interaction model are defined during a process modeling phase in step 3001. In step 3002, required interface operations and process agents are identified during the process modeling phase also. Next, in step 3003, a service interface, service interface operations, and the related process agent are created within an enterprise services repository as defined in the process modeling phase. In step 3004, a proxy class for the service interface is generated. Next, in step 3005, a process agent class is created and the process agent is registered. In step 3006, the agent class is implemented within a development environment.

Figure 31:
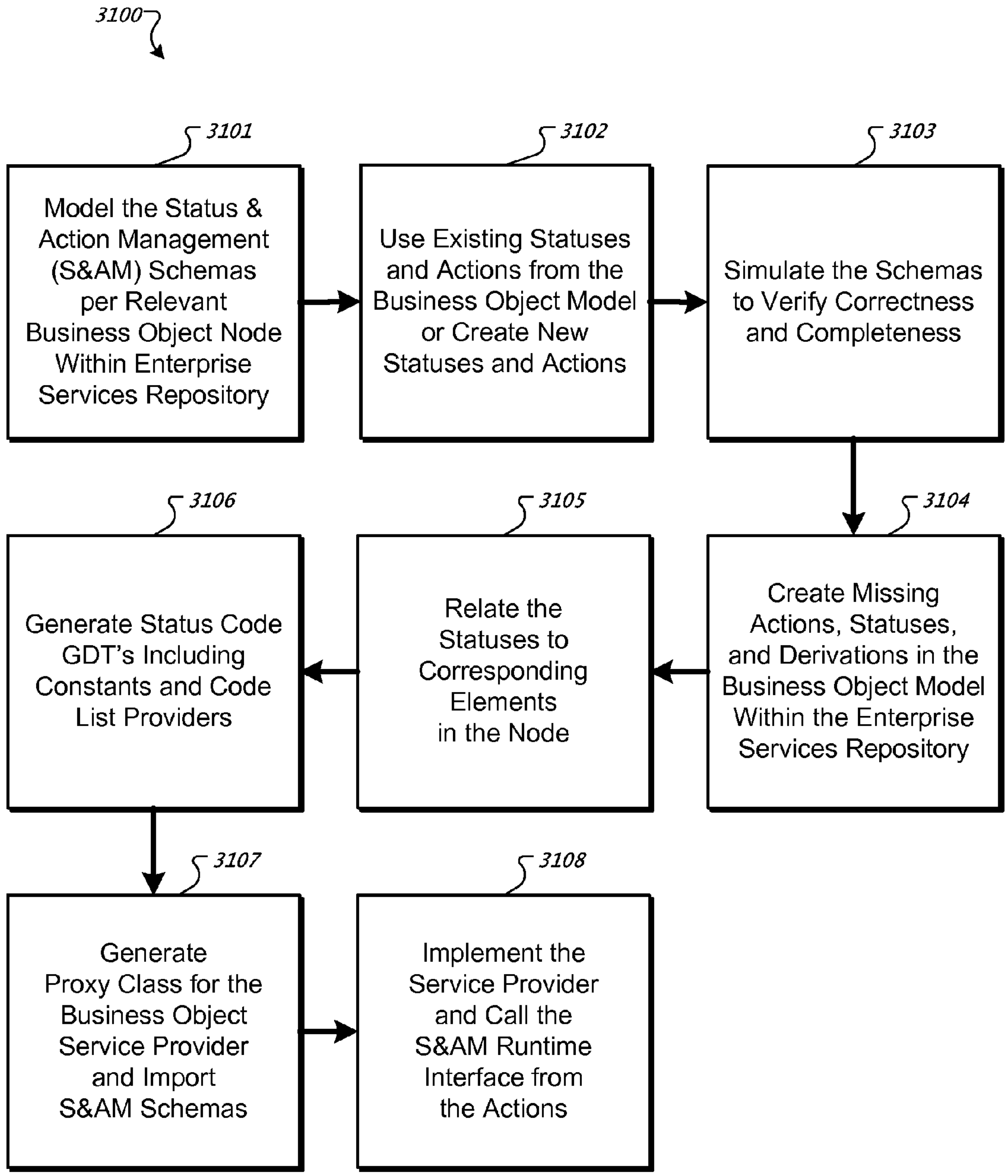
FIG. 31 illustrates an example method for status and action management in accordance with one embodiment of the present disclosure.

FIG. 31 illustrates an example method 3100 for status and action management (S&AM). For example, status and action management may describe the life cycle of a business object (node) by defining actions and statuses (as their result) of the business object (node), as well as, the constraints that the statuses put on the actions. In step 3101, the status and action management schemas are modeled per a relevant business object node within an enterprise services repository. In step 3102, existing statuses and actions from the business object model are used or new statuses and actions are created. Next, in step 3103, the schemas are simulated to verify correctness and completeness. In step 3104, missing actions, statuses, and derivations are created in the business object model with the enterprise services repository. Continuing with method 3100, the statuses are related to corresponding elements in the node in step 3105. In step 3106, status code GDT's are generated, including constants and code list providers. Next, in step 3107, a proxy class for a business object service provider is generated and the proxy class S&AM schemas are imported. In step 3108, the service provider is implemented and the status and action management runtime interface is called from the actions.

Regardless of the particular hardware or software architecture used, the disclosed systems or software are generally capable of implementing business objects and deriving (or otherwise utilizing) consistent interfaces that are suitable for use across industries, across businesses, and across different departments within a business in accordance with some or all of the following description. In short, system 100 contemplates using any appropriate combination and arrangement of logical elements to implement some or all of the described functionality.

Moreover, the preceding flowcharts and accompanying description illustrate example methods. The present services environment contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, the services environment may use methods with additional steps, fewer steps, and/or different steps, so long as the methods remain appropriate.

Individual Bill of Material Interfaces

An Individual Material Bill Of Material is a list that includes elements used to define and describe components that are used to assemble an individual material. The IndividualMaterialBillOfMaterial interface performs an IndividualMaterialBillOfMaterialERP-VariantByVariantIdentifyingElementsQueryResponse_In operation.

The IndividualMaterialBillOfMaterialERPVariantByVariantIdentifyingElementsQueryResponse_In is a query to and response from Product Data Maintenance to supply variant data to a user. The IndividualMaterialBillOfMaterialERPVariantByVariantIdentifyingElementsQueryResponse_In can allow clerks to use the inbound operation Find Individual Material Bill Of Material Variant By Variant Identifying Elements to display variant data of an Individual Material Bill Of Material. The IndividualMaterialBillOfMaterialERPVariantByVariantIdentifyingElementsQueryResponse_In operation includes various message types, namely an IndividualMaterialBillOfMaterialERPVariantByVariantIdentifyingElementsQuery_sync and an IndividualMaterialBillOfMaterialERPVariantByVariantIdentifyingElementsResponse_sync. The structure of the IndividualMaterialBillOfMaterialERPVariantByVariantIdentifying ElementsQuery_sync message type is specified by an IndividualMaterialBillOfMaterialERPVariantByVariantIentifyingElementsQueryMessage_sync message data type. The structure of the IndividualMaterialBillOfMaterialERPVariantByVariantIdentifyingElementsResponse_sync message type is specified by an IndividualMaterialBillOfMaterialERPVariantByVariantIdentifyingElementsResponseMessage_sync message data type.

Figure 32:
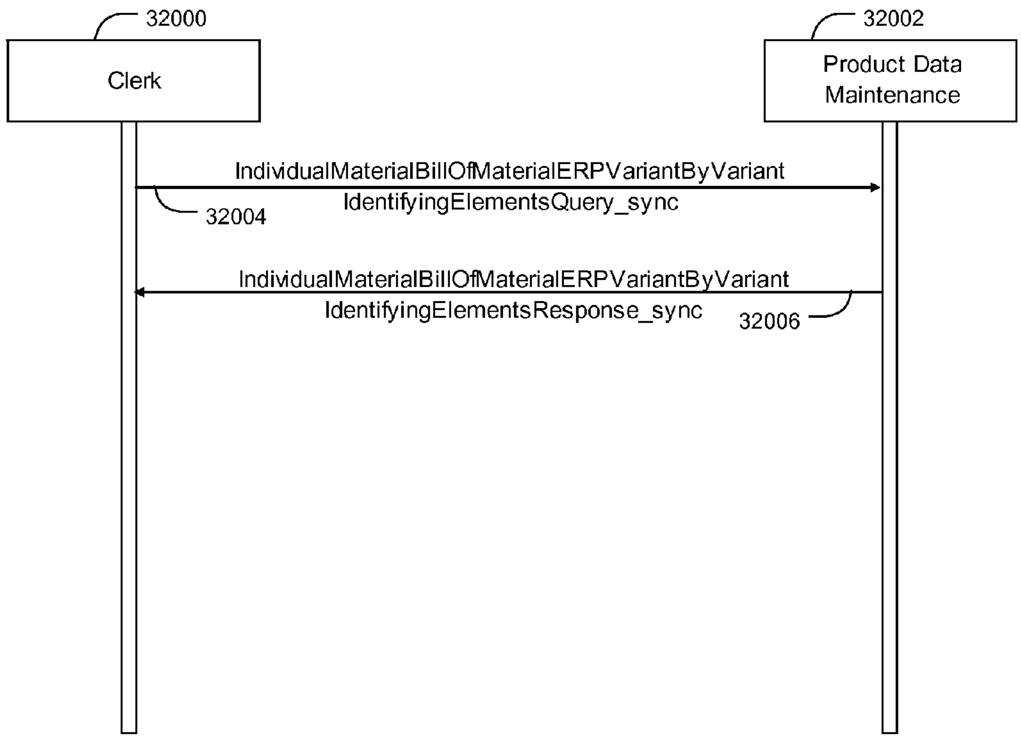
FIG. 32 shows an exemplary IndividualMaterialBillOfMaterial Message Choreography.

The message choreography of FIG. 32 describes a possible logical sequence of messages that can be used to realize an Individual Bill of Material business scenario.

A "Clerk" system 32000 can query to display variant data of an Individual Material Bill of Material using an IndividualMaterialBillOfMaterialERPVariantByVariantIdentifyingElementsQuery_sync message 32004 as shown, for example, in FIG. 32. A "Product Data Maintenance" system 32002 can confirm the request using a IndividualMaterialBillOfMaterialERPVariantByVariantIdentifyingElementsResponse_sync message 32006 as shown, for example, in FIG. 32.

Figure 33:
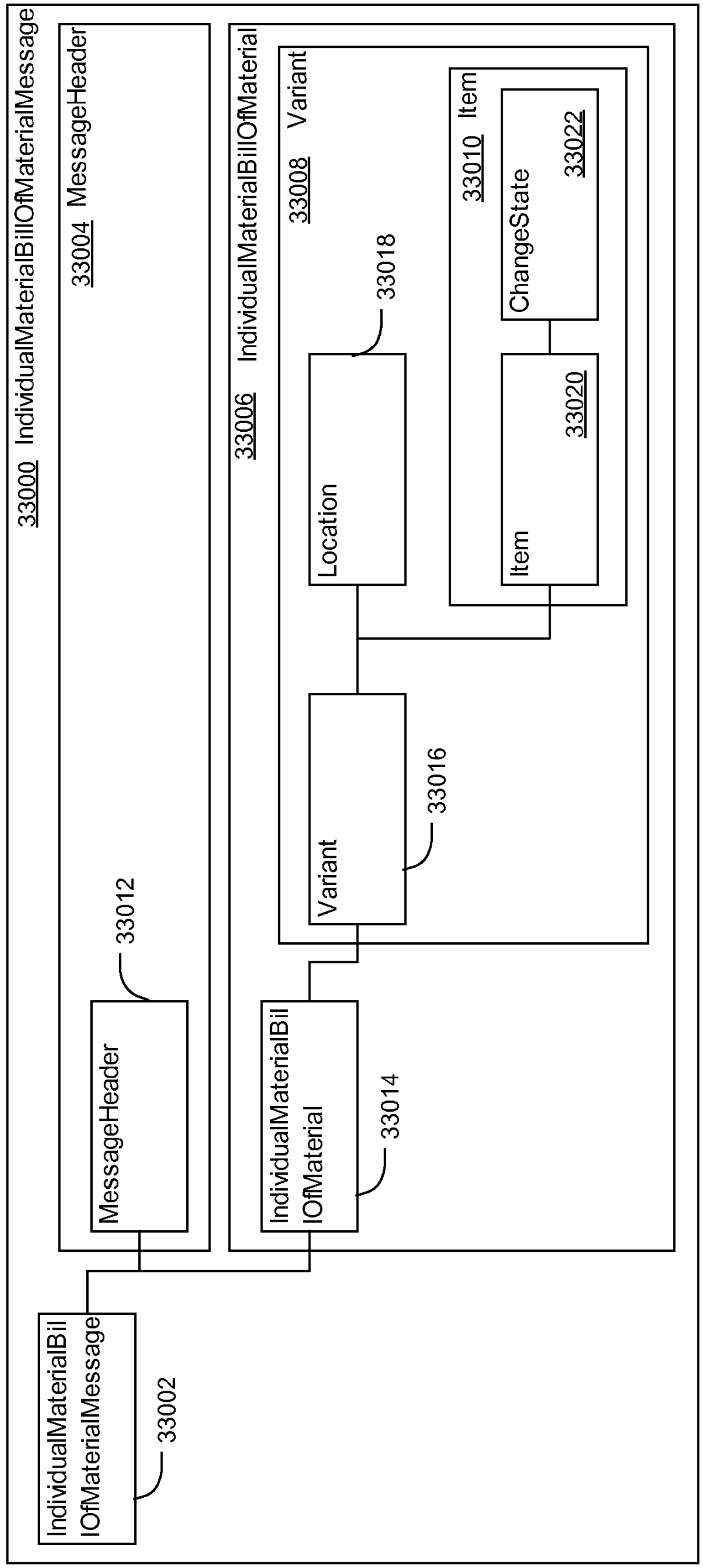
FIG. 33 shows an exemplary IndividualMaterialBillOfMaterialMessage Message Data Type.

FIG. 33 illustrates one example logical configuration of IndividualMaterialBillOfMaterialMessage message 33000. Specifically, this figure depicts the arrangement and hierarchy of various components such as one or more levels of packages, entities, and datatypes, shown here as 33000 through 33022. As described above, packages may be used to represent hierarchy levels. Entities are discrete business elements that are used during a business transaction. Data types are used to type object entities and interfaces with a structure. For example, IndividualMaterialBillOfMaterialMessage message 33000 includes, among other things, IndividualMaterialBillOfMaterial 33014. Accordingly, heterogeneous applications may communicate using this consistent message configured as such.

Figure 34:
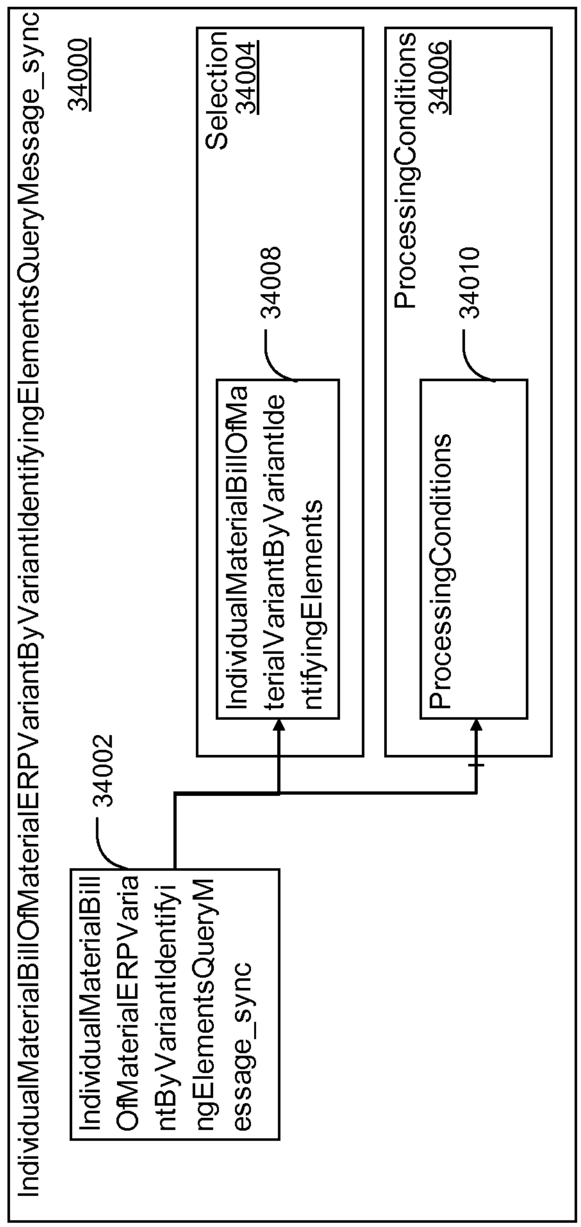
FIG. 34 shows an exemplary IndividualMaterialBillOfMaterialERPVariantByVariantIdentifyingElementsQueryMessage_sync Message Data Type.

Additionally, FIG. 34 illustrates one example logical configuration of IndividualMaterialBillOfMaterialERPVariantByVariantIdentifyingElementsQueryMessage_sync message 34000. Specifically, this figure depicts the arrangement and hierarchy of various components such as one or more levels of packages, entities, and datatypes, shown here as 34000 through 34010. As described above, packages may be used to represent hierarchy levels. Entities are discrete business elements that are used during a business transaction. Data types are used to type object entities and interfaces with a structure. For example, IndividualMaterialBillOfMaterialERPVariantByVariantIdentifyingElementsQueryMessage_sync message 34000 includes, among other things, Selection 34004. Accordingly, heterogeneous applications may communicate using this consistent message configured as such.

Figure 35:
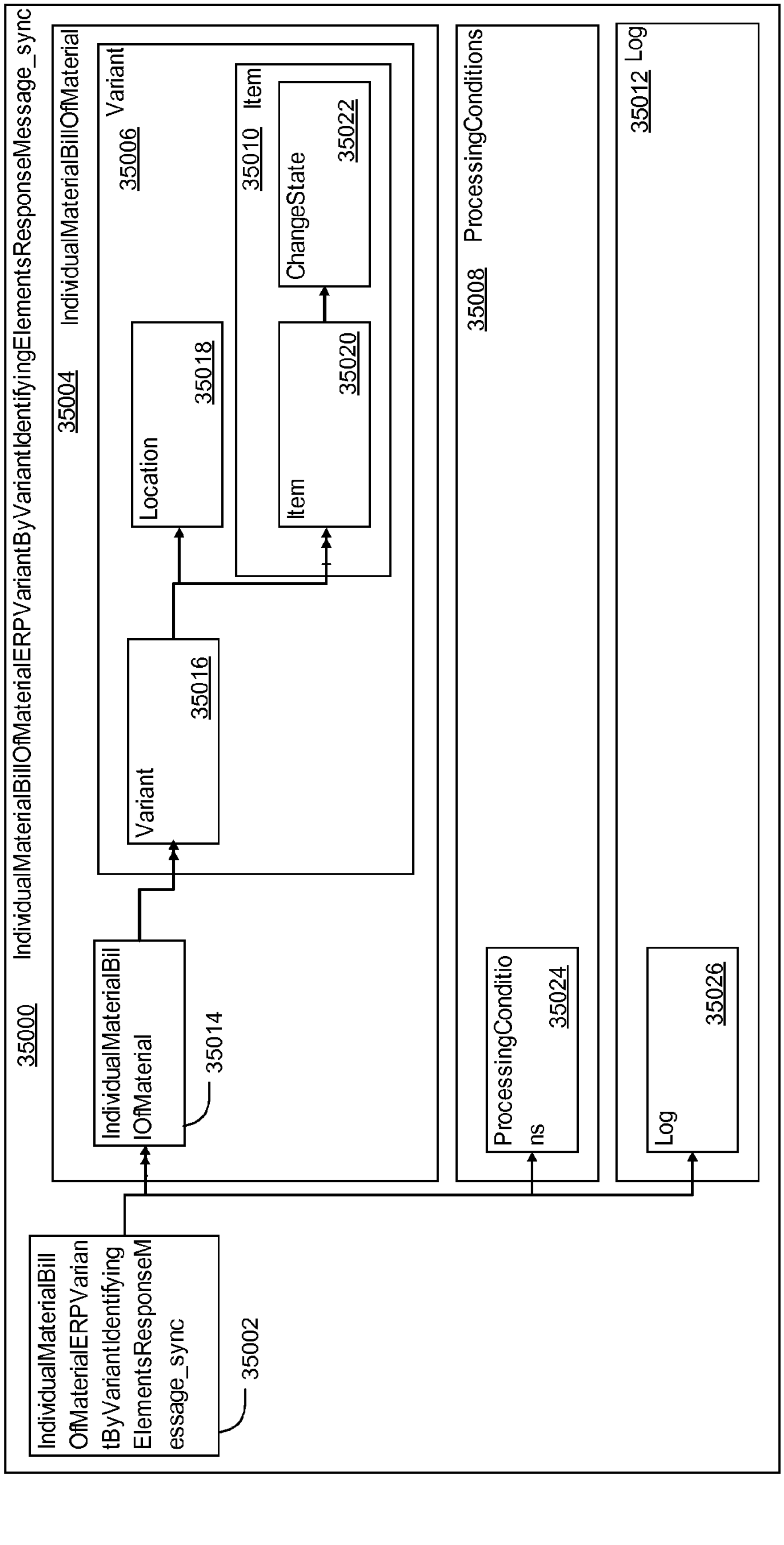
FIG. 35 shows an exemplary IndividualMaterialBillOfMaterialERPVariantByVariantIdentifyingElementsResponseMessage_sync Message Data Type.

Additionally, FIG. 35 illustrates one example logical configuration of IndividualMaterialBillOfMaterialERPVariantByVariantIdentifyingElementsResponseMessage_sync message 35000. Specifically, this figure depicts the arrangement and hierarchy of various components such as one or more levels of packages, entities, and datatypes, shown here as 35000 through 35026. As described above, packages may be used to represent hierarchy levels. Entities are discrete business elements that are used during a business transaction. Data types are used to type object entities and interfaces with a structure. For example, IndividualMaterialBillOfMaterialERPVariantByVariantIdentifyingElementsResponseMessage_sync message 35000 includes, among other things, IndividualMaterialBillOfMaterial 35004. Accordingly, heterogeneous applications may communicate using this consistent message configured as such.

FIGS. 36-1 through 36-7 show an IndividualMaterialBillOfMaterialMessage 36000 package. The IndividualMaterialBillOfMaterialMessage 36000 package includes an IndividualMaterialBillOfMaterialMessage 36002 entity. The IndividualMaterialBillOfMaterialMessage 36000 package includes various packages, namely a MessageHeader 36004 package and an IndividualMaterialBillOfMaterial 36010 package.

The MessageHeader 36004 package includes a MessageHeader 36006 entity. The MessageHeader 36006 entity is a BusinessDocumentMessageHeader 36008 data type.

The IndividualMaterialBillOfMaterial 36010 package includes an IndividualMaterialBillOfMaterial 36012 entity. The IndividualMaterialBillOfMaterial 36012 entity is an IndivMatlBOMVarItmByVarIdfgElmntsRsp_sIndivMatlBOM 36014 data type. The IndividualMaterialBillOfMaterial 36010 package includes a Variant 36036 package.

The IndividualMaterialBillOfMaterial 36012 entity includes various attributes, namely an InternalID 36016 attribute, an ID 36020 attribute, an UsageCode 36024 attribute, an UsageName 36028 attribute and a Description 36032 attribute. The InternalID 36016 attribute is a NOSC_BillOfMaterialInternalID 36018 data type. The ID 36020 attribute is a NOSC_BillOfMaterialID 36022 data type. The UsageCode 36024 attribute is a NOSC_BillOfMaterialUsageCode/BillOfMaterialUsageCode 36026 data type. The UsageName 36028 attribute is a LEN30_Name 36030 data type. The Description 36032 attribute is a SHORT_Description 36034 data type.

The Variant 36036 package includes a Variant 36038 entity. The Variant 36038 entity is an IndivMatlBOMVarItmByVarIdfgElmntsRsp_sIndivMatlBOMVar 36040 data type. The Variant 36036 package includes an Item 36074 package. The Variant 36038 entity includes various attributes, namely an ID 36042 attribute, an IndividualMaterialID 36046 attribute, a Description 36050 attribute, an IndividualMaterialDescription 36054 attribute and a ValidityDatePeriod 36058 attribute. The Variant 36038 entity includes a Location 36062 subordinate entity. The ID 36042 attribute is a BillOfMaterialVariantID 36044 data type. The IndividualMaterialID 36046 attribute is a ProductInternalID/NOSC_ProductInternalID 36048 data type.

The Description 36050 attribute is a SHORT_Description 36052 data type. The IndividualMaterialDescription 36054 attribute is a SHORT_Description 36056 data type. The ValidityDatePeriod 36058 attribute is an UPPEROPEN_DatePeriod 36060 data type. The Location 36062 entity includes various attributes, namely an InternalID 36066 attribute and a Name 36070 attribute. The InternalID 36066 attribute is a NOSC_LocationInternalID 36068 data type. The Name 36070 attribute is a LANGUAGEINDEPENDENT_MEDIUM_Name 36072 data type.

The Item 36074 package includes an Item 36076 entity. The Item 36076 entity is an IndivMatlBOMVarItmByVarIdfgElmntsRsp_sIndivMatlBOMVarItm 36078 data type. The Item 36076 entity includes an ID 36080 attribute. The Item 36076 entity includes a ChangeState 36084 subordinate entity. The ID 36080 attribute is a BillOfMaterialItemID 36082 data type.

The ChangeState 36084 entity includes various attributes, namely an ID 36088 attribute, a MaterialInternalID 36092 attribute, a StartEngineeringChangeOrderID 36096 attribute, an EndEngineeringChangeOrderID 36100 attribute, a ValidityDatePeriod 36104 attribute, a LogisticsItemTypeCode 36108 attribute, a LogisticsItemIndexText 36112 attribute, a DesiredQuantity 36116 attribute, a QuantityFixedIndicator 36120 attribute, a MaterialDescription 36124 attribute, a Description 36128 attribute and a LogisticsItemTypeName 36132 attribute.

The ID 36088 attribute is a BillOfMaterialItemChangeStateID 36090 data type. The MaterialInternalID 36092 attribute is a NOSC_ProductInternalID/ProductInternalID 36094 data type. The StartEngineeringChangeOrderID 36096 attribute is a NOSC_EngineeringChangeOrderID/EngineeringChangeOrderID 36098 data type. The EndEngineeringChangeOrderID 36100 attribute is a NOSC_EngineeringChangeOrderID/EngineeringChangeOrderID 36102 data type. The ValidityDatePeriod 36104 attribute is an UPPEROPEN_DatePeriod 36106 data type.

The LogisticsItemTypeCode 36108 attribute is a NOSC_LogisticsItemTypeCode/LogisticsItemTypeCode 36110 data type. The LogisticsItemIndexText 36112 attribute is a LogisticsItemIndexText 36114 data type. The DesiredQuantity 36116 attribute is a Quantity 36118 data type. The QuantityFixedIndicator 36120 attribute is an Indicator 36122 data type. The MaterialDescription 36124 attribute is a SHORT_Description 36126 data type. The Description 36128 attribute is a SHORT_Description 36130 data type. The LogisticsItemTypeName 36132 attribute is a LEN30_Name 36134 data type.

FIGS. 37-1 through 37-2 show an IndividualMaterialBillOfMaterialERPVariantByVariantIdentifyingElementsQueryMessage_sync 37000 package. The IndividualMaterialBillOfMaterialERPVariantByVariantIdentifyingElementsQueryMessage_sync 37000 package includes an IndividualMaterialBillOfMaterialERPVariantByVariantIdentifyingElementsQuery_sync 37002 entity. The IndividualMaterialBillOfMaterialERPVariantByVariantIdentifyingElementsQueryMessage_sync 37002 entity is an IndivMatlBOMVadItmByVarIdfgElmntsQryMsg_s 37004 data type. The IndividualMaterialBillOfMaterialERPVariantByVariantIdentifyingElementsQueryMessage_sync 37000 package includes various packages, namely a Selection 37006 package and a ProcessingConditions 37040 package.

The Selection 37006 package includes an IndividualMaterialBillOfMaterialVariantByVariantIdentifyingElements 37008 entity. The Selection 37008 entity is an IndivMatlBOMVarItmByVarIdfgEhnntsQry_sSel 37012 data type.

The IndividualMaterialBillOfMaterialVariantByVariantIdentifyingElements 37008 entity has a cardinality of 1 37010 meaning that for each instance of the Selection 37006 package there is one IndividualMaterialBillOfMaterialVariantByVariantIdentifyingElements 37008 entity. The IndividualMaterialBillOfMaterialVariantByVariantIdentifyingElements 37008 entity includes various attributes, namely a VariantIndividualMaterialID 37014 attribute, a VariantPlantID 37020 attribute, and a VariantValidityDatePeriodStartDate 37026 attribute. The IndividualMaterialBillOfMaterialVariantByVariantIdentifyingElements 37008 entity includes a UsageCode 37032 subordinate entity.

The VariantIndividualMaterialID 37014 attribute is a NOSC_ProductInternalID 37018 data type. The VariantIndividualMaterialID 37014 attribute has a cardinality of 1 37016 meaning that for each instance of the IndividualMaterialBillOfMaterialVariantByVariantIdentifyingElements 37008 entity there is one VariantIndividualMaterialID 37014 attribute.

The VariantPlantID 37020 attribute is a NOSC_PlantID 37024 data type. The VariantPlantID 37020 attribute has a cardinality of 0 . . . 1 37022 meaning that for each instance of the IndividualMaterialBillOfMaterialVariantByVariantIdentifyingElements 37008 entity there may be one VariantPlantID 37020 attribute.

The UsageCode 37032 entity includes a VariantUsageofonlyusage attribute 37034. The VariantUsageofonlyusage 37034 attribute is a NOSC_BillOfMaterialUsageCode 37038 data type. The VariantUsageofonlyusage 37034 attribute has a cardinality of 1 37036 meaning that for each instance of the UsageCode 37032 entity there is one VariantUsageofonlyusage 37034 attribute.

The VariantValidityDatePeriodStartDate 37026 attribute has a cardinality of 0 . . . 1 37028 meaning that for each instance of the IndividualMaterialBillOfMaterialVariantByVariantIdentifyingElements 37008 entity there may be one VariantValidityDatePeriodStartDate 37026 attribute.

The ProcessingConditions 37040 package includes a ProcessingConditions 37042 entity. The ProcessingConditions 37042 entity is a WITHOUT_LASTRETURNED_QueryProcessingConditions 37046 data type. The ProcessingConditions 37042 entity has a cardinality of 0 . . . 1 37044 meaning that for each instance of the ProcessingConditions 37040 package there may be one ProcessingConditions 37042 entity.

FIGS. 38-1 through 38-7 show an IndividualMaterialBillOfMaterialERPVariantByVariantIdentifyingElementsResponseMessage_sync 38000 package. The IndividualMaterialBillOfMaterialERPVariantByVariantIdentifyingElementsResponseMessage_sync 38000 package includes an IndividualMaterialBillOfMaterialERPVariantByVariantIdentifyingElementsResponse_sync 38002 entity. The IndividualMaterialBillOfMaterialERPVariantByVariantIdentifying ElementsResponseMessage_sync 38002 entity is an IndivMatlBOMVarItmByVarIdfgElmntsRspMsg_s 38004 data type. The IndividualMaterialBillOfMaterialERPVariantByVariantIdentifyingElementsResponseMessage_sync 38000 package includes various packages, namely an IndividualMaterialBillOfMaterial 38006 package, a ProcessingConditions 38192 package and a Log 38200 package.

The IndividualMaterialBillOfMaterial 38006 package includes an IndividualMaterialBillOfMaterial 38008 entity. The IndividualMaterialBillOfMaterial 38008 entity is an IndivMatlBOMVarItmByVarIdf-gElmntsRsp_sIndivMatlBOM 38012 data type. The IndividualMaterialBillOfMaterial 38006 package includes a Variant 38044 package.

The IndividualMaterialBillOfMaterial 38008 entity has a cardinality of 0 . . . n 38010 meaning that for each instance of the IndividualMaterialBillOfMaterial 38006 package there may be one or more IndividualMaterialBillOfMaterial 38008 entities. The IndividualMaterialBillOfMaterial 38008 entity includes various attributes, namely an InternalID 38014 attribute, an ID 38020 attribute, an UsageCode 38026 attribute, an UsageName 38032 attribute and a Description 38038 attribute.

The InternalID 38014 attribute is a NOSC_BillOfMaterialInternalID 38018 data type. The InternalID 38014 attribute has a cardinality of 1 38016 meaning that for each instance of the IndividualMaterialBillOfMaterial 38008 entity there is one InternalID 38014 attribute. The ID 38020 attribute is a NOSC_BillOfMaterialID 38024 data type. The ID 38020 attribute has a cardinality of 0 . . . 1 38022 meaning that for each instance of the IndividualMaterialBillOfMaterial 38008 entity there may be one ID 38020 attribute.

The UsageCode 38026 attribute is a NOSC_BillOfMaterialUsageCode 38030 data type. The UsageCode 38026 attribute has a cardinality of 1 38028 meaning that for each instance of the IndividualMaterialBillOfMaterial 38008 entity there is one UsageCode 38026 attribute. The UsageName 38032 attribute is a LEN30_Name 38036 data type. The UsageName 38032 attribute has a cardinality of 0 . . . 1 38034 meaning that for each instance of the IndividualMaterialBillOfMaterial 38008 entity there may be one UsageName 38032 attribute.

The Description 38038 attribute is a SHORT_Description 38042 data type. The Description 38038 attribute has a cardinality of 0 . . . 1 38040 meaning that for each instance of the IndividualMaterialBillOfMaterial 38008 entity there may be one Description 38038 attribute.

The Variant 38044 package includes a Variant 38046 entity. The Variant 38046 entity is an IndivMatlBOMVarItmByVarIdfgElmntsRsp_sIndivMatlBOMVar 38050 data type. The Variant 38044 package includes an Item 38100 package.

The Variant 38046 entity has a cardinality of 1 . . . n 38048 meaning that for each instance of the Variant 38044 package there are one or more Variant 38046 entities. The Variant 38046 entity includes various attributes, namely an ID 38052 attribute, an IndividualMaterialID 38058 attribute, a Description 38064 attribute, an IndividualMaterialDescription 38070 attribute and a ValidityDatePeriod 38076 attribute. The Variant 38046 entity includes a Location 38082 subordinate entity.

The ID 38052 attribute is a BillOfMaterialVariantID 38056 data type. The ID 38052 attribute has a cardinality of 1 38054 meaning that for each instance of the Variant 38046 entity there is one ID 38052 attribute. The IndividualMaterialID 38058 attribute is a NOSC_ProductInternalID 38062 data type. The IndividualMaterialID 38058 attribute has a cardinality of 1 38060 meaning that for each instance of the Variant 38046 entity there is one IndividualMaterialID 38058 attribute.

The Description 38064 attribute is a SHORT_Description 38068 data type. The Description 38064 attribute has a cardinality of 0 . . . 1 38066 meaning that for each instance of the Variant 38046 entity there may be one Description 38064 attribute. The IndividualMaterialDescription 38070 attribute is a SHORT_Description 38074 data type. The IndividualMaterialDescription 38070 attribute has a cardinality of 0 . . . 1 38072 meaning that for each instance of the Variant 38046 entity there may be one IndividualMaterialDescription 38070 attribute.

The ValidityDatePeriod 38076 attribute is an UPPEROPEN_DatePeriod 38080 data type. The ValidityDatePeriod 38076 attribute has a cardinality of 1 38078 meaning that for each instance of the Variant 38046 entity there is one ValidityDatePeriod 38076 attribute.

The Location 38082 entity has a cardinality of 0 . . . 1 38084 meaning that for each instance of the Variant 38046 entity there may be one Location 38082 entity. The Location 38082 entity includes various attributes, namely an InternalID 38088 attribute and a Name 38094 attribute. The InternalID 38088 attribute is a NOSC_LocationInternalID 38092 data type. The InternalID 38088 attribute has a cardinality of 0 . . . 1 38090 meaning that for each instance of the Location 38082 entity there may be one InternalID 38088 attribute. The Name 38094 attribute is a LANGUAGEINDEPENDENT_MEDIUM_Name 38098 data type. The Name 38094 attribute has a cardinality of 0 . . . 1 38096 meaning that for each instance of the Location 38082 entity there may be one Name 38094 attribute.

The Item 38100 package includes an Item 38102 entity. The Item 38102 entity is an IndivMatlBOMVarItmByVarIdfgElmntsRsp_sIndivMatlBOMVarItm 38106 data type. The Item 38102 entity has a cardinality of 0 . . . n 38104 meaning that for each instance of the Item 38100 package there may be one or more Item 38102 entities. The Item 38102 entity includes an ID 38108 attribute. The Item 38102 entity includes a ChangeState 38114 subordinate entity. The ID 38108 attribute is a BillOfMaterialItemID 38112 data type. The ID 38108 attribute has a cardinality of 1 38110 meaning that for each instance of the Item 38102 entity there is one ID 38108 attribute.

The ChangeState 38114 entity has a cardinality of 1 38116 meaning that for each instance of the Item 38102 entity there is one ChangeState 38114 entity. The ChangeState 38114 entity includes various attributes, namely an ID 38120 attribute, a MaterialInternalID 38126 attribute, a StartEngineeringChangeOrderID 38132 attribute, an EndEngineeringChangeOrderID 38138 attribute, a ValidityDatePeriod 38144 attribute, a LogisticsItemTypeCode 38150 attribute, a LogisticsItemIndexText 38156 attribute, a DesiredQuantity 38162 attribute, a QuantityFixedIndicator 38168 attribute, a MaterialDescription 38174 attribute, a Description 38180 attribute and a LogisticsItemTypeName 38186 attribute.

The ID 38120 attribute is a BillOfMaterialItemChangeStateID 38124 data type. The ID 38120 attribute has a cardinality of 1 38122 meaning that for each instance of the ChangeState 38114 entity there is one ID 38120 attribute. The MaterialInternalID 38126 attribute is a NOSC_ProductInternalID 38130 data type. The MaterialInternalID 38126 attribute has a cardinality of 0 . . . 1 38128 meaning that for each instance of the ChangeState 38114 entity there may be one MaterialInternalID 38126 attribute.

The StartEngineeringChangeOrderID 38132 attribute is a NOSC_EngineeringChangeOrderID 38136 data type. The StartEngineeringChangeOrderID 38132 attribute has a cardinality of 0 . . . 1 38134 meaning that for each instance of the ChangeState 38114 entity there may be one StartEngineeringChangeOrderID 38132 attribute.

The EndEngineeringChangeOrderID 38138 attribute is a NOSC_EngineeringChangeOrderID 38142 data type. The EndEngineeringChangeOrderID 38138 attribute has a cardinality of 0 . . . 1 38140 meaning that for each instance of the ChangeState 38114 entity there may be one EndEngineeringChangeOrderID 38138 attribute. The ValidityDatePeriod 38144 attribute is an UPPEROPEN_DatePeriod 38148 data type. The ValidityDatePeriod 38144 attribute has a cardinality of 1 38146 meaning that for each instance of the ChangeState 38114 entity there is one ValidityDatePeriod 38144 attribute.

The LogisticsItemTypeCode 38150 attribute is a NOSC_LogisticsItemTypeCode 38154 data type. The LogisticsItemTypeCode 38150 attribute has a cardinality of 1 38152 meaning that for each instance of the ChangeState 38114 entity there is one LogisticsItemTypeCode 38150 attribute. The LogisticsItemIndexText 38156 attribute is a LogisticsItemIndexText 38160 data type. The LogisticsItemIndexText 38156 attribute has a cardinality of 0 . . . 1 38158 meaning that for each instance of the ChangeState 38114 entity there may be one LogisticsItemIndexText 38156 attribute.

The DesiredQuantity 38162 attribute is a Quantity 38166 data type. The DesiredQuantity 38162 attribute has a cardinality of 0 . . . 1 38164 meaning that for each instance of the ChangeState 38114 entity there may be one DesiredQuantity 38162 attribute. The QuantityFixedIndicator 38168 attribute is an Indicator 38172 data type. The QuantityFixedIndicator 38168 attribute has a cardinality of 1 38170 meaning that for each instance of the ChangeState 38114 entity there is one QuantityFixedIndicator 38168 attribute.

The MaterialDescription 38174 attribute is a SHORT_Description 38178 data type. The MaterialDescription 38174 attribute has a cardinality of 0 . . . 1 38176 meaning that for each instance of the ChangeState 38114 entity there may be one MaterialDescription 38174 attribute. The Description 38180 attribute is a SHORT_Description 38184 data type. The Description 38180 attribute has a cardinality of 0 . . . 1 38182 meaning that for each instance of the ChangeState 38114 entity there may be one Description 38180 attribute.

The LogisticsItemTypeName 38186 attribute is a LEN30_Name 38190 data type. The LogisticsItemTypeName 38186 attribute has a cardinality of 0 . . . 1 38188 meaning that for each instance of the ChangeState 38114 entity there may be one LogisticsItemTypeName 38186 attribute.

The ProcessingConditions 38192 package includes a ProcessingConditions 38194 entity. The ProcessingConditions 38194 entity is a WITHOUT_LASTRETURNED_ResponseProcessingConditions 38198 data type. The ProcessingConditions 38194 entity has a cardinality of 1 38196 meaning that for each instance of the ProcessingConditions 38192 package there is one ProcessingConditions 38194 entity.

The Log 38200 package includes a Log 38202 entity. The Log 38202 entity is a NOSC_Log 38206 data type. The Log 38202 entity has a cardinality of 1 38204 meaning that for each instance of the Log 38200 package there is one Log 38202 entity.

Order Tracking View Interfaces

An OrderTrackingView is a document for document information for follow-on business transactions for tracking and completion of a specified order. The OrderTrackingView business object includes operations that can be used to provide appropriate user interface information for tracking the progress of a specified order (business transaction document), by collecting information from related business transaction documents. The related business transaction documents can be selected by using A2X (Composite to Application), A2A (Application to Application), or B2B (Business to Business). In an example where a specified order is a purchase order of a customer, related documents are a sales order and outbound delivery on the supplier side (B2B scenario). The OrderTrackingView interface performs a PurchaseOrderTrackingViewERPByPurchaseOrderQueryResponse_In operation.

The PurchaseOrderTrackingViewERPByPurchaseOrderQueryResponse_In is a query to and response from BusinessDocumentFlowProcessing to track the status of a specified purchase order by using follow-on documents and their processing status. The OrderTrackingView for the purchase order tracks the status of a purchase order in a third-party system. The PurchaseOrderTracIdngViewERPByPurchaseOrderQueryResponse_In operation accesses a related sales order and outbound delivery on the third-party side. The PurchaseOrderTrackingViewERPByPurchaseOrderQueryResponse_In operation includes various message types, namely a PurchaseOrderTrackingViewERPByPurchaseOrderQuery_sync and a PurchaseOrderTrackingViewERPByPurchaseOrderResponse_sync. The structure of the PurchaseOrderTrackingViewERPByPurchaseOrderQuery_sync message type is specified by a PurchaseOrderTrackingViewERPByPurchaseOrderQueryMessage_sync message data type. The structure of the PurchaseOrderTrackingViewERPByPurchaseOrderResponse_sync message type is specified by a PurchaseOrderTrackingViewERPByPurchaseOrderResponseMessage_sync message data type.

Figure 39:
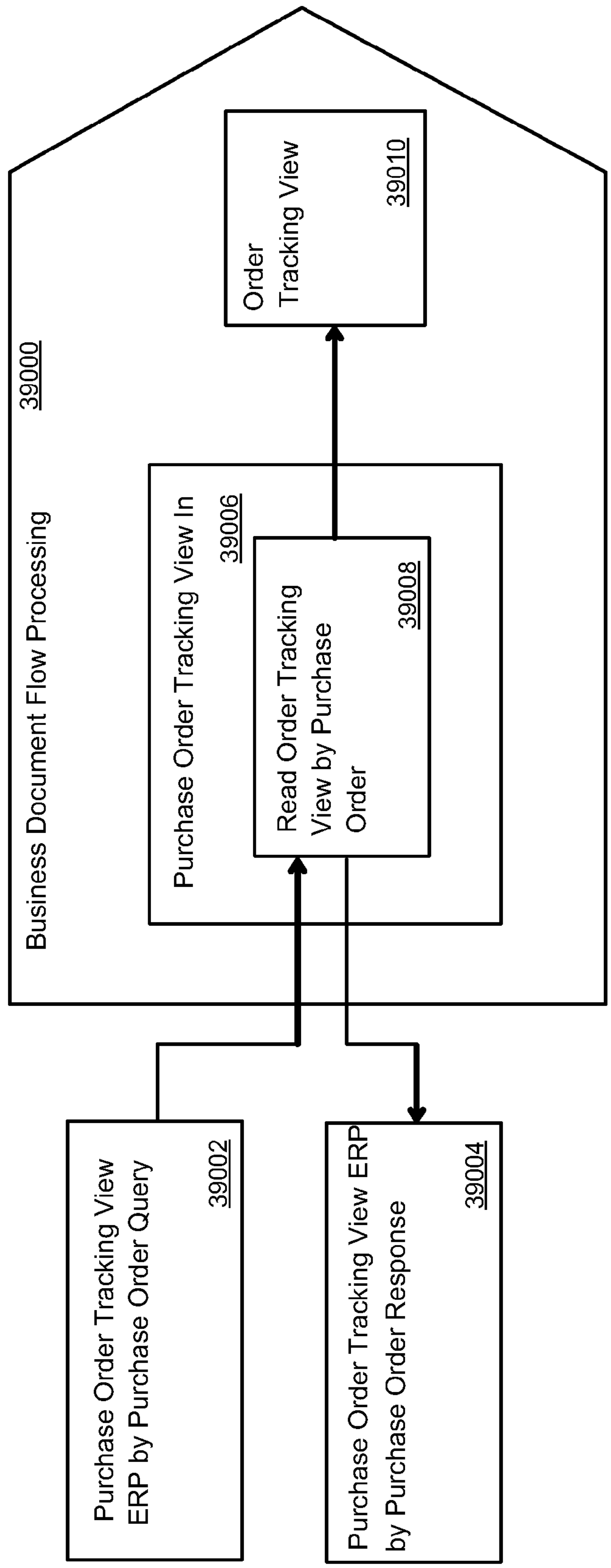
FIG. 39 shows an exemplary OrderTrackingView Process Component.

FIG. 39 describes an example Business Document Flow Processing process component 39000 that can provide interfaces for Order Tracking View. For example, the Business Document Flow Processing process component 39000 can receive a Purchase Order Tracking View ERP by Purchase Order Query message 39002. The message 39002 can be received in a Read Order Tracking View of Purchase Order operation 39008. The operation 39008 can be included in a Purchase Order Tracking View In interface 39006. The operation 39008 can update an Order Tracking View business object 39010. Upon completion, the operation 39008 can send a Purchase Order Tracking View ERP by Purchase Order Response message 39004.

Figure 40:
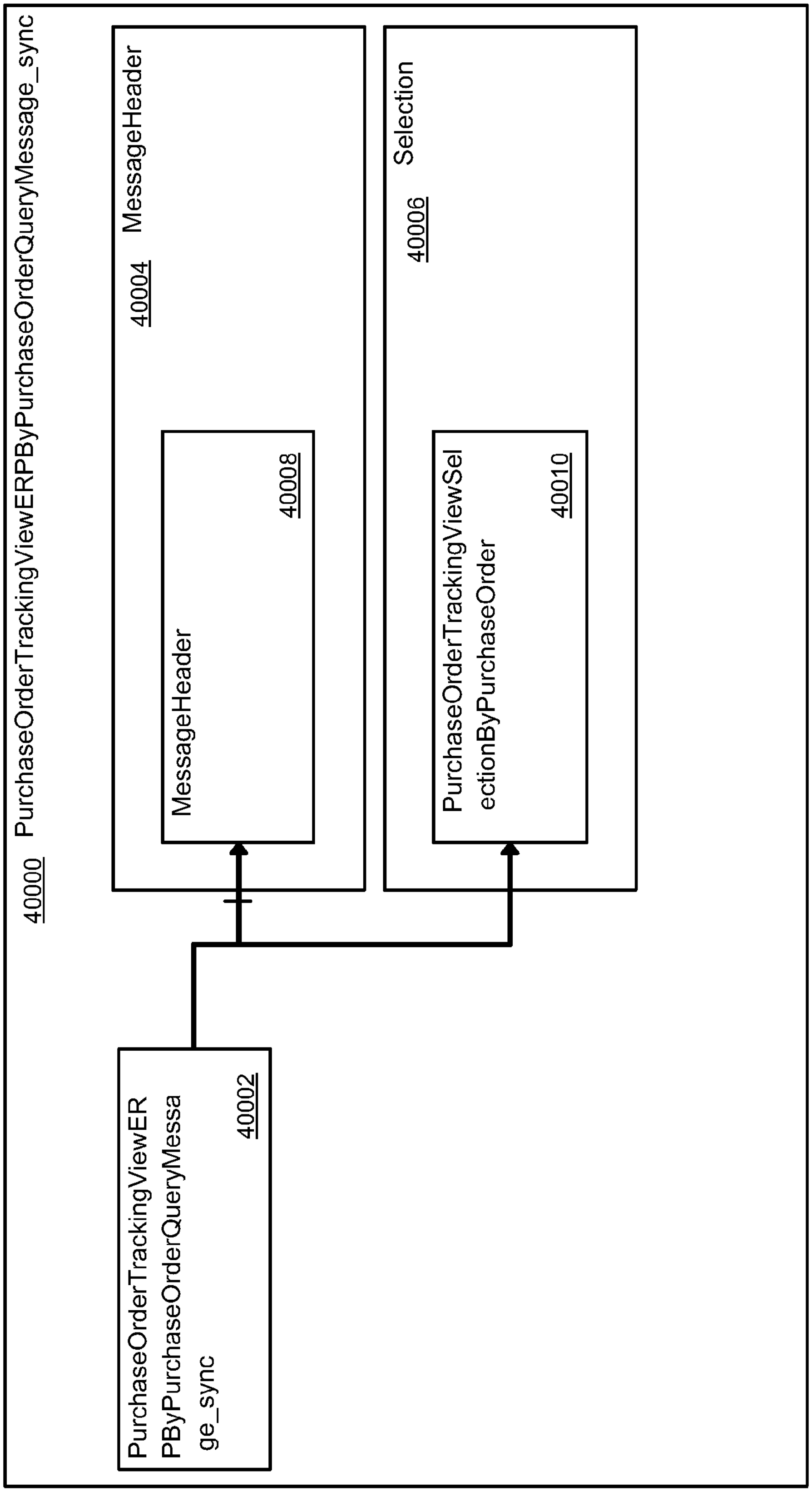
FIG. 40 shows an exemplary PurchaseOrderTrackingViewERPByPurchaseOrderQueryMessage_sync Message Data Type.

FIG. 40 illustrates one example logical configuration of PurchaseOrderTrackingViewERPByPurchaseOrderQuery_sync message 40000. Specifically, this figure depicts the arrangement and hierarchy of various components such as one or more levels of packages, entities, and datatypes, shown here as 40000 through 40010. As described above, packages may be used to represent hierarchy levels. Entities are discrete business elements that are used during a business transaction. Data types are used to type object entities and interfaces with a structure. For example, PurchaseOrderTrackingViewERPByPurchaseOrderQuery_sync message 40000 includes, among other things, Selection 40006. Accordingly, heterogeneous applications may communicate using this consistent message configured as such.

Figures 1, 41:
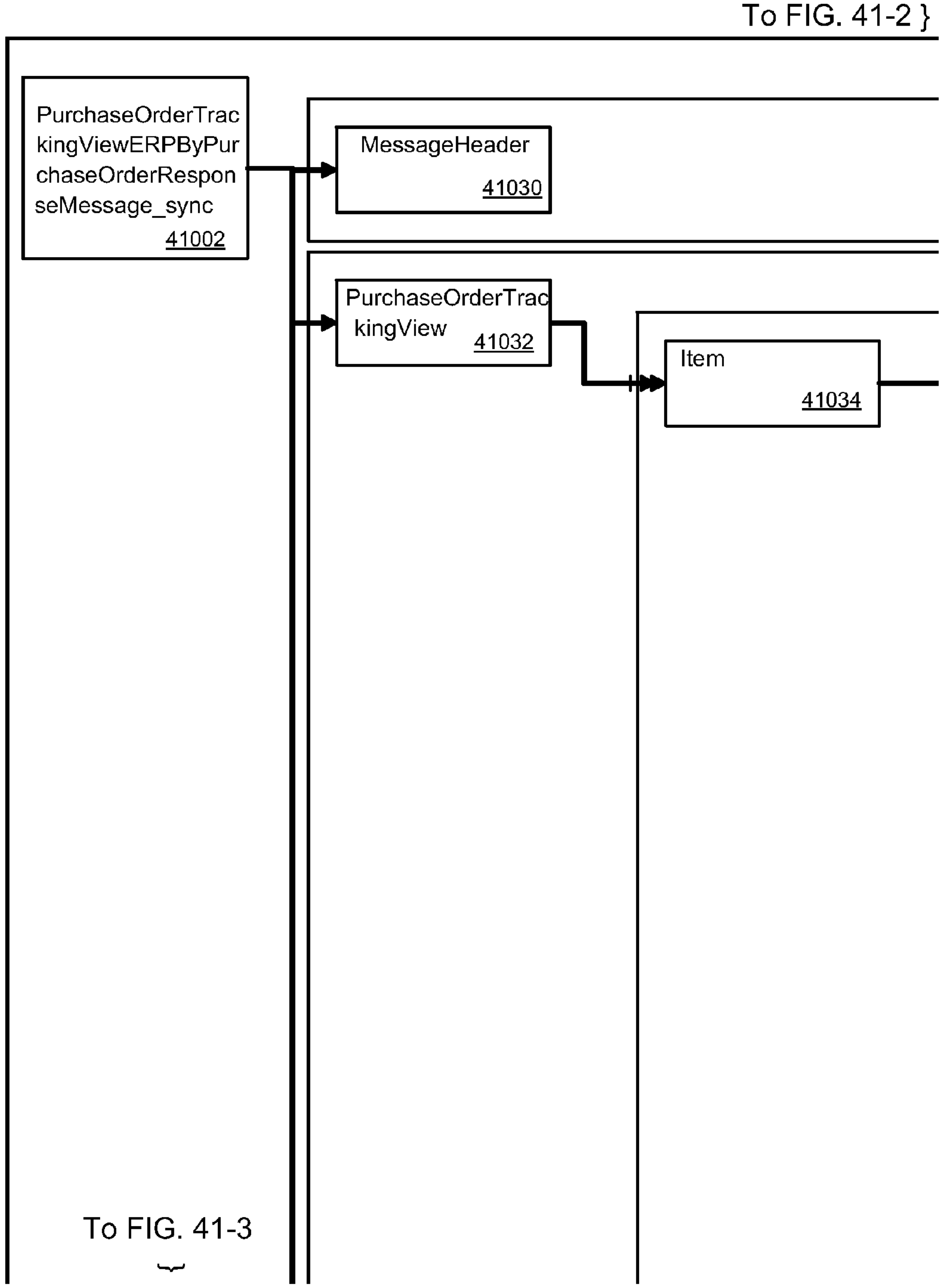
Figures 2, 41:
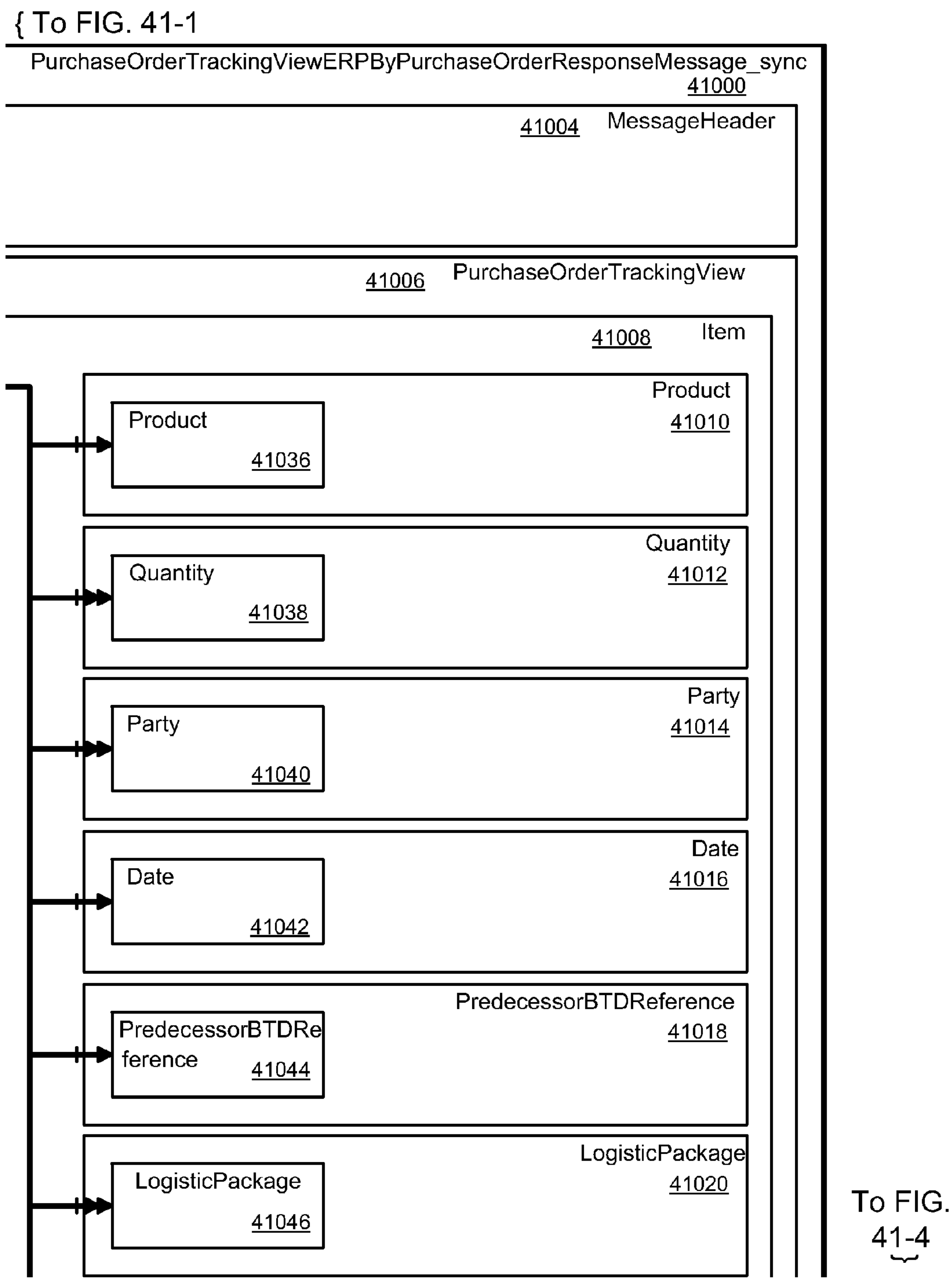
Figures 3, 41:
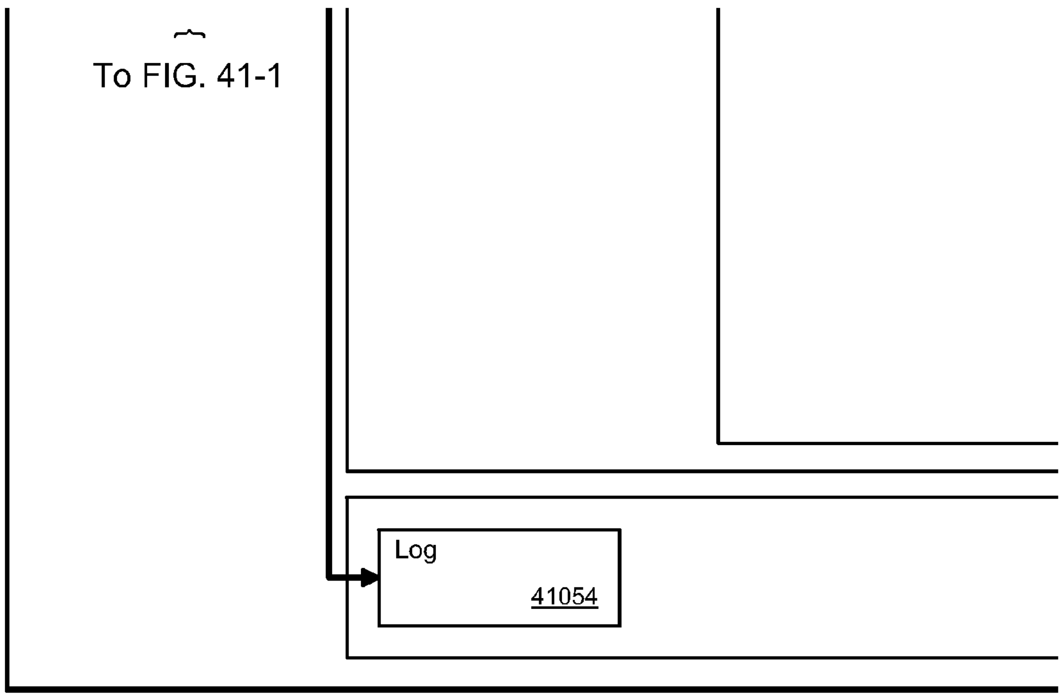
Figures 4, 41:
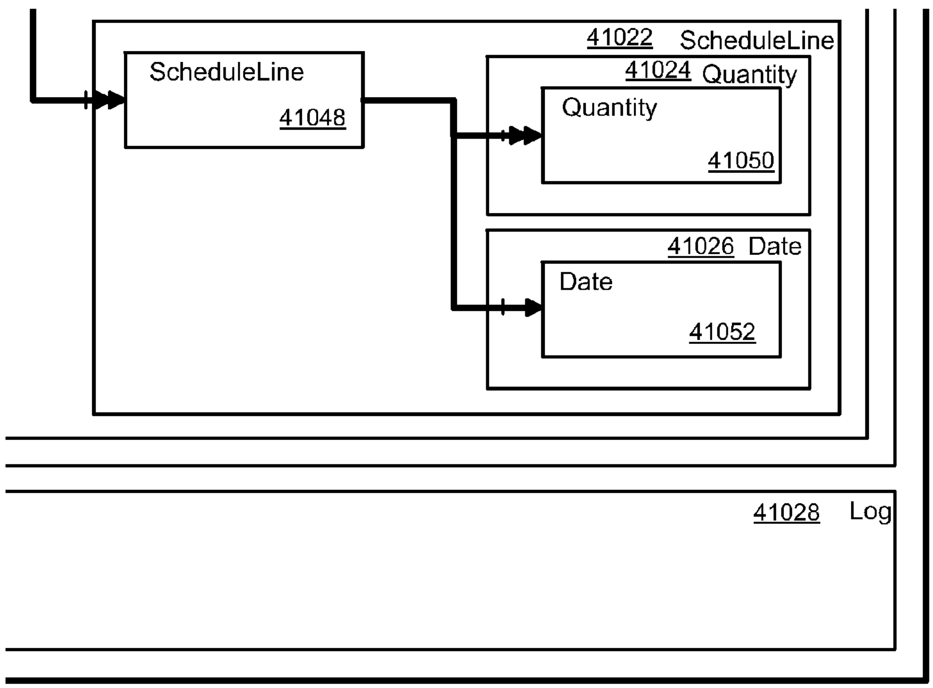

Additionally, FIG. 41 illustrates one example logical configuration of PurchaseOrderTrackingViewERPByPurchaseOrderResponse_sync message 41000. Specifically, this figure depicts the arrangement and hierarchy of various components such as one or more levels of packages, entities, and datatypes, shown here as 41000 through 41054. As described above, packages may be used to represent hierarchy levels. Entities are discrete business elements that are used during a business transaction. Data types are used to type object entities and interfaces with a structure. For example, PurchaseOrderTrackingViewERP- ByPurchaseOrderResponse message 41000 includes, among other things, PurchaseOrderTrackingView 41006. Accordingly, heterogeneous applications may communicate using this consistent message configured as such.

FIGS. 42-1 through 42-16 show an OrderTrackingViewMessage 42000 package. The OrderTrackingViewMessage 42000 package includes an OrderTrackingViewMessage 42002 entity. The OrderTrackingViewMessage 42002 entity is a <MessageDataType> 42004 data type. The OrderTrackingViewMessage 42000 package includes various packages, namely a MessageHeader 42006 package, an OrderTrackingView 42012 package and a Log 42316 package.

The MessageHeader 42006 package includes a MessageHeader 42008 entity. The MessageHeader 42008 entity is a BusinessDocumentMessageHeader 42010 data type. The BusinessDocumentMessageHeader can include business information from the perspective of the sender application for the identifying and processing of a business document (instance) within a (technical) message (if applicable, with a reference to a previous installation).

The OrderTrackingView 42012 package includes an OrderTrackingView 42014 entity. The OrderTrackingView 42014 entity is an <MT>OrdTrckgVw 42016 data type. The OrderTrackingView 42012 package includes an Item 42026 package. The OrderTrackingView 42014 entity includes various attributes, namely an ID 42018 attribute and a TypeCode 42022 attribute. The ID 42018 attribute is a BusinessTransactionDocumentID 42020 data type. The BusinessTransactionDocumentID is a unique identifier for a business transaction document.

The TypeCode 42022 attribute is a BusinessTransactionDocumentTypeCode 42024 data type. The BusinessTransactionDocumentTypeCode is a coded representation of a document type that occurs in business transactions. The document type describes the (business) nature of similar documents and defines basic features of this type of document.

The Item 42026 package includes an Item 42028 entity. The Item 42028 entity is a <MT>Itm 42030 data type. The Item 42026 package includes various packages, namely a Product 42036 package, a Quantity 42122 package, a Party 42140 package, a Date 42162 package, a Status 42184 package, a PredecessorBTDReference 42212 package, a LogisticPackage 42222 package and a ScheduleLine 42256 package.

The Item 42028 entity includes a BusinessTransactionDocumentReference 42032 attribute. The BusinessTransactionDocumentReference 42032 attribute is a BusinessTransactionDocumentReference 42034 data type. The BusinessTransactionDocumentReference is a unique reference to other business documents or business document items that are of significance within each respective business process. Furthermore, a reference to an item within the same business document can be supported. In some implementations, a leading BusinessTransactionDocumentID may also be entered and therefore double maintained.

The Product 42036 package includes various entities, namely a Product 42038 entity, a ProductDescription 42106 entity and a Name . . . 42112 entity. The Product 42038 entity is a <MT>ItmProd 42040 data type. The ItmProd is an identification, description and classification of a product within a business transaction document item. The Product 42038 entity includes a Product 42042 subordinate entity. Product information can be entered from a perspective of a referenced business transaction document. For example, a ProductInternalID of a PurchaseOrder may be, for a derived SalesOrder, a ProductBuyerID.

The BusinessTransactionDocumentProduct includes information that is exchanged in business documents about a product and in accordance with common business understanding. This information identifies the product and product type, and describes the product. In some implementations, at least one product identifying element is filled. The Product 42042 entity includes various attributes, namely an InternalID 42046 attribute, a StandardID 42050 attribute, a BuyerID 42054 attribute, a SellerID 42058 attribute, a ProductRecipientID 42062 attribute, a VendorID 42066 attribute, a ManufacturerID 42070 attribute, a BillToID 42074 attribute, a BillFromID 42078 attribute, a BidderID 42082 attribute, a TypeCode 42086 attribute, a Note 42090 attribute, a ChangeID 42094 attribute, a DiscontinuationIndicator 42098 attribute and a PackageQuantity 42102 attribute.

The InternalID 42046 attribute is a ProductInternalID 42048 data type. The StandardID 42050 attribute is a ProductStandardID 42052 data type. The BuyerID 42054 attribute is a ProductPartyID 42056 data type. The SellerID 42058 attribute is a ProductPartyID 42060 data type. The ProductRecipientID 42062 attribute is a ProductPartyID 42064 data type. The VendorID 42066 attribute is a ProductPartyID 42068 data type. The ManufacturerID 42070 attribute is a ProductPartyID 42072 data type.

The BillToID 42074 attribute is a ProductPartyID 42076 data type. The BillFromID 42078 attribute is a ProductPartyID 42080 data type. The BidderID 42082 attribute is a ProductPartyID 42084 data type. The TypeCode 42086 attribute is a ProductTypeCode 42088 data type. The Note 42090 attribute is a Note 42092 data type. The ChangeID 42094 attribute is a ProductChangeID 42096 data type. The DiscontinuationIndicator 42098 attribute is an Indicator 42100 data type. The PackageQuantity 42102 attribute is a Quantity 42104 data type.

The ProductDescription entity 42106 includes a BatchID 42108 attribute. The BatchID 42108 can be used whenever a process in an application supports batches as qualifying characteristics of a material. For example, a batch can be offered in corresponding service operations. The BatchID 42108 is a BatchID 42110 data type. The Name . . . 42112 entity includes an InventoryValuationTypeCode 42114 attribute. The InventoryValuationTypeCode 42114 attribute uniquely identifies separately valuated stocks of a material. The InventoryValuationTypeCode 42114 attribute is an InventoryValuationTypeCode 42116 data type. The Name . . . 42112 entity includes a SerialID 42118 attribute. The SerialID 42118 attribute is a SerialID 42120 data type. The SerialID can be used whenever a process in an application supports a serial number as a qualifying characteristic of a material. For example, a serial number may be offered in corresponding service operations.

The Quantity 42122 package includes a Quantity 42124 entity. The Quantity 42124 entity is a <MT>ItmQty 42126 data type. The ItmQty is a quantity for a business transaction document item. In some implementations, quantities referenced from business transaction document items are given as quantities with units and their specific type and/or role code. Type and role code are dependent on the business transaction document item type code. The Quantity 42124 entity includes various attributes, namely a Quantity 42128 attribute, a QuantityRoleCode 42132 attribute and a QuantityRoleName 42136 attribute.

The Quantity 42128 attribute is a Quantity 42130 data type. The Quantity is a non-monetary numerical specification of an amount in a unit of measurement for a business transaction document item. The QuantityRoleCode 42132 attribute is a QuantityRoleCode 42134 data type. The QuantityRoleCode is a coded representation of a role of a quantity. The QuantityRoleName 42136 attribute is a Medium_Name 42138 data type. The QuantityRoleCode is a name to define a QuantityRole.

The Party 42140 package includes a Party 42142 entity. The Party 42142 entity is a <MT>ItmPty 42144 data type. The ItmPty is a Party for business transaction document items. The Party 42142 entity includes various attributes, namely a PartyID 42146 attribute, a PartyRoleCategoryCode 42150 attribute, a PartyName 42154 attribute and a PartyRoleCategoryName 42158 attribute.

The PartyID 42146 attribute is a PartyID 42148 data type. The PartyID is a unique identifier for a party. The PartyRoleCategoryCode 42150 attribute is a PartyRoleCategoryCode 42152 data type. The PartyRoleCategoryCode is a coded representation of a PartyRoleCategory. A PartyRoleCategory is a grouping of PartyRoles according to process-controlling criteria. A PartyRole with the same name may exist for each PartyRoleCategory.

The PartyName 42154 attribute is a LANGUAGEINDEPENDENT_LONG_Name 42156 data type. The PartyName 42154 attribute is a name used to define the PartyID. The PartyRoleCategoryName 42158 attribute is a Medium_Name 42160 data type. The PartyRoleCategoryName 42158 attribute is a name used to define the PartyRoleCategory.

The Date 42162 package includes a Date 42164 entity. The Date 42164 entity is a <MT>ItmDte 42166 data type. The Date 42162 is a date for business transaction document items. The Date 42164 entity includes a TimePoint 42168 subordinate entity. The TimePoint 42168 entity includes various attributes, namely a TimePoint 42172 attribute, a TimePointRoleCode 42176 attribute and a TimePointRoleName 42180 attribute. In some implementations, at least one of the TimePoint or the other listed Period fields is filled. In some implementations, for all business transaction document related TimePoints, the generic TimePoint field and possibly the corresponding TimePointRoleCode are given. In some implementations, TimePoints are entered in a generic way.

The TimePoint 42172 attribute is a TimePoint 42174 data type. The TimePoint is a unique time point in a specific time context. The time point defines by means of a time and date value, as well as a time zone. The TimePointRoleCode 42176 attribute is a TimePointRoleCode 42178 data type. The TimePointRoleCode is a coded representation of the role of a time. The TimePointRoleName 42180 attribute is a Medium_Name 42182 data type. The TimePointRoleName 42180 attribute is a name used to define the TimePointRoleCode.

The Status 42184 package includes various entities, namely a Status 42186 entity. The Status 42186 entity is a <MT>ItmSts 42188 data type. The ItmSts is information about the lifecycle of a business transaction document item.

The Status 42186 entity includes various attributes, namely an ApprovalStatusCode 42190 attribute, a BlockingStatusCode 42194 attribute, a CancellationStatusCode 42200 attribute, a ClosureStatusCode 42204 attribute and a ConsistencyStatusCode 42208 attribute. In some implementations, at least one Status field is filled. Status fields may depend on the BusinessTransactionDocumentItemTypeCode. In some implementations, restrictions are given individually.

The ApprovalStatusCode 42190 attribute is an ApprovalStatusCode 42192 data type. The ApprovalStatusCode 42190 attribute is a coded representation of an approval status. In some implementations, the ApprovalStatusCode 42190 attribute may be maintained in a PurchaseOrder.

The BlockingStatusCode 42194 attribute is a BlockingStatusCode 42196 data type. The BlockingStatusCode 42194 attribute is a coded representation of a blocking status of a storage location. In some implementations, the BlockingStatusCode 42194 attribute may be maintained in a PurchaseOrder.

The CancellationStatusCode 42200 attribute is a coded representation of a status of a cancellation. The CancellationStatusCode 42200 attribute is a CancellationStatusCode 42202 data type. In some implementations, the CancellationStatusCode 42200 attribute may be maintained in a PurchaseOrder.

The ClosureStatusCode 42204 attribute is a ClosureStatusCode 42206 data type. The ClosureStatusCode 42204 attribute is a coded representation of a closure status. In some implementations, the ClosureStatusCode 422044 attribute may be maintained in a PurchaseOrder.

The ConsistencyStatusCode 42208 attribute is an INCONSISTENTCONSISTENT_ConsistencyStatusCode 42210 data type. The ConsistencyStatusCode 42208 attribute is a coded representation of a consistency status of an object. In some implementations, the ConsistencyStatusCode 42208 attribute may be maintained in a PurchaseOrder.

The PredecessorBTDReference 42212 package includes a PredecessorBTDReference 42214 entity. The PredecessorBTDReference 42214 entity is a <MT>ItmPredBTDRef 42216 data type. In some implementations, for ERP (Enterprise Resource Planning), a 0 to 1 cardinality is used. In some implementations, a business transaction document may have one direct predecessor.

The PredecessorBTDReference 42214 entity includes a BusinessTransactionDocumentReference 42218 attribute. The BusinessTransactionDocumentReference 42218 attribute is a BusinessTransactionDocumentReference 42220 data type. The BusinessTransactionDocumentReference 42218 attribute is a unique reference to other business documents or business document items that are of significance within each respective business process. Furthermore, a reference to an item within the same business document is possible.

The LogisticPackage 42222 package includes a LogisticPackage 42224 entity. The LogisticPackage 42224 entity is a <MT>ItmLogPackgg 42226 data type. In some implementations, a cardinality of 0 to 1 may be used for ERP. In some implementations, a business transaction document item can be assigned to one LogisticPackage. Further, items of one specific business transaction document may be assigned to the same, identical TrackedProcessTrackingMainID.

The LogisticPackage 42224 entity includes various attributes, namely a LogisticUnitID 42228 attribute, a HandlingUnitID 42232 attribute, a TypeCode 42236 attribute and a TypeName 42240 attribute. The LogisticPackage 42224 entity includes a TrackedProcess 42244 subordinate entity.

The LogisticUnitID 42228 attribute is a LogisticUnitID 42230 data type. The LogisticUnitID 42228 attribute is an identification of a logistic unit. The LogisticUnitID can be empty for identified Logistic Units. In some implementations, the cardinality is 0 to 1.

The HandlingUnitID 42232 attribute is a HandlingUnitID 42234 data type. The HandlingUnitID is a unique identifier for a logistic unit. In some implementations, the cardinality is 0 to 1.

The TypeCode 42236 attribute is a LogisticPackageTypeCode 42238 data type. The TypeCode 42236 attribute is a coded representation of a type of a packing unit as it is used in logistics for storing and shipping goods. The TypeName 42240 attribute is a Medium_Name 42242 data type. The TypeName 42240 attribute is a name used to define a LogisticPackageType.

The TrackedProcess 42244 entity includes various attributes, namely a TrackingMainID 42248 attribute and a TrackingApplicationObjectURI 42252 attribute. The TrackingMainID 42248 attribute is a TrackedProcessTrackingMainID 42250 data type. The TrackedProcessTrackingMainID identifies the main part of an object which is tracked by a tracked process and under which the tracked process is also known. The TrackingApplicationObjectURI 42252 attribute is a URI (Uniform Resource Identifier) 42254 data type. The URI identifies an object which is represented by this tracking id.

The ScheduleLine 42256 package includes a ScheduleLine 42258 entity. The ScheduleLine 42258 entity is a <MT>ItmSchedLine 42260 data type. In some implementations, ScheduleLine is used for business transaction documents with further divisions of their items. If ScheduleLines are available, Quantity and Date nodes of the ScheduleLine can be filled accordingly.

The ScheduleLine 42256 package includes various packages, namely a Quantity 42270 package and a Date 42288 package. The ScheduleLine 42258 entity includes various attributes, namely an ID 42262 attribute and a TypeCode 42266 attribute.

The ID 42262 attribute is a BusinessTransactionDocumentItemScheduleLineID 42264 data type. The ID 42262 attribute is a unique identifier that uses a deadline to identify a schedule line of a document item within a business transaction. The TypeCode 42266 attribute is a BusinessTransactionDocumentItemScheduleLineTypeCode 42268 data type. The BusinessTransactionDocumentItemScheduleLineTypeCode is a coded representation of a type of an ItemScheduleLine, such as RequestedScheduleLine.

The Quantity 42270 package includes a Quantity 42272 entity. The Quantity 42272 entity is a <MT>ItmSchedLineQty 42274 data type. In some implementations, quantities referenced from business transaction document items are given as quantities with units and their specific type and/or role code. Type and role code can be dependent on the business transaction document item type code.

The Quantity 42272 entity includes various attributes, namely a Quantity 42276 attribute, a QuantityRoleCode 42280 attribute and a QuantityRoleName 42284 attribute. The Quantity 42276 attribute is a Quantity 42278 data type. The Quantity is a non-monetary numerical specification of an amount in a unit of measurement for a business transaction document schedule line item.

The QuantityRoleCode 42280 attribute is a QuantityRoleCode 42282 data type. The QuantityRoleCode is a coded representation of a role of a quantity. The QuantityRoleName 42284 attribute is a Medium_Name 42286 data type. The QuantityRoleCode is a name used to define a QuantityRole.

The Date 42288 package includes various entities, namely a Date 42290 entity and a TimePointPeriod 42310 entity. The Date 42290 entity is a <MT>ItmSchedLineDte 42292 data type. In some implementations, at least one of the TimePoint or the other listed Period fields are filled. In some implementations, for business transaction document related TimePoints, the generic TimePoint field and possibly a corresponding TimePointRoleCode are given.

The Date 42290 entity includes a TimePoint 42294 subordinate entity. The TimePoint 42294 entity is a <MT>ItmSchedLineTmePt 42296 data type. The TimePoint 42294 entity includes various attributes, namely a TimePoint 42298 attribute, a TimePointRoleCode 42302 attribute and a TimePointRoleName 42306 attribute.

The TimePoint 42298 attribute is a TimePoint 42300 data type. The TimePoint is a unique time point in a specific time context. The time point can be defined by means of a time and date value, as well as a time zone. In some implementations, TimePoints are entered in a generic way.

The TimePointRoleCode 42302 attribute is a TimePointRoleCode 42304 data type. The TimePointRoleCode is a coded representation of a role of a time. The TimePointRoleName 42306 attribute is a Medium_Name 42308 data type. The TimePointRoleName 42306 attribute is a name used to define the TimePointRoleCode. The UPPEROPEN_LOCALNORMALISED_DateTimePeriod is a delivery date for confirmed products, or a time period in which a service was rendered. The Log 42316 package includes a Log 42318 entity. The Log 42318 entity is a Log 42320 data type.

FIGS. 43-1 through 43-2 illustrate one example logical configuration of a PurchaseOrderTrackingViewERPByPurchaseOrderQueryMessage_sync 43000 element structure. Specifically, these figures depict the arrangement and hierarchy of various components such as one or more levels of packages, entities, and datatypes, shown here as 43000 through Period 43038. As described above, packages may be used to represent hierarchy levels. Entities are discrete business elements that are used during a business transaction. Data types are used to type object entities and interfaces with a structure. For example, the PurchaseOrderTrackingViewERPByPurchaseOrderQueryMessage_sync 43000 includes, among other things, a PurchaseOrderTrackingViewERPByPurchaseOrderQueryMessage_sync 43002. Accordingly, heterogeneous applications may communicate using this consistent message configured as such. The data types of the various packages, entities, and attributes shown in FIG. 43 are described with respect to FIG. 42.

The PurchaseOrderTrackingViewERPByPurchaseOrderQueryMessage_sync 43000 element structure includes a PurchaseOrderTrackingViewERPByPurchaseOrderQueryMessage_sync 43002 entity. The PurchaseOrderTrackingViewERPByPurchaseOrderQueryMessage_sync 43000 element structure includes various packages, namely a MessageHeader 43004 and a Selection 43010.

The MessageHeader 43004 package includes a MessageHeader 43006 entity. The MessageHeader 43006 entity has a cardinality of 1 43008 meaning that for each instance of the MessageHeader 43004 package there is one MessageHeader 43006 entity. The Selection 43010 package includes a PurchaseOrderTrackingViewSelectionByPurchaseOrder 43012 entity. The PurchaseOrderTrackingViewSelectionByPurchaseOrder 43012 entity has a cardinality of 1 43014 meaning that for each instance of the Selection 43010 package there is one PurchaseOrderTrackingViewSelectionByPurchaseOrder 43012 entity. The PurchaseOrderTrackingViewSelectionByPurchaseOrder 43012 entity includes various attributes, namely a PurchaseOrderTrackingViewID 43016, a PurchaseOrderTrackingViewItemID 43020, a PurchaseOrderTrackingViewItemProductInternalID 43024, a PurchaseOrderTrackingViewItemProductSellerID 43028, a PurchaseOrderTrackingViewItemScheduleLineQuantity 43032 and a PurchaseOrderTrackingViewItemScheduleLineDateDeliveryPeriod 43036.

The PurchaseOrderTrackingViewID 43016 attribute has a cardinality of 1 43018 meaning that for each instance of the PurchaseOrderTrackingViewSelectionByPurchaseOrder 43012 entity there is one PurchaseOrderTrackingViewID 43016 attribute. The PurchaseOrderTrackingViewItemID 43020 attribute has a cardinality of 0 . . . 1 43022 meaning that for each instance of the PurchaseOrderTrackingViewSelectionByPurchaseOrder 43012 entity there may be one PurchaseOrderTrackingViewItemID 43020 attribute. The PurchaseOrderTrackingViewItemProductInternalID 43024 attribute has a cardinality of 0 . . . 1 43026 meaning that for each instance of the PurchaseOrderTrackingViewSelectionByPurchaseOrder 43012 entity there may be one PurchaseOrderTrackingViewItemProductInternalID 43024 attribute. The PurchaseOrderTrackingViewItemProductSellerID 43028 attribute has a cardinality of 0 . . . 1 43030 meaning that for each instance of the PurchaseOrderTrackingViewSelectionByPurchaseOrder 43012 entity there may be one PurchaseOrderTrackingViewItemProductSellerID 43028 attribute. The PurchaseOrderTrackingViewItemScheduleLineQuantity 43032 attribute has a cardinality of 0 . . . 1 43034 meaning that for each instance of the PurchaseOrderTrackingViewSelectionByPurchaseOrder 43012 entity there may be one PurchaseOrderTrackingViewItemScheduleLineQuantity 43032 attribute. The PurchaseOrderTrackingViewItemScheduleLineDateDeliveryPeriod 43036 attribute has a cardinality of 0 . . . 1 43038 meaning that for each instance of the PurchaseOrderTrackingViewSelectionByPurchaseOrder 43012 entity there may be one PurchaseOrderTrackingViewItemScheduleLineDateDeliveryPeriod 43036 attribute.

FIGS. 44-1 through 44-12 illustrate one example logical configuration of a PurchaseOrderTrackingViewERPByPurchaseOrderResponseMessage_sync 44000 element structure. Specifically, these figures depict the arrangement and hierarchy of various components such as one or more levels of packages, entities, and datatypes, shown here as 44000 through Log cardinality 44276. As described above, packages may be used to represent hierarchy levels. Entities are discrete business elements that are used during a business transaction. Data types are used to type object entities and interfaces with a structure. For example, the PurchaseOrderTrackingViewERPByPurchaseOrderResponseMessage_sync 44000 includes, among other things, a PurchaseOrderTrackingViewERPByPurchaseOrderResponseMessage_sync 44002. Accordingly, heterogeneous applications may communicate using this consistent message configured as such. The data types of the various packages, entities, and attributes shown in FIG. 44 are described with respect to FIG. 42.

The PurchaseOrderTrackingViewERPByPurchaseOrderResponseMessage_sync 44000 element structure includes a PurchaseOrderTrackingViewERPByPurchaseOrderResponseMessage_sync 44002 entity. The PurchaseOrderTrackingViewERPByPurchaseOrderResponseMessage_sync 44000 element structure includes various packages, namely a MessageHeader 44004, a PurchaseOrderTrackingView 44010 and a Log 44272.

The MessageHeader 44004 package includes a MessageHeader 44006 entity. The MessageHeader 44006 entity has a cardinality of 1 44008 meaning that for each instance of the MessageHeader 44004 package there is one MessageHeader 44006 entity. The PurchaseOrderTrackingView 44010 package includes a PurchaseOrderTrackingView 44012 entity. The PurchaseOrderTrackingView 44010 package includes an Item 44024 package.

The PurchaseOrderTrackingView 44012 entity has a cardinality of 1 44014 meaning that for each instance of the PurchaseOrderTrackingView 44010 package there is one PurchaseOrderTrackingView 44012 entity. The PurchaseOrderTrackingView 44012 entity includes various attributes, namely an ID 44016 and a TypeCode 44020. The ID 44016 attribute has a cardinality of 1 44018 meaning that for each instance of the PurchaseOrderTrackingView 44012 entity there is one ID 44016 attribute. The TypeCode 44020 attribute has a cardinality of 1 44022 meaning that for each instance of the PurchaseOrderTrackingView 44012 entity there is one TypeCode 44020 attribute.

The Item 44024 package includes various entities, namely an Item 44026 and an URI 44208. The Item 44024 package includes various packages, namely a Product 44034, a Quantity 44116, a Party 44134, a Date 44158, a PredecessorBTDReference 44180, a LogisticPackage 44190 and a ScheduleLine 44214. The Item 44026 entity has a cardinality of 0 . . . N 44028 meaning that for each instance of the Item 44024 package there may be one or more Item 44026 entities. The Item 44026 entity includes a BusinessTransactionDocumentReference 44030 attribute. The BusinessTransactionDocumentReference 44030 attribute has a cardinality of 1 44032 meaning that for each instance of the Item 44026 entity there is one BusinessTransactionDocumentReference 44030 attribute.

The URI 44208 entity has a cardinality of 0 . . . 1 44212 meaning that for each instance of the Item 44024 package there may be one URI 44208 entity. The Product 44034 package includes a Product 44036 entity. The Product 44036 entity has a cardinality of 0 . . . 1 44038 meaning that for each instance of the Product 44034 package there may be one Product 44036 entity. The Product 44036 entity includes various attributes, namely a BatchID 44104, an InventoryValuationTypeCode 44108 and a SerialID 44112. The Product 44036 entity includes a Product 44040 subordinate entity. The BatchID 44104 attribute has a cardinality of 0 . . . 1 44106 meaning that for each instance of the Product 44036 entity there may be one BatchID 44104 attribute. The InventoryValuationTypeCode 44108 attribute has a cardinality of 0 . . . 1 44110 meaning that for each instance of the Product 44036 entity there may be one InventoryValuationTypeCode 44108 attribute. The SerialID 44112 attribute has a cardinality of 0 . . . 1 44114 meaning that for each instance of the Product 44036 entity there may be one SerialID 44112 attribute.

The Product 44040 entity has a cardinality of 1 44042 meaning that for each instance of the Product 44036 entity there is one Product 44040 entity. The Product 44040 entity includes various attributes, namely an InternalID 44044, a StandardID 44048, a BuyerID 44052, a SellerID 44056, a ProductRecipientID 44060, a VendorID 44064, a ManufacturerID 44068, a BillToID 44072, a BillFromID 44076, a BidderID 44080, a TypeCode 44084, a Note 44088, a ChangeID 44092, a DiscontinuationIndicator 44096 and a PackageQuantity 44100.

The InternalID 44044 attribute has a cardinality of 0 . . . 1 44046 meaning that for each instance of the Product 44040 entity there may be one InternalID 44044 attribute. The StandardID 44048 attribute has a cardinality of 0 . . . 1 44050 meaning that for each instance of the Product 44040 entity there may be one StandardID 44048 attribute. The BuyerID 44052 attribute has a cardinality of 0 . . . 1 44054 meaning that for each instance of the Product 44040 entity there may be one BuyerID 44052 attribute. The SellerID 44056 attribute has a cardinality of 0 . . . 1 44058 meaning that for each instance of the Product 44040 entity there may be one SellerID 44056 attribute. The ProductRecipientID 44060 attribute has a cardinality of 0 . . . 1 44062 meaning that for each instance of the Product 44040 entity there may be one ProductRecipientID 44060 attribute. The VendorID 44064 attribute has a cardinality of 0 . . . 1 44066 meaning that for each instance of the Product 44040 entity there may be one VendorID 44064 attribute. The ManufacturerID 44068 attribute has a cardinality of 0 . . . 1 44070 meaning that for each instance of the Product 44040 entity there may be one ManufacturerID 44068 attribute.

The BillToID 44072 attribute has a cardinality of 0 . . . 1 44074 meaning that for each instance of the Product 44040 entity there may be one BillToID 44072 attribute. The BillFromID 44076 attribute has a cardinality of 0 . . . 1 44078 meaning that for each instance of the Product 44040 entity there may be one BillFromID 44076 attribute. The BidderID 44080 attribute has a cardinality of 0 . . . 1 44082 meaning that for each instance of the Product 44040 entity there may be one BidderID 44080 attribute. The TypeCode 44084 attribute has a cardinality of 0 . . . 1 44086 meaning that for each instance of the Product 44040 entity there may be one TypeCode 44084 attribute. The Note 44088 attribute has a cardinality of 0 . . . 1 44090 meaning that for each instance of the Product 44040 entity there may be one Note 44088 attribute. The ChangeID 44092 attribute has a cardinality of 0 . . . 1 44094 meaning that for each instance of the Product 44040 entity there may be one ChangeID 44092 attribute. The DiscontinuationIndicator 44096 attribute has a cardinality of 0 . . . 1 44098 meaning that for each instance of the Product 44040 entity there may be one DiscontinuationIndicator 44096 attribute. The PackageQuantity 44100 attribute has a cardinality of 0 . . . 1 44102 meaning that for each instance of the Product 44040 entity there may be one PackageQuantity 44100 attribute.

The Quantity 44116 package includes a Quantity 44118 entity. The Quantity 44118 entity has a cardinality of 0 . . . N 44120 meaning that for each instance of the Quantity 44116 package there may be one or more Quantity 44118 entities. The Quantity 44118 entity includes various attributes, namely a Quantity 44122, a QuantityRoleCode 44126 and a QuantityRoleName 44130. The Quantity 44122 attribute has a cardinality of 1 44124 meaning that for each instance of the Quantity 44118 entity there is one Quantity 44122 attribute. The QuantityRoleCode 44126 attribute has a cardinality of 1 44128 meaning that for each instance of the Quantity 44118 entity there is one QuantityRoleCode 44126 attribute. The QuantityRoleName 44130 attribute has a cardinality of 0 . . . 1 44132 meaning that for each instance of the Quantity 44118 entity there may be one QuantityRoleName 44130 attribute.

The Party 44134 package includes a Party 44136 entity. The Party 44136 entity has a cardinality of 0 . . . N 44138 meaning that for each instance of the Party 44134 package there may be one or more Party 44136 entities. The Party 44136 entity includes various attributes, namely a PartyID 44140, a PartyRoleCategoryCode 44146, a PartyName 44150 and a PartyRoleCategoryName 44154. The PartyID 44140 attribute has a cardinality of 1 44144 meaning that for each instance of the Party 44136 entity there is one PartyID 44140 attribute. The PartyRoleCategoryCode 44146 attribute has a cardinality of 1 44148 meaning that for each instance of the Party 44136 entity there is one PartyRoleCategoryCode 44146 attribute. The PartyName 44150 attribute has a cardinality of 0 . . . 1 44152 meaning that for each instance of the Party 44136 entity there may be one PartyName 44150 attribute. The PartyRoleCategoryName 44154 attribute has a cardinality of 0 . . . 1 44156 meaning that for each instance of the Party 44136 entity there may be one PartyRoleCategoryName 44154 attribute.

The Date 44158 package includes a Date 44160 entity. The Date 44160 entity has a cardinality of 0 . . . 1 44162 meaning that for each instance of the Date 44158 package there may be one Date 44160 entity. The Date 44160 entity includes a TimePoint 44164 subordinate entity. The TimePoint 44164 entity has a cardinality of 0 . . . N 44166 meaning that for each instance of the Date 44160 entity there may be one or more TimePoint 44164 entities. The TimePoint 44164 entity includes various attributes, namely a TimePoint 44168, a TimePointRoleCode 44172 and a TimePointRoleName 44176. The TimePoint 44168 attribute has a cardinality of 1 44170 meaning that for each instance of the TimePoint 44164 entity there is one TimePoint 44168 attribute. The TimePointRoleCode 44172 attribute has a cardinality of 1 44174 meaning that for each instance of the TimePoint 44164 entity there is one TimePointRoleCode 44172 attribute. The TimePointRoleName 44176 attribute has a cardinality of 0 . . . 1 44178 meaning that for each instance of the TimePoint 44164 entity there may be one TimePointRoleName 44176 attribute.

The PredecessorBTDReference 44180 package includes a PredecessorBTDReference 44182 entity. The PredecessorBTDReference 44182 entity has a cardinality of 0 . . . N 44184 meaning that for each instance of the PredecessorBTDReference 44180 package there may be one or more PredecessorBTDReference 44182 entities. The PredecessorBTDReference 44182 entity includes a BusinessTransactionDocumentReference 44186 attribute. The BusinessTransactionDocumentReference 44186 attribute has a cardinality of 1 44188 meaning that for each instance of the PredecessorBTDReference 44182 entity there is one BusinessTransactionDocumentReference 44186 attribute.

The LogisticPackage 44190 package includes a LogisticPackage 44192 entity. The LogisticPackage 44192 entity has a cardinality of 0 . . . N 44194 meaning that for each instance of the LogisticPackage 44190 package there may be one or more LogisticPackage 44192 entities. The LogisticPackage 44192 entity includes a HandlingUnitID 44196 attribute. The LogisticPackage 44192 entity includes a TrackedProcess 44200 subordinate entity. The HandlingUnitID 44196 attribute has a cardinality of 0 . . . 1 44198 meaning that for each instance of the LogisticPackage 44192 entity there may be one HandlingUnitID 44196 attribute.

The TrackedProcess 44200 entity has a cardinality of 0 . . . 1 44202 meaning that for each instance of the LogisticPackage 44192 entity there may be one TrackedProcess 44200 entity. The TrackedProcess 44200 entity includes various attributes, namely a TrackingMainID 44204 and a TrackingApplicationObjectURL 44210. The TrackingMainID 44204 attribute has a cardinality of 1 44206 meaning that for each instance of the TrackedProcess 44200 entity there is one TrackingMainID 44204 attribute. The TrackingApplicationObjectURL 44210 attribute has a cardinality of 0 . . . 1 44212 meaning that for each instance of the TrackedProcess 44200 entity there may be one TrackingApplicationObjectURL 44210 attribute.

The ScheduleLine 44214 package includes a ScheduleLine 44216 entity. The ScheduleLine 44214 package includes various packages, namely a Quantity 44228 and a Date 44246. The ScheduleLine 44216 entity has a cardinality of 0 . . . N 44218 meaning that for each instance of the ScheduleLine 44214 package there may be one or more ScheduleLine 44216 entities. The ScheduleLine 44216 entity includes various attributes, namely an ID 44220 and a TypeCode 44224. The ID 44220 attribute has a cardinality of 1 44222 meaning that for each instance of the ScheduleLine 44216 entity there is one ID 44220 attribute. The TypeCode 44224 attribute has a cardinality of 1 44226 meaning that for each instance of the ScheduleLine 44216 entity there is one TypeCode 44224 attribute.

The Quantity 44228 package includes a Quantity 44230 entity. The Quantity 44230 entity has a cardinality of 0 . . . N 44232 meaning that for each instance of the Quantity 44228 package there may be one or more Quantity 44230 entities. The Quantity 44230 entity includes various attributes, namely a Quantity 44234, a QuantityRoleCode 44238 and a QuantityRoleName 44242. The Quantity 44234 attribute has a cardinality of 1 44236 meaning that for each instance of the Quantity 44230 entity there is one Quantity 44234 attribute. The QuantityRoleCode 44238 attribute has a cardinality of 1 44240 meaning that for each instance of the Quantity 44230 entity there is one QuantityRoleCode 44238 attribute. The QuantityRoleName 44242 attribute has a cardinality of 0 . . . 1 44244 meaning that for each instance of the Quantity 44230 entity there may be one QuantityRoleName 44242 attribute.

The Date 44246 package includes a Date 44248 entity. The Date 44248 entity has a cardinality of 0 . . . 1 44250 meaning that for each instance of the Date 44246 package there may be one Date 44248 entity. The Date 44248 entity includes a DeliveryPeriod 44268 attribute. The Date 44248 entity includes a TimePoint 44252 subordinate entity. The DeliveryPeriod 44268 attribute has a cardinality of 0 . . . 1 44270 meaning that for each instance of the Date 44248 entity there may be one DeliveryPeriod 44268 attribute.

The TimePoint 44252 entity has a cardinality of 0 . . . N 44254 meaning that for each instance of the Date 44248 entity there may be one or more TimePoint 44252 entities. The TimePoint 44252 entity includes various attributes, namely a TimePoint 44256, a TimePointRoleCode 44260 and a TimePointRoleName 44264. The TimePoint 44256 attribute has a cardinality of 1 44258 meaning that for each instance of the TimePoint 44252 entity there is one TimePoint 44256 attribute. The TimePointRoleCode 44260 attribute has a cardinality of 1 44262 meaning that for each instance of the TimePoint 44252 entity there is one TimePointRoleCode 44260 attribute. The TimePointRoleName 44264 attribute has a cardinality of 1 44266 meaning that for each instance of the TimePoint 44252 entity there is one TimePointRoleName 44264 attribute.

The Log 44272 package includes a Log 44274 entity. The Log 44274 entity has a cardinality of 1 44276 meaning that for each instance of the Log 44272 package there is one Log 44274 entity.

A number of implementations have been described. Nevertheless, it will be understood that various modifications may be made without departing from the spirit and scope of the disclosure. Accordingly, other implementations are within the scope of the following claims.

What is claimed is:

1. A non-transitory computer readable medium including program code for providing a message-based interface for exchanging information regarding lists including elements used to define and describe components used to assemble an individual material, the medium comprising:

program code for receiving, via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for querying, from product data maintenance, information regarding variant data of components associated with an individual material bill, the first message including a first message package derived from the common business object model, the first message package hierarchically organized in memory as including:

at a first hierarchical level within the first message package, an individual material bill of material enterprise resource planning (ERP) variant by variant identifying elements query message entity; and at the first hierarchical level within the first message package, a selection package including, at a second hierarchical level within the first message package, an individual material bill of material variant by variant identifying elements entity, where the individual material bill of material variant by variant identifying elements entity includes, at a third hierarchical level within the first message package, a variant individual material identifier (ID) and a usage code;

program code for processing the first message based on the hierarchical organization of the first message package, where processing the first message includes unpacking the first message package based on the first message package's structure and the first message package's derivation from the common business object model, wherein the particular structure of the first message package is used at least in part to identify the purpose of the first message package; and program code for sending a second message to the heterogeneous application responsive to the first message, where the second message includes a second message package derived from the common business object model to provide consistent semantics with the first message package.

2. The computer readable medium of claim 1, wherein the individual material bill of material variant by variant identifying elements entity includes, at the third hierarchical level within the first message package, a variant plant ID and a variant validity date period start date.

3. The computer readable medium of claim 1, wherein the first message package includes, at the first hierarchical level within the first message package, a processing conditions package.

4. A distributed system operating in a landscape of computer systems providing message-based services defined in a service registry, the system comprising:

at least one processor operable to execute computer readable instructions embodied on tangible media;

a graphical user interface comprising computer readable instructions executable by the at least one processor, the instructions embedded on non-transitory, tangible media, for querying, from product data maintenance, information regarding variant data of components associated with an individual material bill, the instructions using a request;

a first memory storing a user interface controller for processing the request when executed by the at least one processor and involving a message including a first message package derived from a common business object model, where the common business object model includes business objects having relationships that enable derivation of message-based service interfaces and message packages, the first message package hierarchically organized as:

at a first hierarchical level within the first message package, an individual material bill of material enterprise resource planning (ERP) variant by variant identifying elements query message entity; and at the first hierarchical level within the first message package, a selection package including, at a second hierarchical level within the first message package, an individual material bill of material variant by variant identifying elements entity, where the individual material bill of material variant by variant identifying elements entity includes, at a third hierarchical level within the first message package, a variant individual material identifier (ID) and a usage code; and a second memory, remote from the graphical user interface, storing a plurality of message-based service interfaces executable by the at least one processor and derived from the common business object model to provide consistent semantics with messages derived from the common business object model, wherein one of the message-based service interfaces is operable to process the message based on the hierarchical organization of the first message package when executed by the at least one processor, where processing the message includes unpacking the first message package based on the hierarchical organization of the first message package and the first message package's derivation from the common business object model, wherein the particular structure of the first message package is used at least in part to identify the purpose of the message.

5. The distributed system of claim 4, wherein the first memory is remote from the graphical user interface.

6. The distributed system of claim 4, wherein the first memory is remote from the second memory.

* * * * *